United States Patent
Han et al.

(10) Patent No.: US 12,483,141 B2
(45) Date of Patent: Nov. 25, 2025

(54) SWITCH CONTROL METHOD AND HYBRID VOLTAGE CONVERTER

(71) Applicant: Halo Microelectronics Co., Ltd, Foshan (CN)

(72) Inventors: Shuang Han, Foshan (CN); Songnan Yang, Frisco, TX (US)

(73) Assignee: Halo Microelectronics Co., Ltd., Foshan (CN)

(*) Notice: Subject to any disclaimer, the term of this patent is extended or adjusted under 35 U.S.C. 154(b) by 195 days.

(21) Appl. No.: 18/396,931

(22) Filed: Dec. 27, 2023

(65) Prior Publication Data

US 2025/0125711 A1 Apr. 17, 2025

(30) Foreign Application Priority Data

Oct. 12, 2023 (CN) .......................... 202311315246.3

(51) Int. Cl.
*H02M 3/158* (2006.01)
*H02M 1/00* (2007.01)
*H02M 3/07* (2006.01)

(52) U.S. Cl.
CPC ....... *H02M 3/1586* (2021.05); *H02M 1/0032* (2021.05); *H02M 1/0043* (2021.05); *H02M 1/0095* (2021.05); *H02M 3/07* (2013.01)

(58) Field of Classification Search
CPC ............. H02M 1/0032; H02M 1/0043; H02M 1/0095; H02M 3/07; H02M 3/1586
See application file for complete search history.

(56) References Cited

U.S. PATENT DOCUMENTS

2022/0255433 A1    8/2022   Wen et al.

FOREIGN PATENT DOCUMENTS

| | | |
|---|---|---|
| CN | 110601535 A | 12/2019 |
| CN | 110719046 A | 1/2020 |
| CN | 113824197 A | 12/2021 |
| CN | 114142723 A | 3/2022 |
| CN | 114679059 A | 6/2022 |
| CN | 116780909 A | 9/2023 |
| EP | 4030609 A1 | 7/2022 |

*Primary Examiner* — Jue Zhang
(74) *Attorney, Agent, or Firm* — AP3 Law Firm PLLC

(57) ABSTRACT

A switch control method is applied to a hybrid voltage converter including a switched capacitor unit and a freewheeling unit. The method including obtaining the output current of the hybrid voltage converter, when the output current is greater than a first current threshold, controlling the switches in the hybrid voltage converter to operate in parallel conduction mode, when the output current is less than the first current threshold, controlling the switches in the hybrid voltage converter to operate in sequential conduction mode. When the switches operate in parallel conduction mode, N switches in the switched capacitor unit are controlled to turn on and off with the same duty cycle and a phase shift of 360/N degrees. When the switches operate in sequential conduction mode, each switch in the switched capacitor unit is controlled to conduct individually with the same duty cycle in sequence.

21 Claims, 23 Drawing Sheets

When the output current is greater than the first current threshold, control the first switch group, which comprises the first switch and the third switch, and the second switch group, which comprises the second switch and the fourth switch, to turn on and off with the same duty cycle but with a phase shift of 180 degrees; control the fifth switch to turn on and off in a complementary manner with the second switch group; control the sixth switch to turn on and off in a complementary manner with the first switch group. ⏤ 401

When the output current is less than the first current threshold, control the first switch, the second switch, the third switch, and the fourth switch to turn on individually and sequentially with the same duty cycle; control the fifth switch to turn off when the second switch or the fourth switch is turned on, and to turn on when both the second switch and the fourth switch are turned off; control the sixth switch to turn off when the first switch or the third switch is turned on, and to turn on when both the first switch and the third switch are turned off. ⏤ 402

Figure 4

```
┌─────────────────────────────────────────────────────────────────────────┐
│ Generate a first pulse signal and a second pulse signal. The first pulse signal and the │ ┌501
│ second pulse signal are periodic pulse signals with the same duty cycle and a phase      │
│ difference of 180 degrees                                                                │
└─────────────────────────────────────────────────────────────────────────┘
                                        │
┌─────────────────────────────────────────────────────────────────────────┐
│ Control the sixth switch by the complementary signal of the first pulse signal and       │ ┌502
│ control the fifth switch by the complementary signal of the second pulse signal.         │
└─────────────────────────────────────────────────────────────────────────┘
                                        │
┌─────────────────────────────────────────────────────────────────────────┐
│ When the output current is greater than the first current threshold, control the first   │ ┌503
│ switch and the third switch with the first pulse signal and control the second switch    │
│ and the fourth switch with the second pulse signal.                                      │
└─────────────────────────────────────────────────────────────────────────┘
                                        │
┌─────────────────────────────────────────────────────────────────────────┐
│ Generate a first selection signal based on the first pulse signal, where the frequency of│ ┌504
│ the first selection signal is half of the first pulse signal, and the duty cycle of the first│
│ selection signal is equal to 1/2.                                                        │
└─────────────────────────────────────────────────────────────────────────┘
                                        │
┌─────────────────────────────────────────────────────────────────────────┐
│ Generate a second selection signal based on the second pulse signal, where the           │ ┌505
│ frequency of the second selection signal is half of the second pulse signal, and the     │
│ duty cycle of the second selection signal is equal to 1/2.                               │
└─────────────────────────────────────────────────────────────────────────┘
                                        │
┌─────────────────────────────────────────────────────────────────────────┐
│ When the output current is less than the first current threshold, control the first switch│
│ by the logical AND operation result of the first pulse signal and the complementary      │ ┌506
│ signal of the second selection signal, control the second switch by the logical AND      │
│ operation result of the second pulse signal and the first selection signal, control the  │
│ third switch by the logical AND operation result of the first pulse signal and the       │
│ second selection signal, and control the fourth switch by the logical AND operation      │
│ result of the second pulse signal and the complementary signal of the first selection    │
│ signal.                                                                                  │
└─────────────────────────────────────────────────────────────────────────┘
```

Figure 5

| | |
|---|---|
| When the output current rise above the first current threshold, control the third switch group, comprising the seventh switch Q7 and the tenth switch Q10, and the fourth switch group, comprising the eighth switch Q8 and the ninth switch Q9, to turn on and off with the same duty cycle and 180 degrees out of phase; control the eleventh switch Q11 and the fourth switch group to alternately turn on and off in a complementary manner; control the twelfth switch Q12 and the third switch group to alternately turn on and off in a complementary manner. | ⎫<br>⎬ 801<br>⎭ |

| | |
|---|---|
| When the output current falls below the first current threshold, control the seventh switch Q7, the ninth switch Q9, the eighth switch Q8, and the tenth switch Q10 to turn on individually and sequentially with the same duty cycle; control the eleventh switch Q11 to turn off when the eighth switch Q8 or the ninth switch Q9 is turned on, and to turn on when both the eighth switch Q8 and the ninth switch Q9 are turned off; control the twelfth switch Q12 to turn off when the seventh switch Q7 or the tenth switch Q10 is turned on, and to turn on when both the seventh switch Q7 and tenth switch Q10 are turned off. | ⎫<br>⎬ 802<br>⎭ |

Figure 8

Generate a third pulse signal and a fourth pulse signal, wherein the third pulse signal and the fourth pulse signal are periodic pulse signals with the same duty cycle and a 180-degree phase difference. ⟋901

Control the twelfth switch through the complementary signal of the third pulse signal, and control the eleventh switch through the complementary signal of the fourth pulse signal. ⟋902 when the output current is greater than the first current threshold, Control the seventh switch and the tenth switch with the third pulse signal and control the eighth switch and the ninth switch with the fourth pulse signal, ⟋903

Generate a third selection signal based on the third pulse signal, where the frequency of the third selection signal is 1/2 of the third pulse signal, and the duty cycle of the third selection signal is 1/2. ⟋904

Generate a fourth selection signal based on the fourth pulse signal, where the frequency of the fourth selection signal is 1/2 of the fourth pulse signal, and the duty cycle of the fourth selection signal is 1/2. ⟋905

When the output current falls below the first current threshold, control the seventh switch by the logical AND operation result of the third pulse signal and the complementary signal of the fourth selection signal, control the eighth switch by the logical AND operation result of the fourth pulse signal and the third selection signal, control the tenth switch by the logical AND operation result of the third pulse signal and the fourth selection signal, and control the ninth switch by the logical AND operation result of the fourth pulse signal and the complementary signal of the third selection signal. ⟋906

Figure 9

When the output current exceeds the first current threshold, control the fifth switch group comprising the seventh switch, the tenth switch, and the thirteenth switch, and the sixth switch group comprising the eighth switch, the ninth switch, and the fourteenth switch to be turned on and off with the same duty cycle and 180 degrees out of phase. Control the eleventh switch and the fifth switch group to turn on and off alternately in a complementary manner. Control the twelfth switch and the sixth switch group to turn on and off alternately in a complementary manner ⟋1101

When the output current falls below the first current threshold, control the seventh switch, the ninth switch, the eighth switch, the tenth switch, the thirteenth switch, and the fourteenth switch to be turned on sequentially and individually with the same duty cycle. Control the twelfth switch to turn off when the eighth switch, the ninth switch or the fourteenth switch is turned on, and to turn on when the eighth switch, the ninth switch, and the fourteenth switch are all turned off. Control the eleventh switch to turn off when the seventh switch, the tenth switch or the thirteenth switch is turned on, and to turn on when the seventh switch, the tenth switch, and the thirteenth switch are all turned off. ⟋1102

Figure 12

1501 — When the output current is greater than the first current threshold, control the seventh switch group, comprising the fifteenth switch and the eighteenth switch, the eighth switch group, comprising the seventeenth switch and the twentieth switch, and the ninth switch group, comprising the nineteenth switch and the sixteenth switch, to turn on and off with the same duty cycle and a phase difference of 120 degrees. Control the twenty-first switch and the ninth switch group to alternately turn on and off in a complementary manner. Control the twenty-second switch and the seventh switch group to alternately turn on and off in a complementary manner. Control the twenty-third switch and the eighth switch group to alternately turn on and off in a complementary manner.

1502 — When the output current is less than the first current threshold, control the fifteenth switch, the seventeenth switch, the nineteenth switch, the sixteenth switch, the eighteenth switch, and the twentieth switch to turn on individually and sequentially with the same duty cycle. Control the twenty-first switch to turn off when the sixteenth switch or the nineteenth switch is turned on, and to turn on when both the sixteenth switch and the nineteenth switch are turned off. Control the twenty-second switch to turn off when the fifteenth switch or the eighteenth switch is turned on, and to turn on when both the fifteenth switch and the eighteenth switch are turned off. Control the twenty-third switch to turn off when the seventeenth switch or the twentieth switch is turned on, and to turn on when both the seventeenth switch and the twentieth switch are turned off.

Figure 16

| Generate the seventh pulse signal, the eighth pulse signal, and the ninth pulse signal, wherein the seventh pulse signal, the eighth pulse signal, and the ninth pulse signal are periodic pulse signals with the same duty cycle and a phase difference of 120 degrees. | 1601 |

| Control the twenty-first switch by the complementary signal of the ninth pulse signal, control the twenty-second switch by the complementary signal of the seventh pulse signal, and control the twenty-third switch by the complementary signal of the eighth pulse signal. | 1602 |

| When the output current is greater than the first current threshold, control the fifteenth switch and the eighteenth switch with the seventh pulse signal, control the seventeenth switch and the twentieth switch with the eighth pulse signal, and control the sixteenth switch and the nineteenth switch with the ninth pulse signal. | 1603 |

| Based on the seventh pulse signal, output the seventh selection signal, where the frequency of the seventh selection signal is 1/2 of that of the seventh pulse signal, and the duty cycle of the seventh selection signal is 1/2. | 1604 |

| Based on the eighth pulse signal, output the eighth selection signal, where the frequency of the eighth selection signal is 1/2 of that of the eighth pulse signal, and the duty cycle of the eighth selection signal is 1/2. | 1605 |

| Based on the ninth pulse signal, output the ninth selection signal, where the frequency of the ninth selection signal is 1/2 of that of the ninth pulse signal, and the duty cycle of the ninth selection signal is 1/2. | 1606 |

| When the output current is less than the first current threshold, control the fifteenth switch by the logical AND operation result of the seventh pulse signal and the complementary signal of the ninth selection signal. Control the seventeenth switch by the logical AND operation result of the eighth pulse signal and the seventh selection signal. Control the nineteenth switch by the logical AND operation result of the ninth pulse signal and the seventh selection signal. Control the sixteenth switch by the logical AND operation result of the ninth pulse signal and the ninth selection signal. Control the eighteenth switch by the logical AND operation result of the seventh pulse signal and the complementary signal of the seventh selection signal. Control the twentieth switch by the logical AND operation result of the eighth pulse signal and the complementary signal of the eighth selection signal. | 1607 |

Figure 17

SWITCH CONTROL METHOD AND HYBRID VOLTAGE CONVERTER

RELATED APPLICATION

This application claims the benefit of and priority to Chinese Patent Application No. 202311315246.3, filed on Oct. 12, 2023, which is hereby incorporated by reference in its entirety.

TECHNICAL FIELD

This application relates to the field of switch control technology, particularly involving a method for switch control and a hybrid voltage converter.

BACKGROUND

Multi-level hybrid voltage converters are increasingly applied in various fields, including data centers and communications, due to their high efficiency. These hybrid voltage converters combine a switched capacitor unit with traditional inductor-based DC-DC buck converter units, allowing for adjustable voltage regulation with high step-down ratios.

However, the current multi-level hybrid voltage converters have relatively low power conversion efficiency.

SUMMARY

The present application aims to provide a method for switch control and a hybrid voltage converter that can enhance the power conversion efficiency of hybrid voltage converters.

To achieve the aforementioned objectives, firstly, this application provides a switch control method for hybrid voltage converters. The hybrid voltage converter comprises a switched capacitor unit and a freewheeling unit. In this configuration, the switched capacitor unit is connected at N switch nodes, where N is an integer greater than 1. The switch control method comprises continuously monitoring the output current of the hybrid voltage converter, when the output current exceeds a first current threshold, controlling the switches in the hybrid voltage converter to operate in a parallel conduction mode, when the output current falls below the first current threshold, controlling the switches in the hybrid voltage converter to operate in a sequential conduction mode.

When the switches in the hybrid voltage converter operate in a parallel conduction mode, the N switch groups in the switched capacitor unit are controlled to turn on and off with the same duty cycle and a phase-shift of (360/N) degrees, with each switch group comprising at least two switches. Each switch in the freewheeling unit corresponds to a switch group in the switched capacitor unit, and the switches in the freewheeling unit turns on and off complementary to their corresponding switch groups in the switched capacitor unit.

When the switches in the hybrid voltage converter operate in a sequential conduction mode, each switch in the switched capacitor unit turns on sequentially and individually with the same duty cycle. Each switch in the freewheeling unit is turned off when any switch of their corresponding switch group in the switched capacitor unit is turned on, and each switch in the freewheeling unit is turned on when all switches in their corresponding switch group in the switched capacitor unit are turned off.

In an optional implementation, the switch control method further comprising after a transition between parallel conduction mode and sequential conduction mode, maintaining the control signal of each switch of the hybrid voltage converter to be derived from a same pulse-width modulation signal as before the transition.

In an optional implementation, the switch control method further comprising transitioning the hybrid voltage converter from a pulse-width modulation control mode to a pulse-frequency modulation control mode when the output current falls below a second current threshold, and configuring the switches in the hybrid voltage converter to maintain in the sequential conduction mode, wherein the second current threshold is equal or lower than the first current threshold.

In an optional configuration, the switched capacitor unit comprises a first switch, a second switch, a third switch, a fourth switch, a first input capacitor, a first capacitor, a second capacitor, and a third capacitor. The freewheeling unit comprises a fifth switch, a sixth switch, a first output capacitor, a first inductor, and a second inductor. The switched capacitor unit and the freewheeling unit are connected at the first switch node and the second switch node.

A third terminal of the first switch is connected to an input power source and a first terminal of the first input capacitor. A second terminal of the first switch is connected to a third terminal of the second switch and a first terminal of the first capacitor. A second terminal of the second switch is connected to a first terminal of the second capacitor and a third terminal of the third switch. A second terminal of the third switch is connected to a third terminal of the fourth switch and a first terminal of the third capacitor. A second terminal of the fourth switch is connected to a third terminal of the fifth switch, a second terminal of the second capacitor, and a first terminal of the second inductor at the second switch node. A third terminal of the sixth switch is connected to a second terminal of the first capacitor, a second terminal of the third capacitor, and a first terminal of the first inductor at the first switch node. A second terminal of the first inductor is connected to a second terminal of the second inductor and a first terminal of the first output capacitor. A second terminal of the first input capacitor, a second terminal of the fifth switch, a second terminal of the sixth switch, and a second terminal of the first output capacitor are all grounded.

In an optional configuration, the switch control method further comprising: when the output current exceeds the first current threshold, controlling a first switch group comprising the first switch and the third switch, and a second switch group comprising the second switch and the fourth switch, to alternately turn on and off with a same duty cycle and a phase shift of 180 degrees, controlling the fifth switch to turn on and off in a complementary manner with the second switch group, and controlling the sixth switch to turn on and off in a complementary manner with the first switch group. When the output current falls below the first current threshold, controlling the first switch, the second switch, the third switch, and the fourth switch to conduct individually with a same duty cycle in a sequential order, controlling the fifth switch to turn off when the second switch or the fourth switch is turned on and controlling the fifth switch to turn on when both the second switch and the fourth switch are turn off, controlling the sixth switch to turn off when the first switch or the third switch is turned on, and controlling the sixth switch to turn on when both the first switch and the third switch are turn off.

In an optional configuration, the switch control method further comprising: generating a first pulse signal and a second pulse signal, wherein the first pulse signal and the second pulse signal are periodic pulse signals with a same duty cycle and a 180-degree phase shift, controlling the sixth switch through a complementary signal of the first pulse signal, and controlling the fifth switch through a complementary signal of the second pulse signal, when the output current exceeds the first current threshold, controlling the first switch and the third switch through the first pulse signal, and controlling the second switch and the fourth switch through the second pulse signal, wherein based on the first pulse signal, a first selection signal is generated with a frequency equal to one half of that of the first pulse signal, and a duty cycle of the first selection signal is equal to ½, based on the second pulse signal, a second selection signal is generated with a frequency equal to one half of that of the second pulse signal, and a duty cycle of the second selection signal is equal to ½, and when the output current falls below the first current threshold, controlling the first switch based on a logical AND operation result of the first pulse signal and the complementary signal of the second selection signal, controlling the second switch based on a logical AND operation result of the second pulse signal and the first selection signal, controlling the third switch based on a logical AND operation result of the first pulse signal and the second selection signal, and controlling the fourth switch based on a logical AND operation result of the second pulse signal and the complementary signal of the first selection signal.

In an optional embodiment, the switched capacitor unit comprises a seventh switch, an eighth switch, a ninth switch, a tenth switch, a second input capacitor, a fourth capacitor, and a fifth capacitor. The freewheeling unit comprises an eleventh switch, a twelfth switch, a third inductor, a fourth inductor, and a second output capacitor. The switched capacitor unit and the freewheeling unit are connected at a third switch node and a fourth switch node, and wherein a third terminal of the seventh switch is connected to an input power source, a first terminal of the second input capacitor and a third terminal of the ninth switch, a second terminal of the seventh switch is connected to a third terminal of the eighth switch and a first terminal of the fourth capacitor, a second terminal of the eighth switch is connected to a third terminal of the eleventh switch, a second terminal of the fifth capacitor and a first terminal of the fourth inductor at the fourth switch node, a second terminal of the ninth switch is connected to a first terminal of the fifth capacitor and a third terminal of the tenth switch, a second terminal of the tenth switch is connected to a second terminal of the fourth capacitor, a third terminal of the twelfth switch and a first terminal of the third inductor at the third switch node, a second terminal of the third inductor is connected to a second terminal of the fourth inductor and a first terminal of the second output capacitor, and a second terminal of the second input capacitor, a second terminal of the eleventh switch, a second terminal of the twelfth switch, and a second terminal of the second output capacitor are all grounded.

In an optional embodiment, the switch control method further comprising when the output current is greater than the first current threshold, controlling a third switch group comprising the seventh switch and the tenth switch, and a fourth switch group comprising the eighth switch and the ninth switch, to alternately turn on and off with a same duty cycle and a phase shift of 180 degrees, controlling the eleventh switch and the fourth switch group to alternately turn on and off in a complementary manner, and controlling the twelfth switch and the third switch group to alternately turn on and off in a complementary manner. When the output current is less than the first current threshold, controlling the seventh switch, the ninth switch, the eighth switch, and the tenth switch to turn on individually with a same duty cycle in a sequential order, controlling the eleventh switch to turn off when the eighth switch or the ninth switch is turned on, to turn on when both the eighth switch and the ninth switch are turned off, controlling the twelfth switch to turn off when the seventh switch or the tenth switch is turned on, and to turn on when both the seventh switch and the tenth switch are turned off.

In an optional embodiment, the switch control method further comprising: generating a third pulse signal and a fourth pulse signal, wherein the third pulse signal and the fourth pulse signal are periodic pulse signals with a same duty cycle and a phase difference of 180 degrees, controlling the twelfth switch with a complementary signal of the third pulse signal and controlling the eleventh switch with a complementary signal of the fourth pulse signal, when the output current is greater than the first current threshold, controlling the seventh switch and the tenth switch with the third pulse signal, and controlling the eighth switch and the ninth switch with the fourth pulse signal, and wherein based on the third pulse signal, a third selection signal is generated with a frequency equal to one half of a frequency of the third pulse signal, and a duty cycle of the third selection signal equal to ½, based on the fourth pulse signal, a fourth selection signal is generated with a frequency equal to one half of a frequency of the fourth pulse signal, and a duty cycle of the fourth selection signal equal to ½, and when the output current is less than the first current threshold, controlling the seventh switch with a logical AND operation result of the third pulse signal and the complementary signal of the fourth selection signal, controlling the eighth switch with a logical AND operation result of the fourth pulse signal and the third selection signal, controlling the tenth switch with a logical AND operation result of the third pulse signal and the fourth selection signal, and controlling the ninth switch with a logical AND operation result of the fourth pulse signal and the complementary signal of the third selection signal.

In an optional embodiment, the switched capacitor unit further comprises a thirteenth switch, a fourteenth switch, a sixth capacitor, and a seventh capacitor, and wherein a third terminal of the thirteenth switch is connected to a first terminal of the sixth capacitor and the second terminal of the eighth switch, a second terminal of the thirteenth switch is connected to a second terminal of the seventh capacitor, the third terminal of the eleventh switch and the first terminal of the third inductor at the third switch node, a third terminal of the fourteenth switch is connected to a first terminal of the seventh capacitor and the second terminal of the tenth switch, and a second terminal of the fourteenth switch is connected to a second terminal of the sixth capacitor, the third terminal of the twelfth switch and the first terminal of the fourth inductor at the fourth switch node.

In an optional embodiment, the switch control method further comprising: when the output current is greater than the first current threshold, controlling a fifth switch group comprising the seventh switch, the tenth switch, and the thirteenth switch, and a sixth switch group comprising the eighth switch, the ninth switch, and the fourteenth switch to alternately turn on and off with a same duty cycle and 180 degrees out of phase, controlling the eleventh switch to turn on and off in a complementary manner with the fifth switch group, controlling the twelfth switch to turn on and off in a complementary manner with the sixth switch group. When the output current is less than the first current threshold, controlling the seventh switch, the ninth switch, the eighth switch, the tenth switch, the thirteenth switch, and the fourteenth switch to turn on sequentially and individually with a same duty cycle, controlling the twelfth switch to turn off when the eighth switch, the ninth switch, or the fourteenth switch is turned on, and to turn on when the eighth switch, the ninth switch, and the fourteenth switch are all turned off, controlling the eleventh switch to turn off when the seventh switch, the tenth switch, or the thirteenth switch is turned on, and to turn on when the seventh switch, the tenth switch, and the thirteenth switch are all turned off.

In an optional embodiment, the switch control method further comprising: generating a fifth pulse signal and a sixth pulse signal, wherein the fifth pulse signal and the sixth pulse signal are periodic pulse signals with a same duty cycle and 180 degrees out of phase, controlling the twelfth switch with a complementary signal of the sixth pulse signal and controlling the eleventh switch with a complementary signal of the fifth pulse signal, when the output current is greater than the first current threshold, controlling the seventh switch, the tenth switch, and the thirteenth switch with the fifth pulse signal, and controlling the eighth switch, the ninth switch, and the fourteenth switch with the sixth pulse signal, and wherein based on the fifth pulse signal, a first fifth selection signal, a second fifth selection signal, and a third fifth selection signal are generated, and wherein frequencies of the first fifth selection signal, the second fifth selection signal, and the third fifth selection signal are equal to ⅓ of that of the fifth pulse signal, and the first fifth selection signal, the second fifth selection signal, and the third fifth selection signal are sequentially phase-shifted by 120 degrees and have a duty cycle of ⅔, based on the sixth pulse signal, a first sixth selection signal, a second sixth selection signal, and a third sixth selection signal are generated, and wherein frequencies of the first sixth selection signal, the second sixth selection signal, and the third sixth selection signal are equal to ⅓ of that of the sixth pulse signal, and the first sixth selection signal, the second sixth selection signal, and the third sixth selection signal are sequentially phase-shifted by 120 degrees and have a duty cycle of ⅔, and when the output current is less than the first current threshold, controlling the seventh switch with a logical AND operation result of the fifth pulse signal and the complementary signal of the first sixth selection signal, controlling the eighth switch with a logical AND operation result of the sixth pulse signal and the complementary signal of the first fifth selection signal, controlling the thirteenth switch with a logical AND operation result of the fifth pulse signal and the complementary signal of the second sixth selection signal, controlling the ninth switch with a logical AND operation result of the sixth pulse signal and the complementary signal of the second fifth selection signal, controlling the tenth switch with a logical AND operation result of the fifth pulse signal and the complementary signal of the third sixth selection signal, and controlling the fourteenth switch with a logical AND operation result of the sixth pulse signal and the complementary signal of the third fifth selection signal.

In an optional embodiment, the switched capacitor unit comprises a fifteenth switch, a sixteenth switch, a seventeenth switch, an eighteenth switch, a nineteenth switch, a twentieth switch, a third input capacitor, an eighth capacitor, a ninth capacitor, and a tenth capacitor. The freewheeling unit further comprises a twenty-first switch, a twenty-second switch, a twenty-third switch, a third output capacitor, a fifth inductor, a sixth inductor, and a seventh inductor. The switched capacitor unit and the freewheeling unit are connected to a fifth switch node, a sixth switch node, and a seventh switch node. A third terminal of the fifteenth switch is connected to an input power supply, a third terminal of the seventeenth switch, a third terminal of the nineteenth switch, and a first terminal of the third input capacitor. A second terminal of the fifteenth switch is connected to a third terminal of the sixteenth switch and a first terminal of the eighth capacitor. A second terminal of the sixteenth switch is connected to a third terminal of the twenty-first switch, a second terminal of the tenth capacitor, and a first terminal of the fifth inductor at the fifth switch node. A second terminal of the seventeenth switch is connected to a third terminal of the eighteenth switch and a first terminal of the ninth capacitor. A second terminal of the eighteenth switch is connected to a second terminal of the eighth capacitor, a third terminal of the twenty-second switch, and a first terminal of the sixth inductor at the sixth switch node. A second terminal of the nineteenth switch is connected to a first terminal of the tenth capacitor and a third terminal of the twentieth switch. A second terminal of the twentieth switch is connected to a third terminal of the twenty-third switch, a second terminal of the ninth capacitor, and a first terminal of the seventh inductor at the seventh switch node. A second terminal of the fifth inductor is connected to a second terminal of the sixth inductor, a second terminal of the seventh inductor, and a first terminal of the third output capacitor. A second terminal of the third input capacitor, a second terminal of the third output capacitor, a second terminal of the twenty-first switch, a second terminal of the twenty-second switch, and a second terminal of the twenty-third switch are all grounded.

In an optional embodiment, the switch control method further comprising: when the output current is greater than the first current threshold, controlling a seventh switch group comprising the fifteenth switch and the eighteenth switch, an eighth switch group comprising the seventeenth switch and the twentieth switch, and a ninth switch group comprising the nineteenth switch and the sixteenth switch, to be turned on and off with a same duty cycle and a phase-shift of 120 degrees, controlling the twenty-first switch and the ninth switch group to alternately turn on and off in a complementary manner, controlling the twenty-second switch and the seventh switch group to alternately turn on and off in a complementary manner, controlling the twenty-third switch and the eighth switch group to alternately turn on and off in a complementary manner. When the output current is less than the first current threshold, controlling the fifteenth switch, the seventeenth switch, the nineteenth switch, the sixteenth switch, the eighteenth switch, and the twentieth switch to be individually turned on sequentially with a same duty cycle, controlling the twenty-first switch to turn off when the sixteenth switch or the nineteenth switch is turned on, and to turn on when both the sixteenth switch and the nineteenth switch are turned off, controlling the twenty-second switch to turn off when the fifteenth switch or the eighteenth switch is turned on, and to turn on when both the fifteenth switch and the eighteenth switch are turned off, and controlling the twenty-third switch to turn off when the seventeenth switch or the twentieth switch is turned on, and to turn on when both the seventeenth switch and the twentieth switch are turned off.

In an optional embodiment, the switch control method further comprising: generating a seventh pulse signal, an eighth pulse signal, and a ninth pulse signal, wherein the seventh pulse signal, the eighth pulse signal, and the ninth pulse signal are periodic pulse signals with a same duty cycle and a phase-shift of 120 degrees, controlling the twenty-first switch with a complementary signal of the ninth pulse signal, controlling the twenty-second switch with a complementary signal of the seventh pulse signal, and controlling the twenty-third switch with a complementary signal of the eighth pulse signal, when the output current is greater than the first current threshold, controlling the fifteenth switch and the eighteenth switch with the seventh pulse signal, controlling the seventeenth switch and the twentieth switch with the eighth pulse signal, and controlling the sixteenth switch and the nineteenth switch with the ninth pulse signal, and wherein a seventh selection signal is generated based on the seventh pulse signal, and wherein a frequency of the seventh selection signal is equal to one half of that the seventh pulse signal, and a duty cycle of the seventh selection signal is equal to ½, an eighth selection signal is generated based on the eighth pulse signal, wherein a frequency of the eighth selection signal is equal to one half of that of the eighth pulse signal, and a duty cycle of the eighth selection signal is equal to ½, a ninth selection signal is generated based on the ninth pulse signal, wherein a frequency of the ninth selection signal is equal to one half of that of the ninth pulse signal, and a duty cycle of the ninth selection signal is equal to ½, and when the output current is less than the first current threshold, controlling the fifteenth switch with a logical AND operation result of the seventh pulse signal and the complementary signal of the ninth selection signal, controlling the seventeenth switch with a logical AND operation result of the eighth pulse signal and the seventh selection signal, controlling the nineteenth switch with a logical AND operation result of the ninth pulse signal and the eighth selection signal, controlling the sixteenth switch with a logical AND operation result of the ninth pulse signal and the ninth selection signal, controlling the eighteenth switch with a logical AND operation result of the seventh pulse signal and the complementary signal of the seventh selection signal, and controlling the twentieth switch with a logical AND operation result of the eighth pulse signal and the complementary signal of the eighth selection signal.

On another aspect, the present application provides a hybrid voltage converter comprising a switched capacitor unit and a freewheeling unit connected to the switched capacitor unit, and a controller, the controller being connected to the switches in the switched capacitor unit and the switches in the freewheeling unit, the controller being configured to control the switches in the switched capacitor unit and the switches in the freewheeling unit to turn on and off. The controller comprises at least one processor and a memory connected to at least one processor for communication, the memory storing instructions that can be executed by at least one processor, wherein the instructions are executed by at least one processor to enable the at least one processor to perform the method as described above.

In an optional manner, the controller is further configured to output an enable signal and control the enable signal to be in a high state when the output current of the hybrid voltage converter is greater than the first current threshold, and to control the enable signal to be in a low state when the output current is less than the first current threshold.

In an optional manner, the hybrid voltage converter further comprises a first D flip-flop, a second D flip-flop, a first NAND gate, a second NAND gate, a third NAND gate, a fourth NAND gate, a first AND gate, a second AND gate, a third AND gate, a fourth AND gate, a first NOT gate, a second NOT gate, a third NOT gate, and a fourth NOT gate. The switched capacitor unit comprises a first switch, a second switch, a third switch, a fourth switch, a first input capacitor, a first capacitor, a second capacitor, and a third capacitor. The freewheeling unit comprises a fifth switch, a sixth switch, a first output capacitor, a first inductor and a second inductor. A third terminal of the first switch is connected to an input power supply and a first terminal of the first input capacitor. A second terminal of the first switch is connected to a third terminal of the second switch and a first terminal of the first capacitor. A second terminal of the second switch is connected to a first terminal of the second capacitor and a third terminal of the third switch. A second terminal of the third switch is connected to a third terminal of the fourth switch and a first terminal of the third capacitor. A second terminal of the fourth switch is connected to a third terminal of the fifth switch, a second terminal of the second capacitor, and a first terminal of the second inductor. A third terminal of the sixth switch is connected to a second terminal of the first capacitor, a second terminal of the third capacitor, and a first terminal of the first inductor. A second terminal of the first inductor is connected to a second terminal of the second inductor and a first terminal of the first output capacitor. A second terminal of the first input capacitor, a second terminal of the fifth switch, a second terminal of the sixth switch and a second terminal of the first output capacitor are all grounded. An output of the first AND gate is connected to a first terminal of the first switch. A first input of the first AND gate, a first input of the third AND gate, an input of the third NOT gate, and a clock input of the second D flip-flop all receive a first pulse signal generated by the controller. An output of the third NOT gate is connected to a first terminal of the sixth switch. A second input of the first AND gate is connected to an output of the first NAND gate. A second input of the first NAND gate is connected to an input of the first NOT gate and an output of the first D flip-flop. A first input of the first NAND gate, a first input of the second NAND gate, a first input of the third NAND gate, and a first input of the fourth NAND gate all receive the enable signal. A signal input and a complementary output of the first D flip-flop are connected. A clock input of the first D flip-flop, an input of the fourth NOT gate, a first input of the second AND gate, and a first input of the fourth AND gate all receives a second pulse signal generated by the controller. An output of the fourth NOT gate is connected to a first terminal of the fifth switch. An output of the second AND gate is connected to a first terminal of the second switch. A second input of the second AND gate is connected to an output of the second NAND gate. A second input of the second NAND gate is connected to an output of the second NOT gate. A second input of the third NAND gate is connected to an output of the first NOT gate. An input of the second NOT gate is connected to a second input of the fourth NAND gate and an output of the second D flip-flop. A signal input and a complementary output of the second D flip-flop are connected together. An output of the third AND gate is connected to a first terminal of the third switch. A second input of the third AND gate is connected to an output of the third NAND gate. An output of the fourth AND gate is connected to a first terminal of the fourth switch. A second input of the fourth AND gate is connected to an output of the fourth NAND gate.

In an optional manner, the switched capacitor unit comprises a seventh switch, an eighth switch, a ninth switch, a tenth switch, a second input capacitor, a fourth capacitor, and a fifth capacitor. The freewheeling unit comprises an eleventh switch, a twelfth switch, a third inductor, a fourth inductor, and a second output capacitor. A third terminal of the seventh switch is connected to an input power supply, a first terminal of the second input capacitor, and a third terminal of the ninth switch. A second terminal of the seventh switch is connected to a third terminal of the eighth switch and a first terminal of the fourth capacitor. A second terminal of the eighth switch is connected to a third terminal of the eleventh switch, a second terminal of the fifth capacitor, and a first terminal of the fourth inductor. A second terminal of the ninth switch is connected to a first terminal of the fifth capacitor and a third terminal of the tenth switch. A second terminal of the tenth switch is connected to a second terminal of the fourth capacitor, a third terminal of the twelfth switch, and a first terminal of the third inductor. A second terminal of the third inductor is connected to a second terminal of the fourth inductor and a first terminal of the second output capacitor. A second terminal of the second input capacitor, a second terminal of the eleventh switch, a second terminal of the twelfth switch, and a second terminal of the second output capacitor are all grounded.

In an optional manner, the hybrid voltage converter further comprises a third D flip-flop, a fourth D flip-flop, a fifth NAND gate, a sixth NAND gate, a seventh NAND gate, an eighth NAND gate, a fifth AND gate, a sixth AND gate, a seventh AND gate, an eighth AND gate, a fifth NOT gate, a sixth NOT gate, a seventh NOT gate, and an eighth NOT gate. An output terminal of the fifth AND gate is connected to a first terminal of the seventh switch. A first input terminal of the fifth AND gate, a first input terminal of the seventh AND gate, an input terminal of the seventh NOT gate, and a clock input terminal of the fourth D flip-flop all receive a third pulse signal generated by the controller. An output terminal of the seventh NOT gate is connected to the first terminal of the twelfth switch. A second input terminal of the fifth AND gate is connected to an output terminal of the fifth NAND gate. A second input terminal of the fifth NAND gate is connected to an output terminal of the third D flip-flop and an input terminal of the fifth NOT gate. An output terminal of the fifth NOT gate is connected to a second input terminal of the seventh NAND gate. A first input terminal of the fifth NAND gate, a first input terminal the sixth NAND gate, a first input terminal the seventh NAND gate, and a first input terminal the eighth NAND gate all receive the enable signal. A signal input terminal and an inverted output terminal of the third D flip-flop are connected together. A clock input terminal of the third D flip-flop, an input terminal of the eighth NOT gate, a first input terminal of the sixth AND gate, and a first input terminal of the eighth AND gate all receive a fourth pulse signal generated by the controller. An output terminal of the eighth NOT gate is connected to a first terminal of the eleventh switch. An output terminal of the sixth AND gate is connected to a first terminal of the eighth switch. A second input terminal of the sixth AND gate is connected to an output terminal of the sixth NAND gate. A second input terminal of the sixth NAND gate is connected to an output terminal of the sixth NOT gate. An input terminal of the sixth NOT gate is connected to a second input terminal of the eighth NAND gate and an output terminal of the fourth D flip-flop. A first output terminal of the seventh AND gate is connected to a first terminal of the tenth switch. A second input terminal of the seventh AND gate is connected to an output terminal of the seventh NAND gate. An output terminal of the eighth AND gate is connected to a first terminal of the ninth switch. A second input terminal of the eighth AND gate is connected to an output terminal of the eighth NAND gate.

In an optional manner, the switched capacitor unit further comprises a thirteenth switch, a fourteenth switch, a sixth capacitor, and a seventh capacitor. The hybrid voltage converter further comprises a fifth D flip-flop, a sixth D flip-flop, a seventh D flip-flop, an eighth D flip-flop, a ninth NAND gate, a tenth NAND gate, an eleventh NAND gate, a twelfth NAND gate, a thirteenth NAND gate, a fourteenth NAND gate, a ninth AND gate, a tenth AND gate, an eleventh AND gate, a twelfth AND gate, a thirteenth AND gate, a fourteenth AND gate, a fifteenth AND gate, a sixteenth AND gate, a first OR gate, a second OR gate, a ninth NOT gate, and a tenth NOT gate. A third terminal of the thirteenth switch is connected to a first terminal of the sixth capacitor and a second terminal of the eighth switch. A second terminal of the thirteenth switch is connected to a second terminal of the seventh capacitor, a third terminal of the eleventh switch and a first terminal of the third inductor. A third terminal of the fourteenth switch is connected to a first terminal of the seventh capacitor and a second terminal of the tenth switch. A second terminal of the fourteenth switch is connected to a second terminal of the sixth capacitor, a third terminal of the twelfth switch and a first terminal of the fourth inductor. An output terminal of the ninth AND gate is connected to a first terminal of the seventh switch. A first input terminal of the ninth AND gate, a first input terminal of the eleventh AND gate, a first input terminal of the thirteenth AND gate, an input terminal of the ninth NOT gate, a clock input terminal of the seventh D flip-flop, and a clock input terminal of the eighth D flip-flop all receive a fifth pulse signal generated by the controller. An output terminal of the ninth NOT gate is connected to a first terminal of the eleventh switch. A second input terminal of the ninth AND gate is connected to an output terminal of the ninth NAND gate. A first input terminal of the ninth NAND gate, a first input terminal of the tenth NAND gate, a first input terminal of the eleventh NAND gate, a first input terminal of the twelfth NAND gate, a first input terminal of the thirteenth NAND gate, and a first input terminal of the fourteenth NAND gate all receive the enable signal. A second input terminal of the ninth NAND gate is connected to an output terminal of the first OR gate. A first input terminal of the first OR gate is connected to an output terminal of the sixth D flip-flop. An inverted output terminal of the sixth D flip-flop is connected to a first input terminal of the fifteenth AND gate and a second input terminal of the thirteenth NAND gate. A signal input terminal of the sixth D flip-flop is connected to a second input terminal of the first OR gate and an output terminal of the fifth D flip-flop. An inverted output terminal of the fifth D flip-flop is connected to a second input terminal of the fifteenth AND gate and a second input terminal of the eleventh NAND gate. A signal input terminal of the fifth D flip-flop is connected to an output terminal of the fifteenth AND gate. A clock input terminal of the fifth D flip-flop, a clock input terminal of the sixth D flip-flop, an input terminal of the tenth NOT gate, a first input terminal of the tenth AND gate, a first input terminal of the twelfth AND gate, and a first input terminal of the fourteenth AND gate all receive a sixth pulse signal generated by the controller. An output terminal of the tenth NOT gate is connected to a first terminal of the twelfth switch. An output terminal of the tenth AND gate is connected to a first terminal of the eighth switch. A second input terminal of the tenth AND gate is connected to an output terminal of the tenth NAND gate. A second input terminal of the tenth NAND gate is connected to a second input terminal of the sixteenth AND gate and an inverted output terminal of the seventh D flip-flop. A first input terminal of the sixteenth AND gate is connected to a second input terminal of the twelfth NAND and an inverted output terminal of the eighth D flip-flop. An output terminal of the sixteenth AND gate is connected to an input terminal of the seventh D flip-flop. An output terminal of the eighth D flip-flop is connected to a first input terminal of the second OR gate. An input terminal of the eighth D flip-flop is connected to a second input terminal of the second OR gate and an output of the seventh D flip-flop. An output terminal of the second OR gate is connected to a second input terminal of the fourteenth NAND gate. An output terminal of the eleventh NAND gate is connected to a second input terminal of the eleventh AND gate. An output terminal of the eleventh AND gate is connected to a first terminal of the thirteenth switch. An output terminal of the twelfth NAND gate is connected to a second input terminal of the twelfth AND gate. An output terminal of the twelfth AND gate is connected to a first terminal of the ninth switch. An output terminal of the thirteenth NAND gate is connected to a second input terminal of the thirteenth AND gate. An output terminal of the thirteenth AND gate is connected to a first terminal of the tenth switch. An output terminal of the fourteenth NAND gate is connected to a second input terminal of the fourteenth AND gate. An output terminal of the fourteenth AND gate is connected to a first terminal of the fourteenth switch.

In an optional embodiment, the hybrid voltage converter comprises a ninth D flip-flop, a tenth D flip-flop, an eleventh D flip-flop, a fifteenth NAND gate, a sixteenth NAND gate, a seventeenth NAND gate, an eighteenth NAND gate, a nineteenth NAND gate, a twentieth NAND gate, a seventeenth AND gate, an eighteenth AND gate, a nineteenth AND gate, a twentieth AND gate, a twenty-first AND gate, a twenty-second AND gate, an eleventh NOT gate, a twelfth NOT gate, a thirteenth NOT gate, a fourteenth NOT gate, a fifteenth NOT gate, and a sixteenth NOT gate; the switched capacitor unit comprises a fifteenth switch, a sixteenth switch, a seventeenth switch, an eighteenth switch, a nineteenth switch, a twentieth switch, a third input capacitor, an eighth capacitor, a ninth capacitor, and a tenth capacitor. The freewheeling unit further comprises a twenty-first switch, a twenty-second switch, a twenty-third switch, a third output capacitor, a fifth inductor, a sixth inductor, and a seventh inductor. A third terminal of the fifteenth switch is connected to an input power source, a third terminal of the seventeenth switch, a third terminal of the nineteenth switch and a first terminal of the third input capacitor. A second terminal of the fifteenth switch is connected to a third terminal of the sixteenth switch and a first terminal of the eighth capacitor. A second terminal of the sixteenth switch is connected to a third terminal of the twenty-first switch, a second terminal of the tenth capacitor and a first terminal of the fifth inductor. A second terminal of the seventeenth switch is connected to a third terminal of the eighteenth switch and a first terminal of the ninth capacitor. A second terminal of the eighteenth switch is connected to a second terminal of the eighth capacitor, a third terminal of the twenty-second switch, and a first terminal of the sixth inductor. A second terminal of the nineteenth switch is connected to a first terminal of the tenth capacitor and a third terminal of the twentieth switch. A second terminal of the twentieth switch is connected to a third terminal of the twenty-third switch, a second terminal of the ninth capacitor and a first terminal of the seventh inductor. A second terminal of the fifth inductor is connected to a second terminal of the sixth inductor, a second terminal of the seventh inductor and a first terminal of the third output capacitor. A second terminal of the third input capacitor, a second terminal of the third output capacitor, a second terminal of the twenty-first switch, a second terminal of the twenty-second switch and a second terminal of the twenty-third switch are all grounded. An output terminal of the seventeenth AND gate is connected to a first terminal of the fifteenth switch. A first input terminal of the seventeenth AND gate, a first input terminal of the twenty-first AND gate, an input terminal of the fifteenth NOT gate, and a clock input terminal of the tenth D flip-flop all receive a seventh pulse signal from the controller. An output terminal of the fifteenth NOT gate is connected to a first terminal of the twenty-second switch. A second input terminal of the seventeenth AND gate is connected to an output terminal of the fifteenth NAND gate. A second input terminal of the fifteenth NAND gate is connected to an input terminal of the eleventh NOT gate and an output terminal of the ninth D flip-flop. An output terminal of the eleventh NOT gate is connected to a second input terminal of the eighteenth NAND gate. An inverted output terminal of the ninth D flip-flop is connected to a signal input terminal of the ninth D flip-flop. A clock input terminal of the ninth D flip-flop, an input terminal of the sixteenth NOT gate, a first input terminal of the nineteenth AND gate and a first input terminal of the twentieth AND gate all receive a ninth pulse signal from the controller. An output terminal of the sixteenth NOT gate is connected to a first terminal of the twenty-first switch. A first input terminal of the fifteenth NAND gate, a first input terminal of the sixteenth NAND gate, a first input terminal of the seventeenth NAND gate, a first input terminal of the eighteenth NAND gate, a first input terminal of the nineteenth NAND gate and a first input terminal of the twentieth NAND gate all receive the enable signal. An output terminal of the eighteenth AND gate is connected to a first terminal of the seventeenth switch. A first input terminal of the eighteenth AND gate, a first input terminal of the twenty-second AND gate, an input terminal of the fourteenth NOT gate and a clock input terminal of the eleventh D flip-flop all receive an eighth pulse signal from the controller. An output terminal of the fourteenth NOT gate is connected to a first terminal of the twenty-third switch. A second input terminal of the eighteenth AND gate is connected to an output terminal of the sixteenth NAND gate. A second input terminal of the sixteenth NAND gate is connected to an output terminal of the twelfth NOT gate. An input terminal of the twelfth NOT gate is connected to a second input terminal of the nineteenth NAND gate and an output terminal of the tenth D flip-flop. An inverted output terminal of the tenth D flip-flop is connected to a signal input terminal of the tenth D flip-flop. An output terminal of the nineteenth AND gate is connected to a first terminal of the nineteenth switch. A second input terminal of the nineteenth AND gate is connected to an output terminal of the seventeenth NAND gate. A second input terminal of the seventeenth NAND gate is connected to an output terminal of the thirteenth NOT gate. An input terminal of the thirteenth NOT gate is connected to a second input terminal of the twentieth NAND gate and an output terminal of the eleventh D flip-flop. An inverted output terminal of the eleventh D flip-flop is connected to a signal input terminal of the eleventh D flip-flop. An output terminal of the twentieth AND gate is connected to a first terminal of the sixteenth switch. A second input terminal of the twentieth AND gate is connected to an output terminal of the eighteenth NAND gate. An output terminal of the twenty-first AND gate is connected to a first terminal of the eighteenth switch. A second input terminal of the twenty-first AND gate is connected to an output terminal of the nineteenth NAND gate. An output terminal of the twenty-second AND gate is connected to a first terminal of the twentieth switch. A second input terminal of the twenty-second AND gate is connected to an output terminal of the twentieth NAND gate.

The advantageous effects of the present application are: a switch control method provided by the present application, applied to a hybrid voltage converter comprising a switched capacitor unit and a freewheeling unit, wherein the switched capacitor unit and the freewheeling unit are connected at N switch nodes, where N is an integer greater than 1. The switch control method comprising: continuously obtaining the output current of the hybrid voltage converter, when the output current is greater than a first current threshold, controlling the switches in the hybrid voltage converter to operate in a parallel conduction mode; when the output current is less than the first current threshold, controlling the switches in the hybrid voltage converter to operate in a sequential conduction mode. When the switches in the hybrid voltage converter operate in a parallel conduction mode, N switch groups in the switched capacitor unit are controlled to alternatively turn on with the same duty cycle and phase-shifted by (360/N) degrees, and any switch group comprises at least two switches. Each switch in the freewheeling unit corresponds to a switch group in the switched capacitor unit, and the switches in the freewheeling unit turn on and off in a complementary manner with their corresponding switch groups in the switched capacitor unit. When the switches in the hybrid voltage converter operate in a sequential conduction mode, each switch in the switched capacitor unit is controlled to turn on individually with the same duty cycle, and the switches in the freewheeling unit turn off when any switch in the corresponding switch group in the switched capacitor unit is turned on and to turn off when all switches in the corresponding switch group in the switched capacitor unit are turn off. Thus, by adopting the parallel conduction mode when the output current is large and the sequential conduction mode when the output current is small, the power conversion efficiency of the hybrid voltage converter can be improved.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

One or more embodiments are exemplarily illustrated with corresponding images in the accompanying drawings. These illustrative explanations do not limit the embodiments, and elements with the same reference numerals in the drawings represent similar elements unless otherwise specified. The drawings are not to scale unless specifically stated.

FIG. 4 is a flowchart of a switch control method based on the circuit shown in FIG. 3;

FIG. 5 is a flowchart of a switch control method based on the circuit shown in FIG. 3;

FIG. 8 is a flowchart of a switch control method based on the circuit shown in FIG. 7;

FIG. 9 is the flowchart of the switch control method based on the circuit shown in FIG. 7;

FIG. 12 is a flowchart of a switch control method based on the circuit shown in FIG. 11;

FIG. 16 is a flowchart of a switch control method based on the circuit shown in FIG. 15;

FIG. 17 is a flowchart of a switch control method based on the circuit shown in FIG. 15;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

To make the objectives, technical solutions, and advantages of the embodiments of the present application clearer, the embodiments will be described in detail with reference to the accompanying drawings. Obviously, the described embodiments are only part of the embodiments of the present application, not all embodiments. Based on the embodiments in the present application, all other embodiments obtained by those skilled in the art without creative work are within the scope of protection of the present application.

Figure 1:
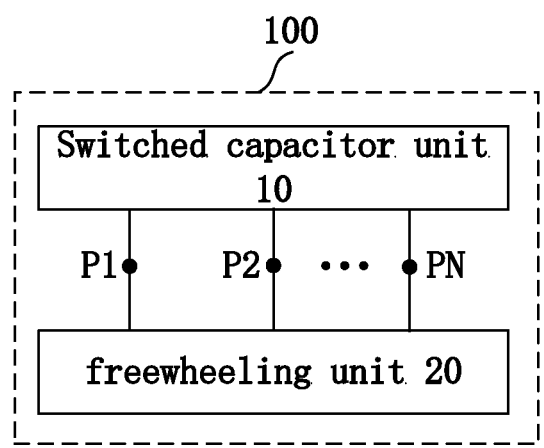
FIG. 1 is a schematic diagram of a hybrid voltage converter provided in an embodiment of the present application.

Please refer to FIG. 1. FIG. 1 is a schematic diagram of a hybrid voltage converter 100 provided in an embodiment of the present application. The hybrid voltage converter is a type of power converter that can convert an input voltage into different output voltages. The hybrid voltage converter is typically composed of multiple power conversion units, including power conversion units with capacitors as energy storage elements and power conversion units with inductors as energy storage elements, thereby efficiently achieving a regulated output at various voltage conversion ratios.

As shown in FIG. 1, the hybrid voltage converter 100 comprises a switched capacitor unit 10 and a freewheeling unit 20. The switched capacitor unit 10 and the freewheeling unit 20 are connected at N switch nodes, where N is an integer greater than 1. The N switch nodes comprise the first switch node P1, the second switch node P2, and so on, up to the Nth switch node PN.

In the switched capacitor unit 10, capacitors are used as energy storage elements. The switched capacitor unit 10 achieves voltage conversion by periodically turning the switches on and off to alter the series and parallel connections of capacitors, thereby realizing voltage transformation through the capacitor's charging and discharging processes. The freewheeling unit 20 employs inductors as energy storage elements. It controls the variation of the current in the inductor by periodically turning the switches on and off. The precise adjustment of the output voltage of the hybrid voltage converter 100 is achieved by controlling the duty cycle of the conducting switches. The combination of the freewheeling unit 20 and the switched capacitor unit 10 enables efficient power conversion and achieve an adjustable regulated output with a high step-down ratio.

The hybrid voltage converter 100 further comprises a controller 30. The controller 30 is connected to the switches in the switched capacitor unit 10 and the freewheeling unit 20. The controller 30 is responsible for controlling the conduction states of the switches in both the switched capacitor unit 10 and the freewheeling unit 20.

In some embodiments, the controller 30 may be a general-purpose processor, a digital signal processor (DSP), an application-specific integrated circuit (ASIC), a field-programmable gate array (FPGA), a microcontroller, ARM (Acorn RISC Machine), or other programmable logic devices, discrete gates or transistor logic, discrete hardware components, or any combination thereof. Additionally, the controller 30 can be any conventional processor, controller, microcontroller, or state machine. The controller 30 may also be implemented as a combination of computing devices, such as a combination of DSP and microprocessor, multiple microprocessors, one or more microprocessors combined with DSP, and/or any other such configuration.

For the sake of simplicity, the connections between the controller 30 and each switch in subsequent embodiments will not be explicitly shown.

Figure 2:
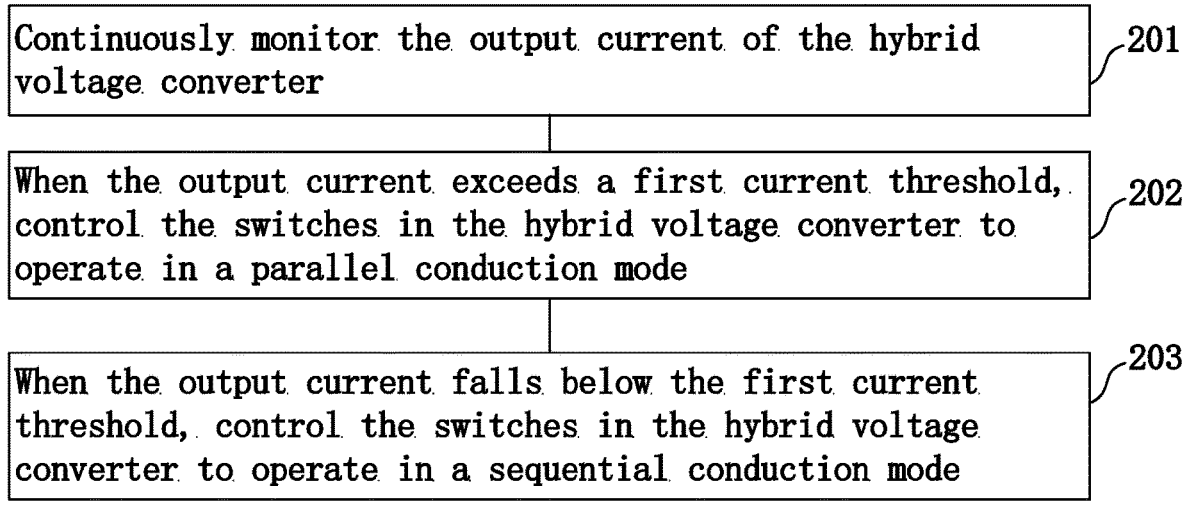
FIG. 2 is a flowchart of a switch control method provided in an embodiment of the present application.

Please refer to FIG. 2. FIG. 2 is a flowchart of the switch control method provided in the present embodiment. This switch control method is applied to the hybrid voltage converter shown in FIG. 1. For detailed information on the structure of the hybrid voltage converter, please refer to the detailed description of FIG. 1, which will not be repeated here. As shown in FIG. 2, the switch control method comprises the following steps:

Step 201: continuously monitor the output current of the hybrid voltage converter.

Step 202: when the output current is greater than a first current threshold, control the switches in the hybrid voltage converter to operate in a parallel conduction mode.

Step 203: When the output current is less than the first current threshold, control the switches in the hybrid voltage converter to operate in a sequential conduction mode.

The first current threshold is a pre-set current value, which can be set according to the actual application situation. This embodiment does not impose specific restrictions on it.

In some embodiments, the first current threshold can also be a current range to achieve hysteresis control. For example, when the switches in the hybrid voltage converter are operating in a sequential conduction mode and the output current increases to above the upper limit of the first current threshold, the switches in the hybrid voltage converter are controlled to operate in a parallel conduction mode. When the switches in the hybrid voltage converter are operating in a parallel conduction mode and the output current decreases to below the lower limit of the first current threshold, the switches in the hybrid voltage converter are controlled to operate in a sequential conduction mode. The upper and lower limits of the first current threshold can be set according to the actual application situation. This embodiment does not impose specific restrictions on it.

In the parallel conduction mode of the switches in the hybrid voltage converter 100, N switch groups in the switched capacitor unit 10 are turned on and off with the same duty cycle and phase-shifted by (360/N) degrees, and each switch group comprises at least two switches. Each switch in the freewheeling unit 20 corresponds one-to-one to a switch group in the switched capacitor unit, and the switches in the freewheeling unit 20 and the corresponding switch groups in the switched capacitor unit turn on and off alternately in a complementary manner. In other words, if the switched capacitor unit 10 comprises N switch groups, then correspondingly the freewheeling unit 20 comprises N switches and each one of the N switches corresponds one-to-one to a switch group, and the corresponding switches and switch groups turns on and off alternately in a complementary manner.

When the switches in the hybrid voltage converter 100 operate in the sequential conduction mode, each switch in the switched capacitor unit 10 turns on individually and sequentially with the same duty cycle. Moreover, there is no specific restriction on the order in which each switch in the switched capacitor unit 10 is turned on, as long as one switch is conducted each time, and each switch in the unit turns on once in each cycle. The switches in the freewheeling unit turn off when any one switch in the corresponding switch group in the switched capacitor unit is turned on, and turn on when all the switches in the corresponding switch group in the switched capacitor unit are turned off. Similarly, if the switched capacitor unit 10 comprises N switch groups, then the freewheeling unit 20 comprises N switches, and each one of the N switches corresponds one-to-one to a switch group. Therefore, for the corresponding switch and switch group, the switch turns off when any one switch in the switch group is turned on, and turns on when all the switches in the switch group are turned off.

Through the above method, on the one hand, the parallel conduction mode is implemented when the output current is high. By simultaneously supplying power to the inductive energy storage elements in the freewheeling unit through multiple paths, the conduction loss of the switches in the hybrid voltage converter 100 is reduced, thereby improving the power conversion efficiency at high output currents. On the other hand, the sequential conduction mode is adopted when the output current is low. By reducing the number of switch cycles in each period, the switching loss of the switches in the switched capacitor unit of the hybrid voltage converter 100 is reduced, thereby improving the power conversion efficiency at low output currents.

In one embodiment, the switch control method further comprises the following step: after a transition between parallel conduction mode and sequential conduction mode, maintaining the control signal of each switch of the hybrid voltage converter to be derived from a same pulse-width modulation signal as before the transition.

Specifically, the transition between the parallel conduction mode and the sequential conduction mode comprises switching from the parallel conduction mode to the sequential conduction mode and switching from the sequential conduction mode to the parallel conduction mode. Although there is a mode switch, the pulse width modulation (PWM) signal used to generate the control signal for each switch in the hybrid voltage converter remains unchanged. Taking the example of a transition from the parallel conduction mode to the sequential conduction mode, before the transition, assuming the pulse width modulation signal generating the control signal for each switch in the hybrid voltage converter is the first pulse width modulation signal. After the transition from the parallel conduction mode to the sequential conduction mode, the control signal for each switch in the hybrid voltage converter continues to be generated based on the first pulse width modulation signal.

As a result, it can be seen that the transition between parallel conduction mode and sequential conduction mode does not cause a sudden change in the conduction duration (on time) of each switch in the hybrid voltage converter. Regarding the duty cycle, the transition between the parallel conduction mode and the sequential conduction mode brings about a change in the duty cycle of the switches in the switched capacitor unit 10 because the length of the switching period of the switches in the switched capacitor unit 10 varies. However, for the conduction duration of each switch, since the signal controlling each switch is generated from the same pulse width modulation signal and is only applied to the switch through logical operations with the selection signal to control whether it is applied in different modes (including the parallel conduction mode and the sequential conduction mode), the conduction duration of each switch remains unchanged in the cycle before and after the transition between the parallel conduction mode and the sequential conduction mode.

In one embodiment, the switch control method further comprises the following method steps: when the output current is less than a second current threshold, the hybrid voltage converter transitions from operating in the pulse width modulation mode to operating in the pulse frequency modulation mode and controls the switches in the hybrid voltage converter to remain in the sequential conduction mode.

The second current threshold is not greater than the first current threshold. The second current threshold is a predetermined current value, which can be set according to actual application conditions, and this application's embodiment does not specifically limit it. The second current threshold can also be a current range to achieve hysteresis control. For example, when the hybrid voltage converter is operating under the pulse width modulation mode and the output current decreases to a level below the lower limit of the second current threshold, the controller switches the hybrid voltage converter to operate under the pulse frequency modulation control mode. When the hybrid voltage converter is operating in the pulse frequency modulation control mode and the output current increases to a level above the upper limit of the second current threshold, the control switches the hybrid voltage converter to operate in the pulse width modulation control mode. The upper and lower limits of the second current threshold can be set according to actual application conditions, and this application's embodiment does not specifically limit it.

The Pulse Width Modulation (PWM) control mode is a method of controlling the output voltage or current by adjusting the duty cycle of the switching devices. In the PWM control mode, the switching devices switch at a fixed frequency, and the on/off time (pulse width) is adjusted in a certain way to achieve the desired output. The PWM control mode allows very precise control of the output voltage or current because the pulse width can be adjusted in small increments, and the waveform of the output voltage or current is generally stable in most cases. Additionally, the frequency of the PWM control mode is typically constant, which helps reduce the risk of Electromagnetic Interference (EMI).

The Pulse Frequency Modulation (PFM) control mode is a method of controlling the output voltage or current by adjusting the switching frequency of the switching devices. In the PFM control mode, the switching frequency varies with the load to maintain the stability of the output voltage or current. Under light loads, the PFM control mode can achieve higher efficiency because the switching frequency is lower, resulting in lower switching losses. The PFM control mode can also adapt more quickly to changes in load because the switching frequency can be adjusted as needed.

Specifically, as the current continues to decrease from the first current threshold and the hybrid voltage converter 100 switches from operating in the pulse width modulation control mode to the pulse frequency modulation control mode, the switching devices in the hybrid voltage converter 100 can be controlled to remain in the sequential conduction mode. This further enhances the power conversion efficiency of the hybrid voltage converter 100.

Figure 3:
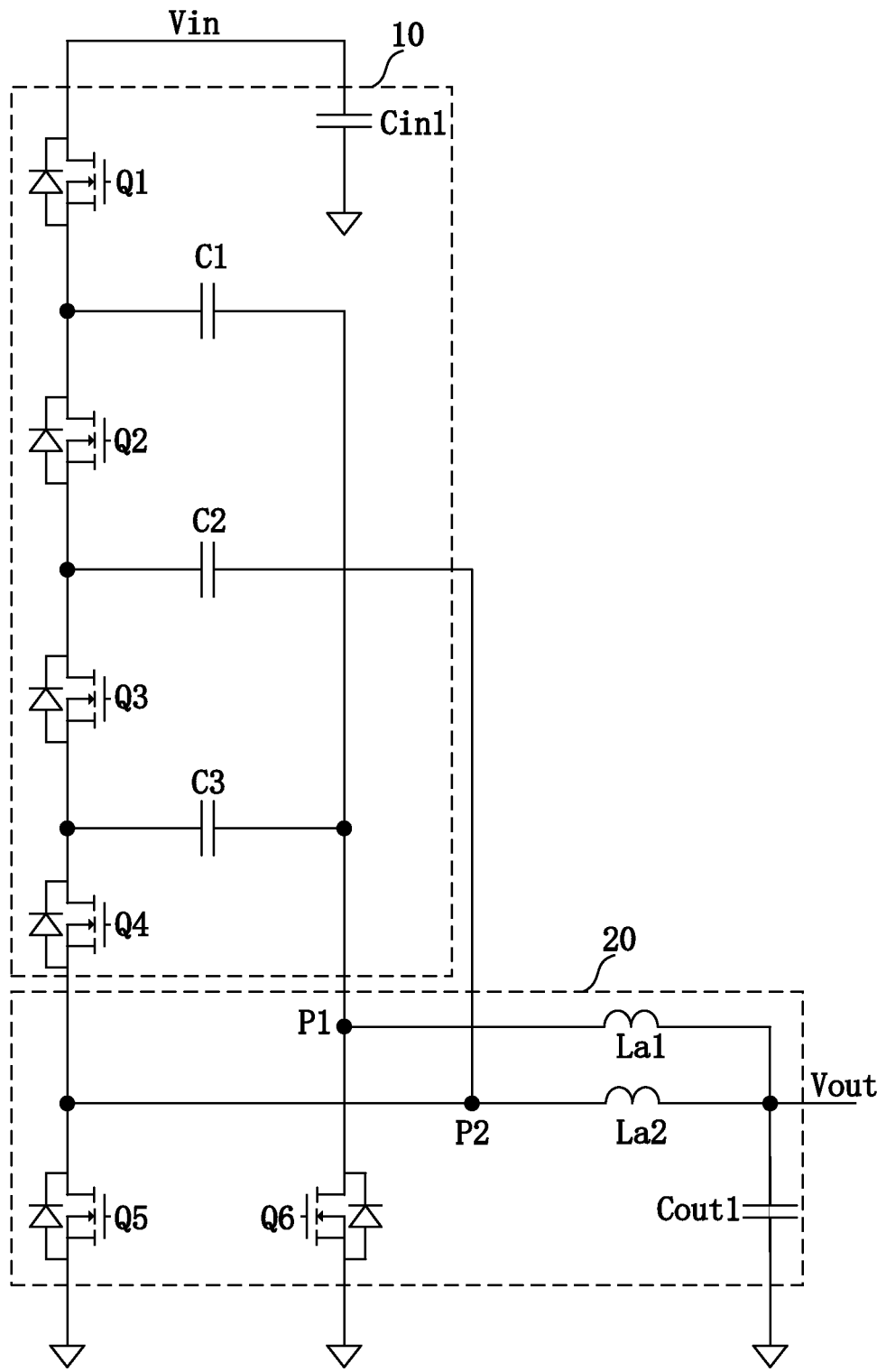
FIG. 3 is a schematic diagram of a circuit corresponding to the circuit shown in FIG. 1.

Please refer to FIG. 3. FIG. 3 illustrates a circuit example of the hybrid voltage converter 100. As shown in FIG. 3, the switched capacitor unit 10 comprises a first switch Q1, a second switch Q2, a third switch Q3, a fourth switch Q4, a first input capacitor Cin1, a first capacitor C1, a second capacitor C2, a third capacitor C3. The freewheeling unit 20 comprises a fifth switch Q5, a sixth switch Q6, a first output capacitor Cout1, a first inductor La1, and a second inductor La2. The switched capacitor unit 10 and the freewheeling unit 20 are connected at a first switch node P1 and a second switch node P2.

The third terminal of the first switch Q1 is connected to the input power source Vin and the first terminal of the first input capacitor Cin1. The second terminal of the first switch Q1 is connected to the third terminal of the second switch Q2 and the first terminal of the first capacitor C1. The second terminal of the second switch Q2 is connected to the first terminal of the second capacitor C2 and the third terminal of the third switch Q3. The second terminal of the third switch Q3 is connected to the third terminal of the fourth switch Q4 and the first terminal of the third capacitor C3. The second terminal of the fourth switch Q4 is connected to the third terminals of the fifth switch Q5, the second terminal of the second capacitor C2, and the first terminal of the second inductor La2 at the second switch node P2. The third terminal of the sixth switch Q6 is connected to the second terminal of the first capacitor C1, the second terminal of the third capacitor C3, and the first terminal of the first inductor La1 at the first switch node P1. The second terminal of the first inductor La1 is connected to the second terminal of the second inductor La2 and the first terminal of the first output capacitor Cout1. The second terminal of the first input capacitor Cin1, the second terminal of the fifth switch Q5, the second terminal of the sixth switch Q6, and the second terminal of the first output capacitor Cout1 are all grounded.

In one embodiment, as shown in FIG. 4 for the circuit shown in FIG. 3, the switch control method comprises the following steps:

Step 401: when the output current is greater than the first current threshold, control the first switch group, which comprises the first switch and the third switch, and the second switch group, which comprises the second switch and the fourth switch, to turn on and off with the same duty cycle but with a phase shift of 180 degrees; control the fifth switch to turn on and off in a complementary manner with the second switch group; control the sixth switch to turn on and off in a complementary manner with the first switch group.

Step 402: when the output current is less than the first current threshold, control the first switch, the second switch, the third switch, and the fourth switch to turn on individually and sequentially with the same duty cycle; control the fifth switch to turn off when the second switch or the fourth switch is turned on, and to turn on when both the second switch and the fourth switch are turned off (i.e., the fifth switch turns off when any one switch in the second switch group is turned on and turns on when all switches in the second switch group are turned off); control the sixth switch to turn off when the first switch or the third switch is turned on, and to turn on when both the first switch and the third switch are turned off (i.e., the sixth switch turns off when any one switch in the first switch group is turned on and turns on when all switches in the first switch group are turned off).

In this embodiment, N is equal to 2. N switch groups comprise the first switch group and the second switch group. The fifth switch corresponds to the second switch group, and the sixth switch corresponds to the first switch group.

Furthermore, in another embodiment, the present application provides a specific implementation to achieve the steps shown in FIG. 4. Specifically, as shown in FIG. 5, the switch control method further comprises the following steps:

Step 501: generate a first pulse signal and a second pulse signal. The first pulse signal and the second pulse signal are periodic pulse signals with the same duty cycle and a phase difference of 180 degrees.

Step 502: control the sixth switch by the complementary signal of the first pulse signal and control the fifth switch by the complementary signal of the second pulse signal.

Step 503: when the output current is greater than the first current threshold, control the first switch and the third switch with the first pulse signal and control the second switch and the fourth switch with the second pulse signal.

Step 504: generate a first selection signal based on the first pulse signal, where the frequency of the first selection signal is half of the first pulse signal, and the duty cycle of the first selection signal is equal to ½.

Step 505: generate a second selection signal based on the second pulse signal, where the frequency of the second selection signal is half of the second pulse signal, and the duty cycle of the second selection signal is equal to ½.

Step 506: when the output current is less than the first current threshold, control the first switch by the logical AND operation result of the first pulse signal and the complementary signal of the second selection signal, control the second switch by the logical AND operation result of the second pulse signal and the first selection signal, control the third switch by the logical AND operation result of the first pulse signal and the second selection signal, and control the fourth switch by the logical AND operation result of the second pulse signal and the complementary signal of the first selection signal.

Figure 6:
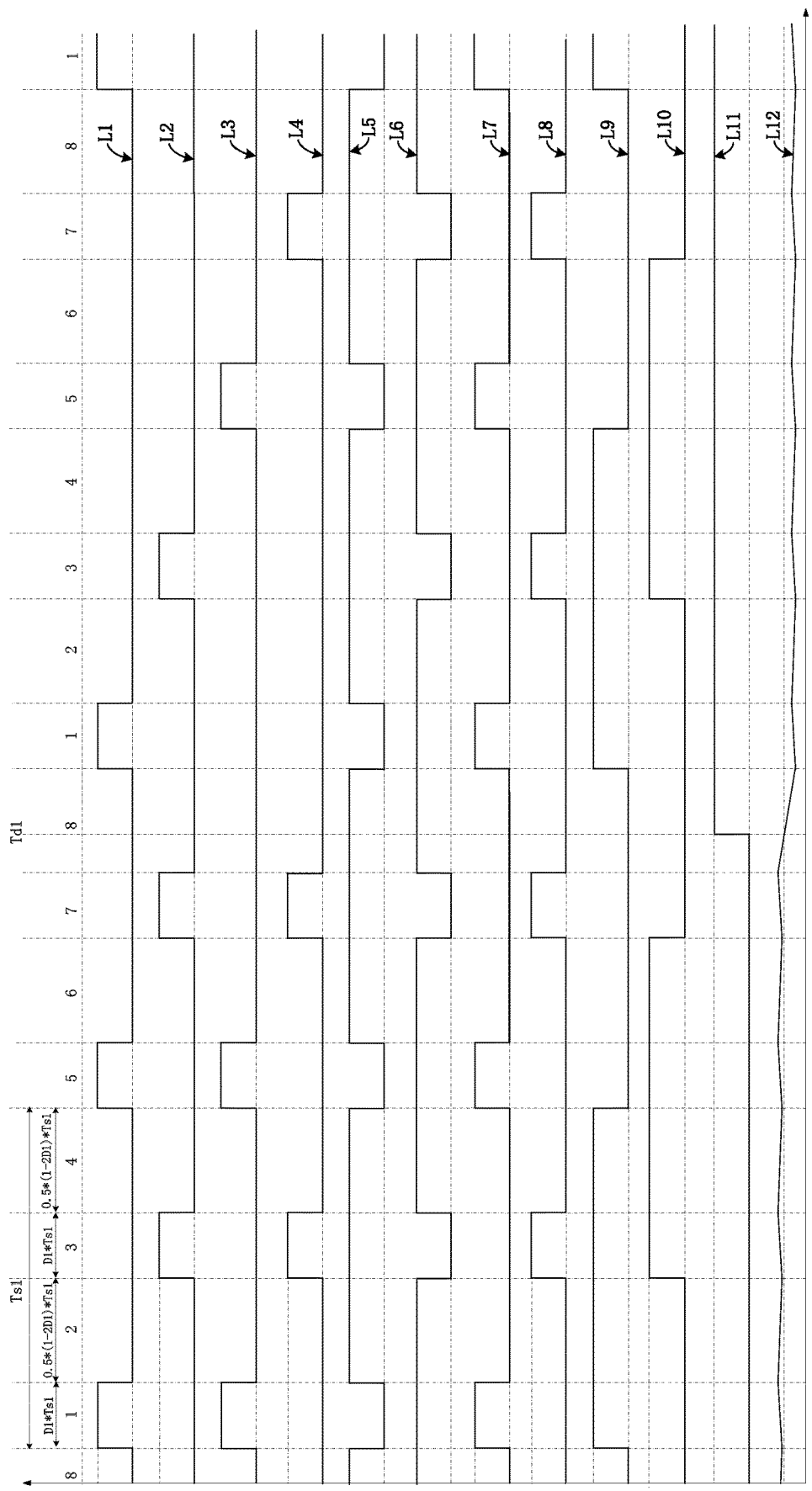
FIG. 6 is a schematic diagram of various signals in the circuit shown in FIG. 3.

Please refer to FIG. 6. FIG. 6 illustrates the signals under the control of the switch control method shown in FIG. 5 for the circuit shown in FIG. 3. In FIG. 6, Curve L1 represents the control signal of the first switch Q1; Curve L2 represents the control signal of the second switch Q2; Curve L3 represents the control signal of the third switch Q3; Curve L4 represents the control signal of the fourth switch Q4; Curve L5 represents the control signal of the sixth switch Q6; Curve L6 represents the control signal of the fifth switch Q5; Curve L7 represents the first pulse signal; Curve L8 represents the second pulse signal; Curve L9 represents the first selection signal; Curve L10 represents the second selection signal; Curve L11 represents the signal for switching between parallel conduction mode and sequential conduction mode; Curve L12 represents the output current. Additionally, D1 is the duty cycle of the first pulse signal; Ts1 is the period of the control signal of the first switch Q1 in sequential conduction control mode; Numbers 1-8 indicate 8 states under various conduction modes, including the parallel conduction mode and the sequential conduction mode; Td1 is the moment when the parallel conduction mode switches to the sequential conduction mode.

Specifically, before the moment Td1, the hybrid voltage converter 100 operates in the parallel conduction mode. The control signals of the first switch Q1 and the third switch Q3 are the same as the first pulse signal, while the control signals of the second switch Q2 and the fourth switch Q4 are the same as the second pulse signal. At this time, the output current is greater than the first current threshold, and turning on the first switch Q1 and the third switch Q3 simultaneously or turning on the second switch Q2 and the fourth switch Q4 simultaneously can achieve lower conduction losses by splitting the current.

At the moment Td1, due to the reduction in load, the output current decreases and becomes less than the first current threshold. The hybrid voltage converter 100 switches to operate in the sequential conduction mode, with the first switch Q1, the second switch Q2, the third switch Q3, and the fourth switch Q4 turning on sequentially. The switching mode of the fifth switch Q5 and the sixth switch Q6 remains unchanged. This allows for a reduction in the switching frequency of the first switch Q1, the second switch Q2, the third switch Q3, and the fourth switch Q4 while keeping the output voltage constant, achieving lower switching losses.

It should be noted that, as shown in the waveform diagram in FIG. 6, although the control methods of the first switch Q1, the second switch Q2, the third switch Q3, and the fourth switch Q4 in the hybrid voltage converter 100 have changed, the switching modes of the fifth switch Q5 and the sixth switch Q6 remain unchanged. However, the voltages across the flying capacitors (including the first capacitor C1, the second capacitor C2, and the third capacitor C3), the voltage waveforms of the first switch node P1 and the second switch node P2, and the waveforms of the currents in the inductors (including the first inductor La1 and the second inductor La2) do not show significant changes. This indicates that the change in the control method of the first switch Q1, the second switch Q2, the third switch Q3, and the fourth switch Q4 can smoothly transition without affecting the output characteristics of the circuit and the operating state of passive components in the circuit. The change only redistributes the losses in the power conversion process based on the variation of the output current. Similarly, when the output current increases from below the first current threshold to above the first current threshold, the transition from the sequential conduction mode to the parallel conduction mode can be achieved by triggering the switch signal between the sequential conduction mode and the parallel conduction mode.

It should be noted that, in another embodiment, the transition from the sequential conduction mode to the parallel conduction mode and vice versa can be associated with a first current threshold set as a current range to implement hysteresis control. This prevents the hybrid voltage converter from repeatedly switching between the sequential conduction mode and the parallel conduction mode when the output current approaches the threshold current. For example, when the switches in the hybrid voltage converter operate in the sequential conduction mode and the output current increases to exceed the upper limit of the first current threshold, the control switches in the hybrid voltage converter to operate in the parallel conduction mode. Conversely, when the switches in the hybrid voltage converter operate in the parallel conduction mode and the output current decreases to a level below the lower limit of the first current threshold, the control switches in the hybrid voltage converter to operate in the sequential conduction mode.

Figure 7:
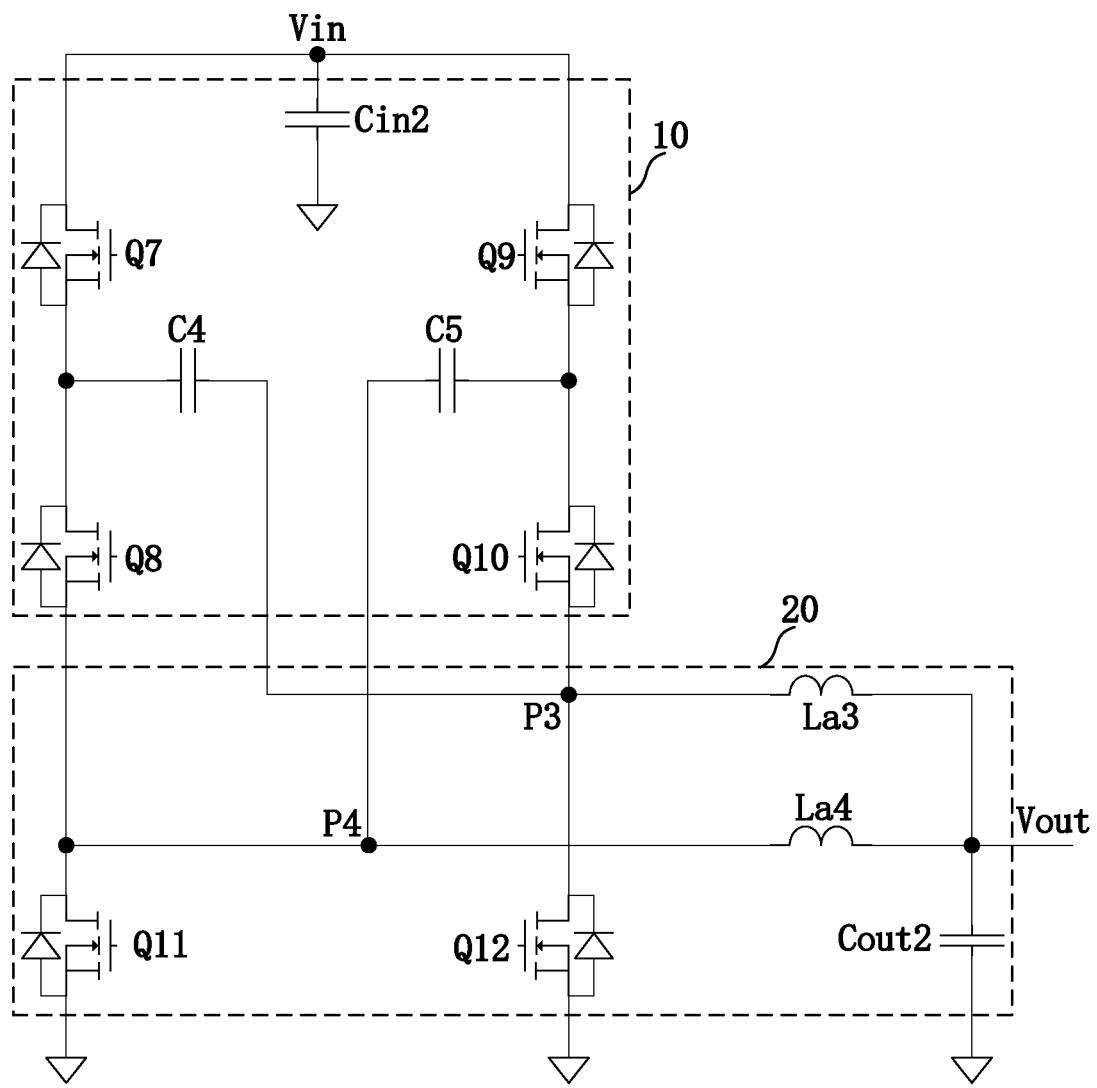
FIG. 7 is a schematic diagram of a circuit corresponding to the circuit shown in FIG. 1.

Please refer to FIG. 7, which exemplifies a second structure of the hybrid voltage converter 100. As shown in FIG. 3, the switched capacitor unit 10 comprises the seventh switch Q7, the eighth switch Q8, the ninth switch Q9, the tenth switch Q10, the second input capacitor Cin2, the fourth capacitor C4, and the fifth capacitor C5. The freewheeling unit 20 comprises the eleventh switch Q11, the twelfth switch Q12, the third inductor La3, the fourth inductor La4, and the second output capacitor Cout2. The switched capacitor unit 10 and the freewheeling unit 20 are connected at the third switch node P3 and the fourth switch node P4.

The third terminal of the seventh switch Q7 is connected to the input power source Vin, the first terminal of the second input capacitor Cin2, and the third terminal of the ninth switch Q9. The second terminal of the seventh switch Q7 is connected to the third terminal of the eighth switch Q8 and the first terminal of the fourth capacitor C4. The second terminal of the eighth switch Q8 is connected to the third terminal of the eleventh switch Q11, the second terminal of the fifth capacitor C5, and the first terminal of the fourth inductor La4, at the fourth switch node P4. The second terminal of the ninth switch Q9 is connected to the first terminal of the fifth capacitor C5 and the third terminal of the tenth switch Q10. The second terminal of the tenth switch Q10 is connected to the second terminal of the fourth capacitor C4, the third terminal of the twelfth switch Q12, and the first terminal of the third inductor La3, at the third switch node P3. The second terminal of the third inductor La3 is connected to the second terminal of the fourth inductor La4 and the first terminal of the second output capacitor Cout2. The second terminal of the second input capacitor Cin2, the second terminal of the eleventh switch Q11, the second terminal of the twelfth switch Q12, and the second terminal of the second output capacitor Cout2 are all grounded.

In one embodiment, as shown in FIG. 8, for the circuit structure shown in FIG. 7, the switch control method comprises the following steps:

Step 801: when the output current rise above the first current threshold, control the third switch group, comprising the seventh switch Q7 and the tenth switch Q10, and the fourth switch group, comprising the eighth switch Q8 and the ninth switch Q9, to turn on and off with the same duty cycle and 180 degrees out of phase; control the eleventh switch Q11 and the fourth switch group to alternately turn on and off in a complementary manner; control the twelfth switch Q12 and the third switch group to alternately turn on and off in a complementary manner.

Step 802: when the output current falls below the first current threshold, control the seventh switch Q7, the ninth switch Q9, the eighth switch Q8, and the tenth switch Q10 to turn on individually and sequentially with the same duty cycle; control the eleventh switch Q11 to turn off when the eighth switch Q8 or the ninth switch Q9 is turned on, and to turn on when both the eighth switch Q8 and the ninth switch Q9 are turned off; control the twelfth switch Q12 to turn off when the seventh switch Q7 or the tenth switch Q10 is turned on, and to turn on when both the seventh switch Q7 and tenth switch Q10 are turned off.

In this embodiment, N is equal to 2. N switch groups comprise the third switch group and the fourth switch group. Additionally, the eleventh switch Q11 corresponds to the fourth switch group, and the twelfth switch Q12 corresponds to the third switch group.

In a further embodiment, the present application provides a specific implementation of the steps shown in FIG. 8. Specifically, as illustrated in FIG. 9, the switch control method comprises the following steps:

Step 901: generate a third pulse signal and a fourth pulse signal, wherein the third pulse signal and the fourth pulse signal are periodic pulse signals with the same duty cycle and a 180-degree phase difference.

Step 902: control the twelfth switch by the complementary signal of the third pulse signal, and control the eleventh switch by the complementary signal of the fourth pulse signal.

Step 903: control the seventh switch and the tenth switch with the third pulse signal and control the eighth switch and the ninth switch with the fourth pulse signal, when the output current is greater than the first current threshold.

Step 904: generate a third selection signal based on the third pulse signal, where the frequency of the third selection signal is ½ of the third pulse signal, and the duty cycle of the third selection signal is ½.

Step 905: generate a fourth selection signal based on the fourth pulse signal, where the frequency of the fourth selection signal is ½ of the fourth pulse signal, and the duty cycle of the fourth selection signal is ½.

Step 906: when the output current falls below the first current threshold, control the seventh switch by the logical AND operation result of the third pulse signal and the complementary signal of the fourth selection signal, control the eighth switch by the logical AND operation result of the fourth pulse signal and the third selection signal, control the tenth switch by the logical AND operation result of the third pulse signal and the fourth selection signal, and control the ninth switch by the logical AND operation result of the fourth pulse signal and the complementary signal of the third selection signal.

Figure 10:
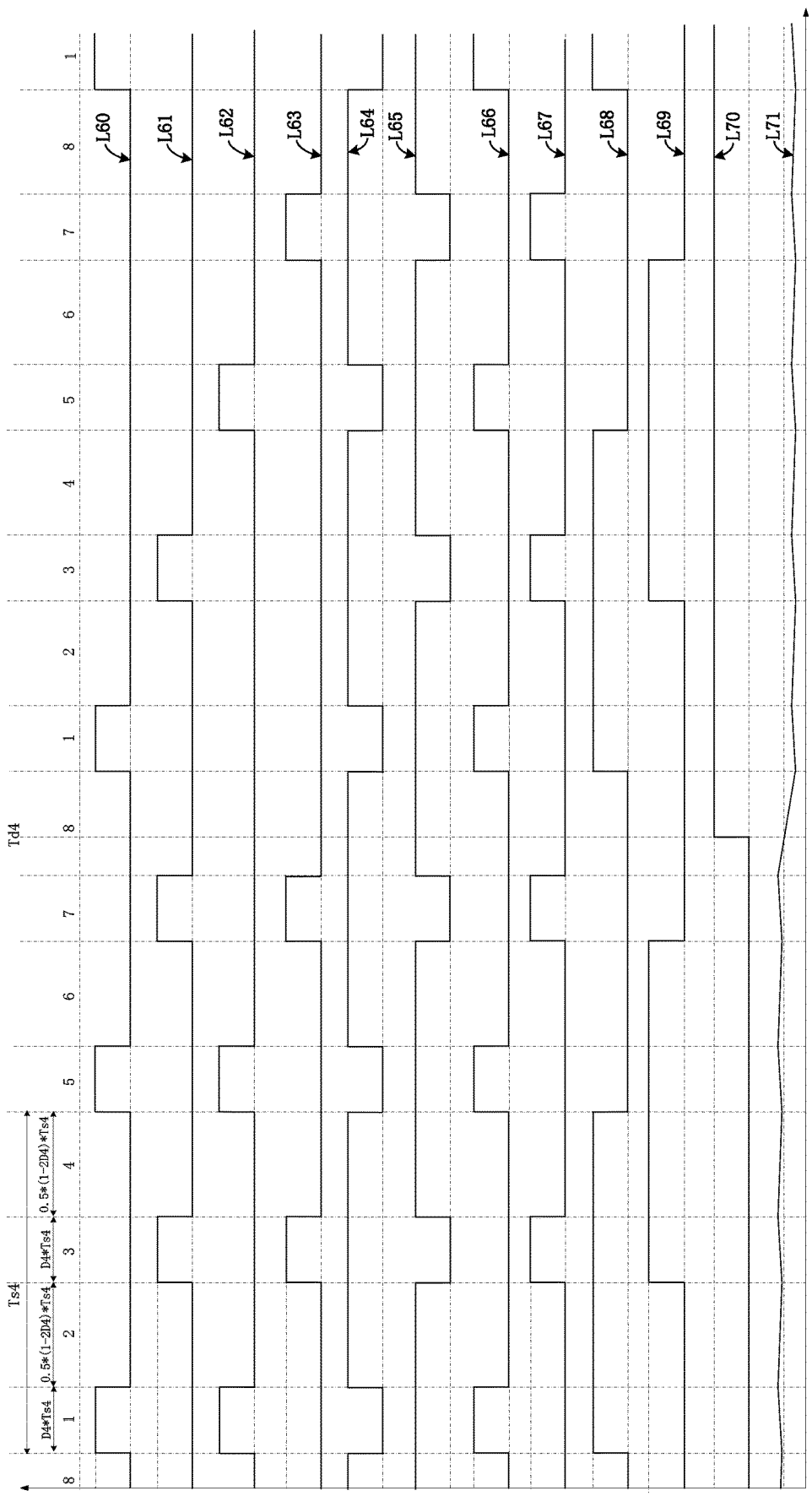
FIG. 10 is a schematic diagram of various signals in the circuit shown in FIG. 7.

Please refer to FIG. 10. FIG. 10 illustrates the signals under the control of the switching method shown in FIG. 9 for the circuit structure shown in FIG. 7. As shown in FIG. 10, Curve L60 represents the control signal of the seventh switch Q7; Curve L61 represents the control signal of the eighth switch Q8; Curve L62 represents the control signal of the ninth switch Q10; Curve L63 represents the control signal of the tenth switch Q9; Curve L64 represents the control signal of the twelfth switch Q12; Curve L65 represents the control signal of the eleventh switch Q11; Curve L66 represents the third pulse signal; Curve L67 represents the fourth pulse signal; Curve L68 represents the third selection signal; Curve L69 represents the fourth selection signal; Curve L70 represents the switching signal between parallel conduction mode and sequential conduction mode; Curve L71 represents the output current. Furthermore, D4 is the duty cycle of the third pulse signal; Ts4 is the period of the control signal of the seventh switch Q7 in the sequential conduction control mode; Numbers 1-8 represent the 8 states under various conduction modes (including the parallel conduction mode and the sequential conduction mode); Td4 is the time when the parallel conduction mode switches to the sequential conduction mode.

Specifically, whether using sequential conduction mode or parallel conduction mode, the voltage waveforms on the third switch node P3 and the fourth switch node P4 are both periodic voltage pulses with an amplitude of Vin/2 and a phase difference of 180 degrees. Therefore, the step-down ratio of this hybrid voltage converter 100 is Vin/Vout=D4/2. Similar to the previous embodiments, this hybrid voltage converter 100 achieves higher efficiency in the parallel conduction mode when the output current is high, and it achieves higher efficiency in the sequential conduction mode when the current is low (including PFM mode).

Furthermore, the switch control method provided in this application can be extended to hybrid voltage converters 100 with higher step-down ratios. For example, as shown in FIG. 11, two additional switches and capacitors can be added to the circuit shown in FIG. 7 to increase the step-down ratio of the hybrid voltage converter 100 from 2:1 to 3:1.

Figure 11:
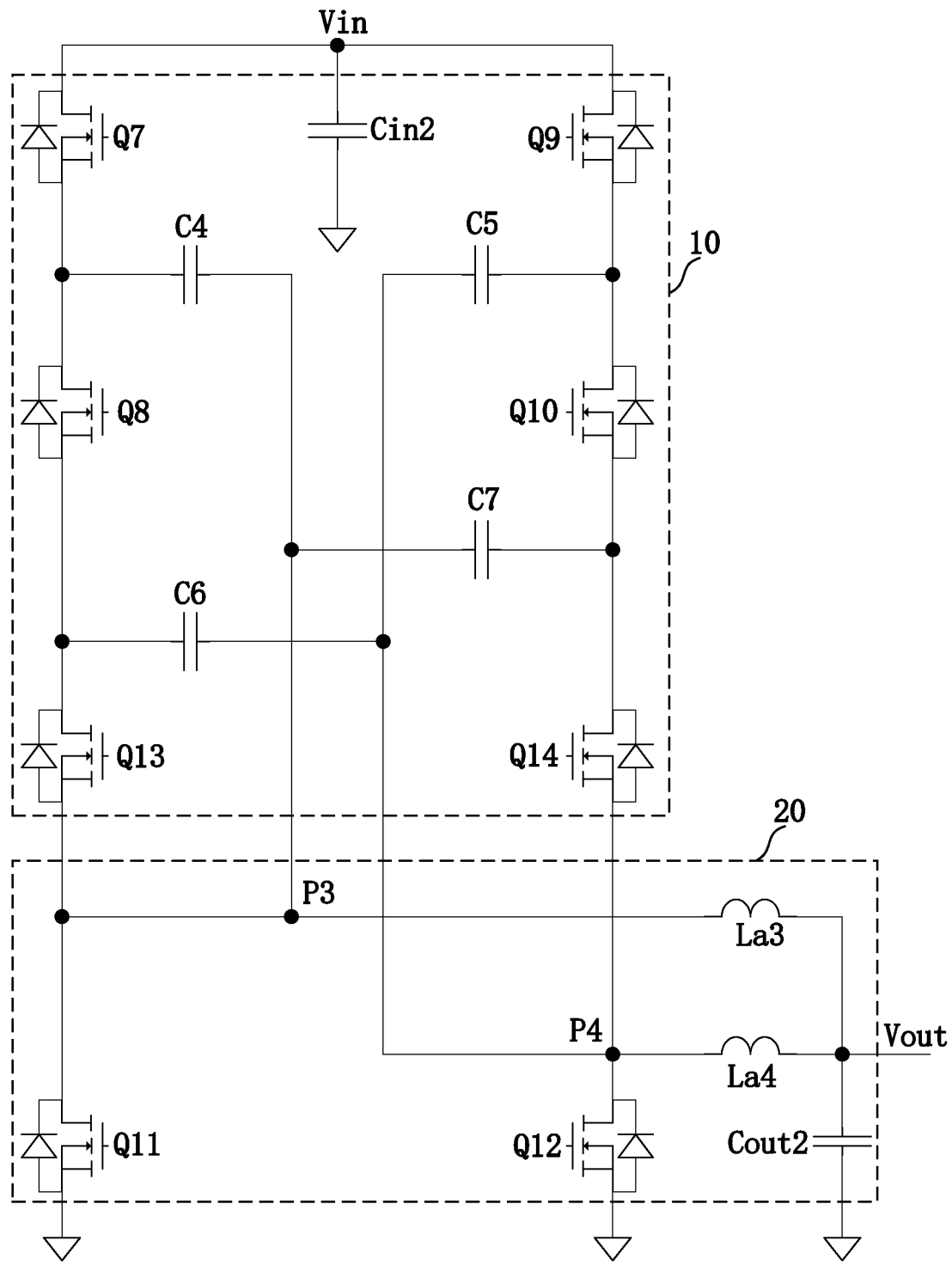
FIG. 11 is a schematic diagram of a circuit corresponding to the circuit shown in FIG. 1.

Specifically, as shown in FIG. 11, the switched capacitor unit also comprises the thirteenth switch Q13, fourteenth switch Q14, sixth capacitor C6, and seventh capacitor C7.

The third terminal of the thirteenth switch Q13 is connected to the first terminal of the sixth capacitor C6 and the second terminal of the eighth switch Q8. The second terminal of the thirteenth switch Q13 is connected to the second terminal of the seventh capacitor C7, the third terminal of the eleventh switch Q11, and the first terminal of the third inductor L3 at the third switch node P3. The third terminal of the fourteenth switch Q14 is connected to the first terminal of the seventh capacitor C7 and the second terminal of the tenth switch Q10. The second terminal of the fourteenth switch Q14 is connected to the second terminal of the sixth capacitor C6, the third terminal of the twelfth switch Q12, and the first terminal of the fourth inductor LA at the fourth switch node P4.

In one embodiment, as shown in FIG. 12, for the circuit structure shown in FIG. 11, the switch control method further comprises the following steps:

Step 1101: when the output current exceeds the first current threshold, control the fifth switch group comprising the seventh switch, the tenth switch, and the thirteenth switch, and the sixth switch group comprising the eighth switch, the ninth switch, and the fourteenth switch to be turned on and off with the same duty cycle and 180 degrees out of phase. Control the eleventh switch and the fifth switch group to turn on and off alternately in a complementary manner. Control the twelfth switch and the sixth switch group to turn on and off alternately in a complementary manner.

Step 1102: when the output current falls below the first current threshold, control the seventh switch, the ninth switch, the eighth switch, the tenth switch, the thirteenth switch, and the fourteenth switch to be turned on sequentially and individually with the same duty cycle. Control the twelfth switch to turn off when the eighth switch, the ninth switch or the fourteenth switch is turned on, and to turn on when the eighth switch, the ninth switch, and the fourteenth switch are all turned off. Control the eleventh switch to turn off when the seventh switch, the tenth switch or the thirteenth switch is turned on, and to turn on when the seventh switch, the tenth switch, and the thirteenth switch are all turned off.

In this embodiment, N is equal to 2. N switch groups comprise the fifth switch group and the sixth switch group. Moreover, the eleventh switch corresponds to the fifth switch group, and the twelfth switch corresponds to the sixth switch group.

Figure 13:
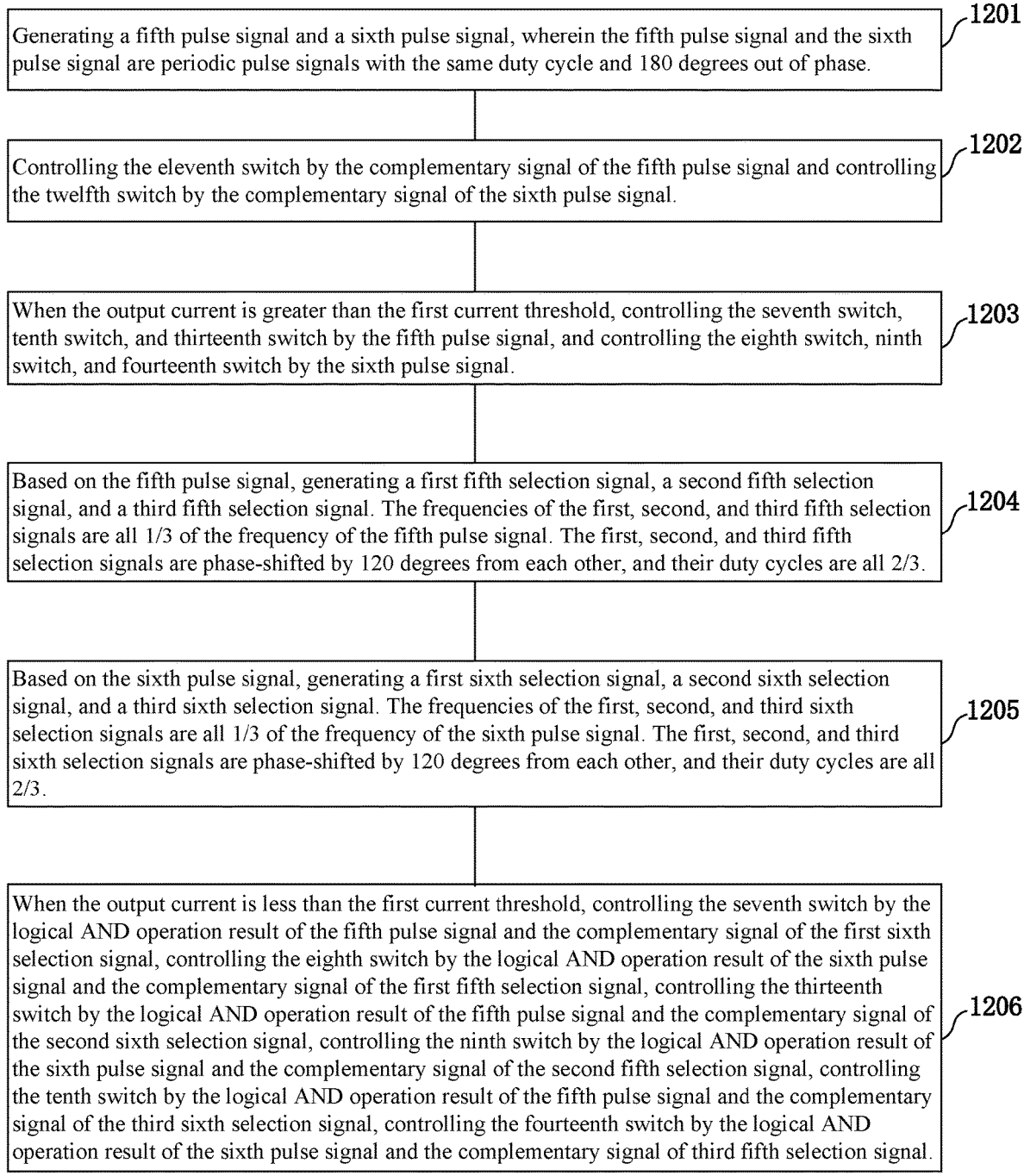
FIG. 13 is a flowchart of a switch control method based on the circuit shown in FIG. 11.

Furthermore, in another embodiment, the present application provides a specific implementation of the steps shown in FIG. 12. Specifically, as shown in FIG. 13, the switch control method further comprises the following steps:

Step 1201: generating a fifth pulse signal and a sixth pulse signal, wherein the fifth pulse signal and the sixth pulse signal are periodic pulse signals with the same duty cycle and 180 degrees out of phase.

Step 1202: controlling the eleventh switch by the complementary signal of the fifth pulse signal and controlling the twelfth switch by the complementary signal of the sixth pulse signal.

Step 1203: when the output current is greater than the first current threshold, controlling the seventh switch, tenth switch, and thirteenth switch by the fifth pulse signal, and controlling the eighth switch, ninth switch, and fourteenth switch by the sixth pulse signal.

Step 1204: based on the fifth pulse signal, generating a first fifth selection signal, a second fifth selection signal, and a third fifth selection signal. The frequencies of the first, second, and third fifth selection signals are all ⅓ of the frequency of the fifth pulse signal. The first, second, and third fifth selection signals are phase-shifted by 120 degrees from each other, and their duty cycles are all ⅔.

Step 1205: based on the sixth pulse signal, generating a first sixth selection signal, a second sixth selection signal, and a third sixth selection signal. The frequencies of the first, second, and third sixth selection signals are all ⅓ of the frequency of the sixth pulse signal. The first, second, and third sixth selection signals are phase-shifted by 120 degrees from each other, and their duty cycles are all ⅔.

Step 1206: when the output current is less than the first current threshold, controlling the seventh switch by the logical AND operation result of the fifth pulse signal and the complementary signal of the first sixth selection signal, controlling the eighth switch by the logical AND operation result of the sixth pulse signal and the complementary signal of the first fifth selection signal, controlling the thirteenth switch by the logical AND operation result of the fifth pulse signal and the complementary signal of the second sixth selection signal, controlling the ninth switch by the logical AND operation result of the sixth pulse signal and the complementary signal of the second fifth selection signal, controlling the tenth switch by the logical AND operation result of the fifth pulse signal and the complementary signal of the third sixth selection signal, controlling the fourteenth switch by the logical AND operation result of the sixth pulse signal and the complementary signal of third fifth selection signal.

Specifically, whether in the sequential conduction mode or the parallel conduction mode, the voltage waveforms on the third switch node P3 and the fourth switch node P4 are periodic voltage pulses with an amplitude of Vin/3 and a phase difference of 180 degrees. Therefore, the step-down ratio of the hybrid voltage converter 100 is Vin/Vout=D2/3, where D2 is the duty cycle of the fifth pulse signal. Similar to the previous embodiments, the hybrid voltage converter 100 exhibits higher efficiency in the parallel conduction mode when the output current is higher, while it demonstrates higher efficiency in the sequential conduction mode when the current is lower, including during the PFM mode.

Figure 14:
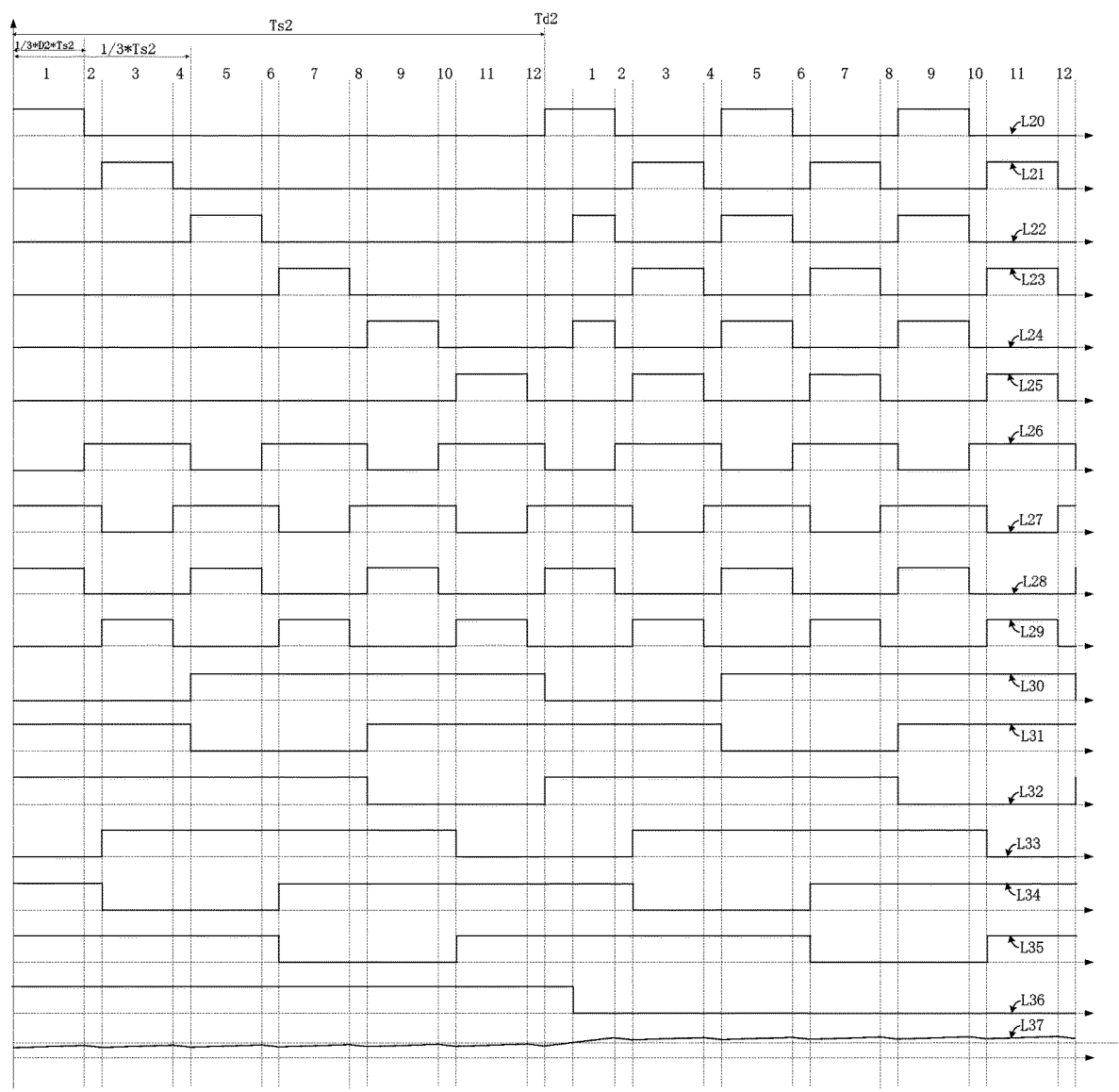
FIG. 14 is a schematic diagram of various signals in the circuit shown in FIG. 11.

Please refer to FIG. 14. FIG. 14 exemplifies the diagram of various signals under the control of the switching control method shown in FIG. 13 for the circuit in FIG. 11. As shown in FIG. 14, curve L20 represents the control signal of the seventh switch Q7; curve L21 represents the control signal of the eighth switch Q8; curve L22 represents the control signal of the thirteenth switch Q13; curve L23 represents the control signal of the ninth switch Q9; curve L24 represents the control signal of the tenth switch Q10; curve L25 represents the control signal of the fourteenth switch Q14; curve L26 represents the control signal of the eleventh switch Q11; curve L27 represents the control signal of the twelfth switch Q12; curve L28 represents the fifth pulse signal; curve L29 represents the sixth pulse signal; curve L30 represents the first fifth selection signal; curve L31 represents the second fifth selection signal; curve L32 represents the third fifth selection signal; curve L33 represents the first sixth selection signal; curve L34 represents the second sixth selection signal; curve L35 represents the third sixth selection signal; curve L36 represents the switching signal between the parallel conduction mode and the sequential conduction mode; curve L37 represents the output current. Additionally, D2 is the duty cycle of the fifth pulse signal; Ts2 is the period of the control signal of the seventh switch Q7 in the sequential conduction control mode; the numbers 1-12 represent the 12 states under various conduction modes, including the parallel conduction mode and the sequential conduction mode; Td2 is the moment when the parallel conduction mode switches to the sequential conduction mode.

Specifically, before the moment Td2, the hybrid voltage converter 100 operates in the sequential conduction mode, during which the output current is less than the first current threshold. Sequentially, the seventh switch Q7, the eighth switch Q8, the thirteenth switch Q13, the ninth switch Q9, the tenth switch Q10, and the fourteenth switch Q14 are turned on to achieve lower switch losses by reducing the effective switching frequency.

At the moment Td2, due to an increase in load, the output current increases and exceeds the first current threshold. The hybrid voltage converter 100 operates in the parallel conduction mode. The control signals for the seventh switch Q7, the tenth switch Q10, and the thirteenth switch Q13 are the same as the fifth pulse signal, controlling them to turn on and off together. The control signals for the eighth switch Q8, the ninth switch Q9, and the fourteenth switch Q14 are the same as the sixth pulse signal, controlling them to turn on and off together. The switching mode of the eleventh switch Q11 and twelfth switch Q12 remains unchanged. This allows providing current to each inductor (including the third inductor La3 and fourth inductor La4) through three paths while keeping the output voltage of the hybrid voltage converter 100 constant, achieving lower conduction losses.

Additionally, it should be noted that in the parallel conduction mode of the hybrid voltage converter 100 shown in FIG. 11, due to the presence of multiple parallel current paths, there will be a voltage difference at the third switch node P3 and the fourth switch node P4. This leads to a rapid completion of charge transfer and voltage balancing across the flying capacitor combinations on multiple parallel current paths when they are connected in parallel. Since this charge transfer occurs rapidly, its equivalent pulse current is significant, causing noticeable charge transfer losses. However, in the sequential conduction mode of the same circuit topology, at any given moment, at most one flying capacitor is in the discharge path to the inductor. Therefore, there is no occurrence of pulse current and charge transfer losses. This feature allows the hybrid voltage converter 100 to have equal efficiency current points in the sequential conduction mode and the parallel conduction mode at higher current levels. As a result, the output current does not need to be very low to switch to the sequential conduction mode, achieving higher power conversion efficiency.

Furthermore, as shown in the preceding waveforms, despite changes in the control modes of the seventh switch Q7, the ninth switch Q9, the eighth switch Q8, the tenth switch Q10, the thirteenth switch Q13, and the fourteenth switch Q14 in the hybrid voltage converter 100, the switching modes of the eleventh switch Q11 and the twelfth switch Q12 remain unchanged. However, the voltages across the flying capacitors (including the fourth capacitor C4, the fifth capacitor C5, the sixth capacitor C6, and the seventh capacitor C7), the voltages at the third switch node P3 and fourth switch node P4, and the currents in the third inductor La3 and fourth inductor La4 do not show significant changes. This indicates that the changes in the control modes of the seventh switch Q7, the ninth switch Q9, the eighth switch Q8, the tenth switch Q10, the thirteenth switch Q13, and the fourteenth switch Q14 can smoothly transition without affecting the output characteristics of the hybrid voltage converter 100 and the operating state of passive devices in the hybrid voltage converter 100. Instead, these changes only redistribute losses during the power conversion process based on variations in the output current. Similarly, when the output current decreases from above the first current threshold to below the first current threshold, the transition from the parallel conduction mode to the sequential conduction mode can be achieved by triggering the toggle of selection signal between the parallel conduction mode and the sequential conduction mode.

Furthermore, as the voltage conversion ratio of the hybrid voltage converter 100 increases, i.e., from 3:1 to M:1 (where M is an integer greater than or equal to 3), the total number of switches in the switched capacitor unit will increase from 6 to 2M. The voltage waveforms at the third switch node P3 and fourth switch node P4 are periodic voltage pulses with an amplitude of Vin/M and a phase difference of 180 degrees, resulting in a voltage conversion ratio of Vin/Vout=D2/M for the hybrid voltage converter 100. Therefore, the switch control method for this hybrid voltage converter 100 also requires two periodic pulse signals with the same duty cycle and a phase difference of 180 degrees, as well as 2M selection signals. The duty cycle of each selection signal is (M−1)/M, and the 2M selection signals have a phase difference of 180/M degrees between them.

Figure 15:
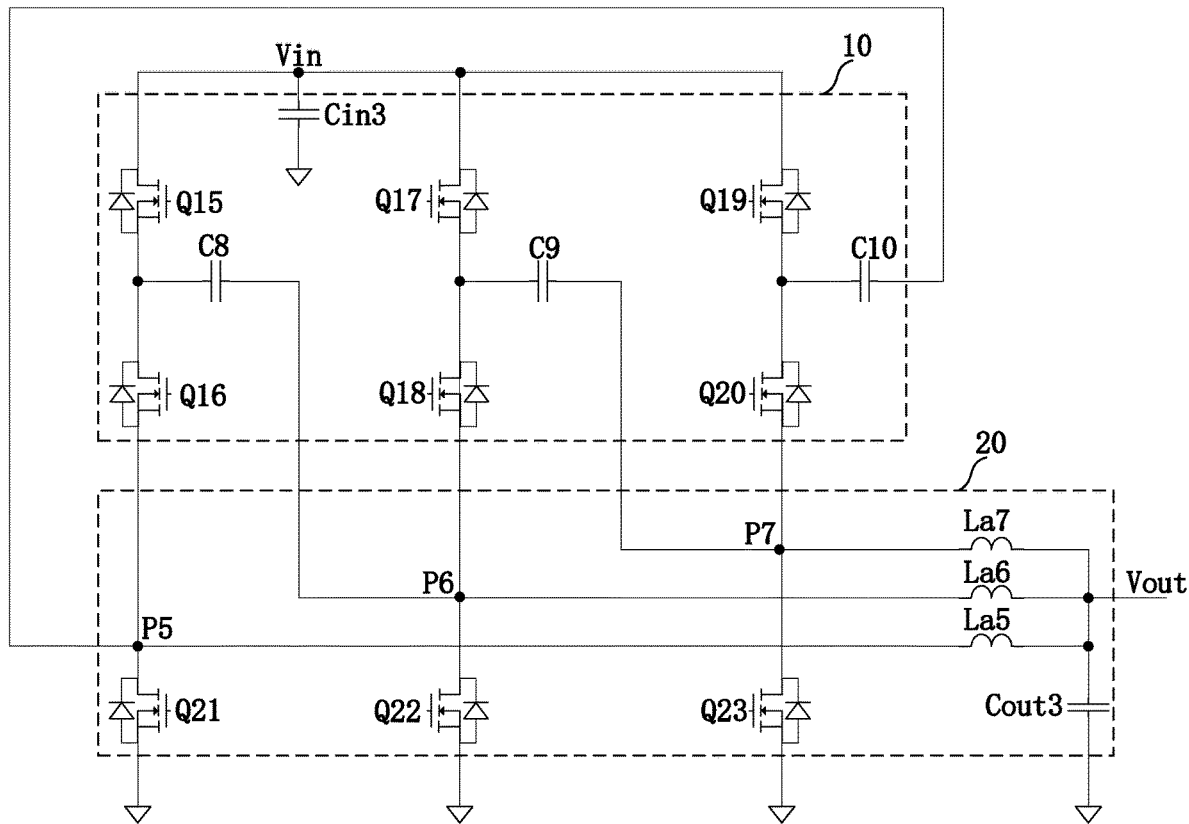
FIG. 15 is a schematic diagram of a circuit corresponding to the circuit shown in FIG. 1.

Please refer to FIG. 15, which illustrates a third circuit of the hybrid voltage converter 100. As shown in FIG. 15, the switched capacitor unit 10 comprises a fifteenth switch Q15, a sixteenth switch Q16, a seventeenth switch Q17, an eighteenth switch Q18, a nineteenth switch Q19, a twentieth switch Q20, a third input capacitor Cin3, an eighth capacitor C8, a ninth capacitor C9, and a tenth capacitor C10. The freewheeling unit 20 also comprises a twenty-first switch Q21, a twenty-second switch Q22, a twenty-third switch Q23, a third output capacitor Cout3, a fifth inductor La5, a sixth inductor La6, and a seventh inductor La7. The switched capacitor unit 10 and the freewheeling unit 20 are connected to the fifth switch node P5, sixth switch node P6, and seventh switch node P7.

The third terminal of the fifteenth switch Q15 is connected to the input power source Vin, the third terminal of the seventeenth switch Q17, the third terminal of the nineteenth switch Q19, and the first terminal of the third input capacitor Cin3. The second terminal of the fifteenth switch Q15 is connected to the third terminal of the sixteenth switch Q16 and the first terminal of the eighth capacitor C8. The second terminal of the sixteenth switch Q16 is connected to the third terminal of the twenty-first switch Q21, the second terminal of the tenth capacitor C10, and the first terminal of the fifth inductor La5 at the fifth switch node P5. The second terminal of the seventeenth switch Q17 is connected to the third terminal of the eighteenth switch Q18 and the first terminal of the ninth capacitor C9. The second terminal of the eighteenth switch Q18 is connected to the second terminal of the eighth capacitor C8, the third terminal of the twenty-second switch Q22, and the first terminal of the sixth inductor La6 at the sixth switch node P6. The second terminal of the nineteenth switch Q19 is connected to the first terminal of the tenth capacitor C10 and the third terminal of the twentieth switch Q20. The second terminal of the twentieth switch Q20 is connected to the third terminal of the twenty-third switch Q23, the second terminal of the ninth capacitor C9, and the first terminal of the seventh inductor La7 at the seventh switch node P7. The second terminal of the fifth inductor La5 is connected to the second terminal of the sixth inductor La6, the second terminal of the seventh inductor La7, and the first terminal of the third output capacitor Cout3. The second terminal of the third input capacitor Cin3, the second terminal of the third output capacitor Cout3, the second terminal of the twenty-first switch Q21, the second terminal of the twenty-second switch Q22, and the second terminal of the twenty-third switch Q23 are all grounded.

In one embodiment, as shown in FIG. 16, with respect to the circuit structure shown in FIG. 15, the switch control method further comprises the following steps:

Step 1501: when the output current is greater than the first current threshold, control the seventh switch group, comprising the fifteenth switch and the eighteenth switch, the eighth switch group, comprising the seventeenth switch and the twentieth switch, and the ninth switch group, comprising the nineteenth switch and the sixteenth switch, to turn on and off with the same duty cycle and a phase difference of 120 degrees. Control the twenty-first switch and the ninth switch group to alternately turn on and off in a complementary manner. Control the twenty-second switch and the seventh switch group to alternately turn on and off in a complementary manner. Control the twenty-third switch and the eighth switch group to alternately turn on and off in a complementary manner.

Step 1502: when the output current is less than the first current threshold, control the fifteenth switch, the seventeenth switch, the nineteenth switch, the sixteenth switch, the eighteenth switch, and the twentieth switch to turn on individually and sequentially with the same duty cycle. Control the twenty-first switch to turn off when the sixteenth switch or the nineteenth switch is turned on, and to turn on when both the sixteenth switch and the nineteenth switch are turned off. Control the twenty-second switch to turn off when the fifteenth switch or the eighteenth switch is turned on, and to turn on when both the fifteenth switch and the eighteenth switch are turned off. Control the twenty-third switch to turn off when the seventeenth switch or the twentieth switch is turned on, and to turn on when both the seventeenth switch and the twentieth switch are turned off.

In this embodiment, N is equal to 3. The N switch groups comprise the seventh switch group, the eighth switch group, and the ninth switch group. Additionally, the twenty-first switch corresponds to the ninth switch group. The twenty-second switch corresponds to the seventh switch group, and the twenty-third switch corresponds to the eighth switch group.

Furthermore, in another embodiment, the present application provides a specific implementation of the steps shown in FIG. 16. Specifically, as shown in FIG. 17, the switch control method further comprises the following steps:

Step 1601: generate the seventh pulse signal, the eighth pulse signal, and the ninth pulse signal, wherein the seventh pulse signal, the eighth pulse signal, and the ninth pulse signal are periodic pulse signals with the same duty cycle and a phase difference of 120 degrees.

Step 1602: control the twenty-first switch by the complementary signal of the ninth pulse signal, control the twenty-second switch by the complementary signal of the seventh pulse signal, and control the twenty-third switch by the complementary signal of the eighth pulse signal.

Step 1603: when the output current is greater than the first current threshold, control the fifteenth switch and the eighteenth switch with the seventh pulse signal, control the seventeenth switch and the twentieth switch with the eighth pulse signal, and control the sixteenth switch and the nineteenth switch with the ninth pulse signal.

Step 1604: based on the seventh pulse signal, output the seventh selection signal, where the frequency of the seventh selection signal is ½ of that of the seventh pulse signal, and the duty cycle of the seventh selection signal is ½.

Step 1605: based on the eighth pulse signal, output the eighth selection signal, where the frequency of the eighth selection signal is ½ of that of the eighth pulse signal, and the duty cycle of the eighth selection signal is ½.

Step 1606: Based on the ninth pulse signal, output the ninth selection signal, where the frequency of the ninth selection signal is ½ of that of the ninth pulse signal, and the duty cycle of the ninth selection signal is ½.

Step 1607: when the output current is less than the first current threshold, control the fifteenth switch by the logical AND operation result of the seventh pulse signal and the complementary signal of the ninth selection signal. Control the seventeenth switch by the logical AND operation result of the eighth pulse signal and the seventh selection signal. Control the nineteenth switch by the logical AND operation result of the ninth pulse signal and the seventh selection signal. Control the sixteenth switch by the logical AND operation result of the ninth pulse signal and the ninth selection signal. Control the eighteenth switch by the logical AND operation result of the seventh pulse signal and the complementary signal of the seventh selection signal. Control the twentieth switch by the logical AND operation result of the eighth pulse signal and the complementary signal of the eighth selection signal.

Specifically, whether using the sequential conduction mode or the parallel conduction mode, the voltage waveforms at the fifth switch node P5, the sixth switch node P6, and the seventh switch node P7 are periodic voltage pulses with an amplitude of Vin/2 and a phase difference of 120 degrees. Therefore, the step-down ratio of the hybrid voltage converter 100 is Vin/Vout=D3/2, where D3 is the duty cycle of the seventh pulse signal. Similar to the previous embodiments, the hybrid voltage converter 100 is more efficient in the parallel conduction mode when the output current is higher, and it is more efficient in the sequential conduction mode when the current is lower, including in the PFM mode.

Figure 18:
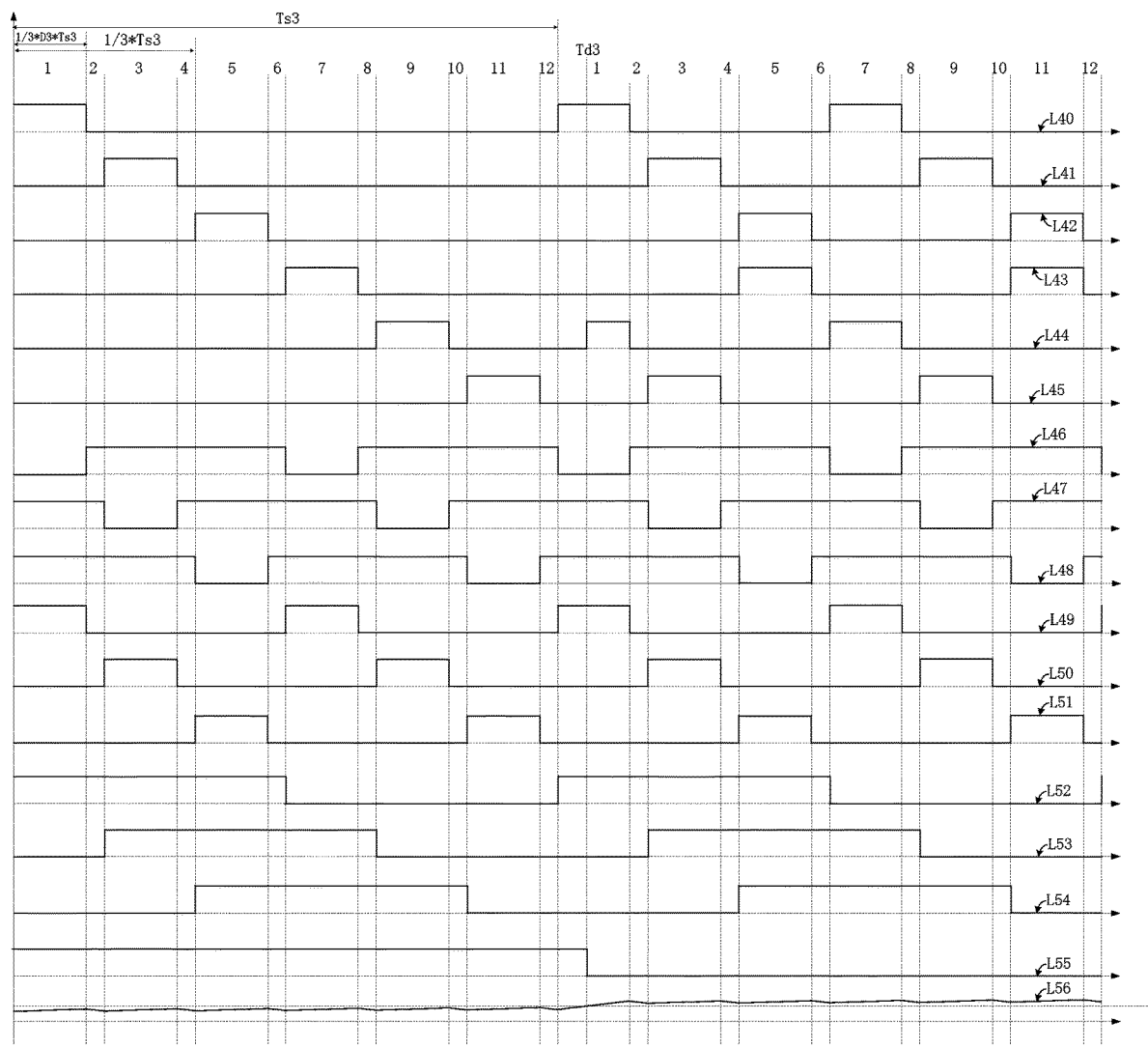
FIG. 18 is a schematic diagram of various signals in the circuit structure shown in FIG. 15.

Please refer to FIG. 18. FIG. 18 illustrates the signals of the circuit structure shown in FIG. 15 under the control of the switch control method shown in FIG. 17. As shown in FIG. 18, curve L40 represents the control signal of the fifteenth switch Q15; curve L41 represents the control signal of the seventeenth switch Q17; curve L42 represents the control signal of the nineteenth switch Q19; curve L43 represents the control signal of the sixteenth switch Q16; curve L44 represents the control signal of the eighteenth switch Q18; curve L45 represents the control signal of the twentieth switch Q20; curve L46 represents the control signal of the twenty-second switch Q22; curve L47 represents the control signal of the twenty-third switch Q23; curve L48 represents the control signal of the twenty-first switch Q21; curve L49 represents the seventh pulse signal; curve L50 represents the eighth pulse signal; curve L51 represents the ninth pulse signal; curve L52 represents the seventh selection signal; curve L53 represents the eighth selection signal; curve L54 represents the ninth selection signal; curve L55 represents the switching signal between the parallel conduction mode and the sequential conduction mode; curve L56 represents the output current. Additionally, D3 is the duty cycle of the seventh pulse signal; Ts3 is the period of the control signal of the fifteenth switch Q15 in the sequential conduction control mode; numbers 1-12 represent the 12 states under various conduction modes, including the parallel conduction mode and the sequential conduction mode; Td3 is the moment when the switching between the sequential conduction mode to the parallel conduction mode occurs.

Specifically, before the moment Td3, the switching signal SEQEN between the parallel conduction mode and the sequential conduction mode is at a high level. The hybrid voltage converter 100 operates in the sequential conduction mode, where the output current is less than the first current threshold. In this mode, the sequential conduction of the fifteenth switch Q15, the seventeenth switch Q17, the nineteenth switch Q19, the sixteenth switch Q16, the eighteenth switch Q18, and the twentieth switch Q20 is controlled, achieving lower switch losses by reducing the effective switching frequency.

At the moment Td3, due to an increase in load, the output current increases and exceeds the first current threshold, and the hybrid voltage converter 100 operates in the parallel conduction mode. The control signals for the fifteenth switch Q15 and the eighteenth switch Q18 are the same as the seventh pulse signal, leading to configuring them to turn on and off in parallel. The control signals for the seventeenth switch Q17 and the twentieth switch Q20 are the same as the eighth pulse signal, also resulting in configuring them to turn on and off in parallel. The control signals for the sixteenth switch Q16 and the nineteenth switch Q19 are the same as the ninth pulse signal, again leading to configuring them to turn on and off in parallel. The switching modes of the twenty-first switch Q21, the twenty-second switch Q22, and the twenty-third switch Q23 remain unchanged. This allows providing current to each inductor (including the fifth inductor La5, the sixth inductor La6, and the seventh inductor La7) through two paths while keeping the output voltage of the hybrid voltage converter 100 unchanged, achieving lower conduction losses.

It should be noted that, as shown in the previous waveform diagrams, despite the change in the control modes of the fifteenth switch Q15, the seventeenth switch Q17, the nineteenth switch Q19, the sixteenth switch Q16, the eighteenth switch Q18, and the twentieth switch Q20 in the hybrid voltage converter 100, as well as the control modes of the twenty-first switch Q21, the twenty-second switch Q22, and the twenty-third switch Q23, there is no significant change in the voltage across the flying capacitors (including the eighth capacitor C8, ninth capacitor C9, and tenth capacitor C10), the voltages at various switch nodes (including the fifth switch node P5, the sixth switch node P6, and the seventh switch node P7), and the currents in various inductors (including the fifth inductor La5, sixth inductor La6, and seventh inductor La7). This also indicates that the change in the control modes of the fifteenth switch Q15, the seventeenth switch Q17, the nineteenth switch Q19, the sixteenth switch Q16, the eighteenth switch Q18, and the twentieth switch Q20 can transition smoothly without affecting the output characteristics of the hybrid voltage converter 100 and the operational state of passive components in the hybrid voltage converter 100. Instead, it reallocates losses in the power conversion process based on changes in output current. Similarly, when the output current decreases from above the first current threshold to below it, the transition from the parallel conduction mode to the sequential conduction mode can be achieved by triggering the transition signal.

Simultaneously, with the increase in the number of phases in the hybrid voltage converter 100, from three phases to K phases, the total number of switches will increase from 9 to 3K. The voltage waveforms at K switch nodes (including the fifth switch node P5 to the Kth switch node PK) are periodic voltage pulses with an amplitude of Vin/2 and a phase difference of 360/K degrees. Therefore, the voltage conversion ratio of the hybrid voltage converter 100 is Vin/Vout=D3/2. Consequently, the switch control method for the hybrid voltage converter 100 requires N periodic pulse signals with the same duty cycle and a phase difference of 360/K degrees, as well as K selection signals. Each selection signal has a duty cycle of 50%, and the K selection signals have a phase difference of 360/K degrees between them.

Figure 19:
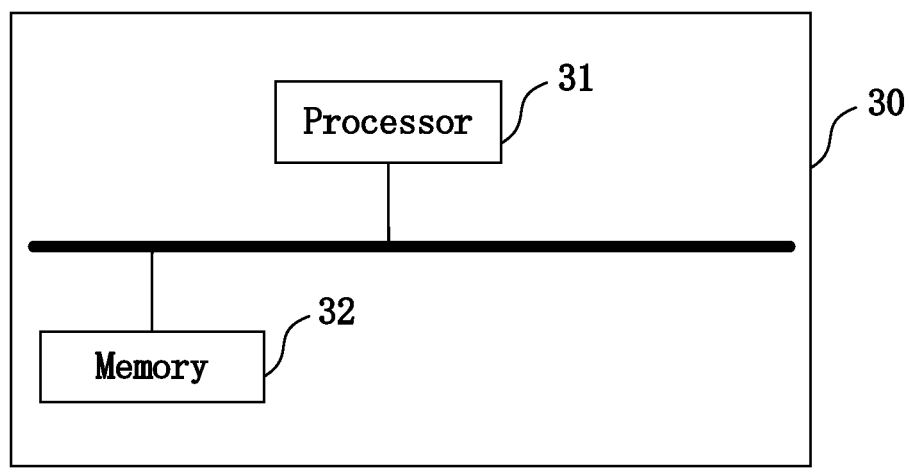
FIG. 19 is a schematic diagram of the controller provided in an embodiment of the present application.

Please refer to FIG. 19. FIG. 19 illustrates an exemplary structure of the controller 30. As shown in FIG. 19, the controller 30 comprises at least one processor 31 and a memory 32. The memory 32 can be integrated into the controller 30, or it can be external to the controller 30. The memory 32 can also be a remotely configured memory accessed by connecting to the controller 30 through a network.

Memory 32, as a type of non-volatile computer-readable storage medium, can be used to store non-volatile software programs, non-volatile computer-executable programs, and modules. Memory 32 may comprise a program storage area and a data storage area. The program storage area can store an operating system and at least one application required for the functionality. The data storage area can store data created according to the use of the terminal. Additionally, memory 32 may comprise high-speed random-access memory and non-volatile memory, such as at least one disk storage device, flash memory device, or other non-volatile solid-state storage device. In some embodiments, memory 32 may optionally comprise remotely configured memory relative to processor 31. These remote memories can be connected to the terminal through a network. Examples of such networks comprise, but are not limited to, the internet, enterprise intranets, local area networks, mobile communication networks, and their combinations.

Processor 31, by running or executing software programs and/or modules stored in memory 32, and by accessing data stored in memory 32, performs various functions and processes data for the terminal. This allows for comprehensive monitoring of the terminal, such as implementing the switch control method described in any embodiment of this application.

Processor 31 can be one or more, with one processor 31 used as an example in FIG. 19. Processor 31 and memory 32 can be connected through a bus or other means. Processor 31 may comprise a Central Processing Unit (CPU), Digital Signal Processor (DSP), Application-Specific Integrated Circuit (ASIC), controller, Field-Programmable Gate Array (FPGA) device, and so on. Processor 31 can also be implemented as a combination of computing devices, such as a combination of DSP and microprocessor, multiple microprocessors, one or more microprocessors combined with a DSP core, or any other such configuration.

In one embodiment, the controller is also used to output an enable signal. The controller controls the enable signal to be in a high state when the output current of the hybrid voltage converter is greater than the first current threshold, and in a low state when the output current is less than the first current threshold.

In some embodiments, the enable signal SEQEN output by the controller (i.e., the switching signal between parallel conduction mode and sequential conduction mode) is represented by the curve L11 in FIG. 6, the curve L36 in FIG. 14, or the curve L55 shown in FIG. 18.

In one embodiment, the switched capacitor unit 10 comprises the first switch Q1, the second switch Q2, the third switch Q3, the fourth switch Q4, the first input capacitor Cin1, the first capacitor C1, the second capacitor C2, and the third capacitor C3. The freewheeling unit 20 comprises the fifth switch Q5, the sixth switch Q6, the first output capacitor Cout1, the first inductor La1, and the second inductor La2. The connection between the switched capacitor unit 10 and the freewheeling unit 20 can be referred to the description for FIG. 3, and is not repeated here.

Figure 20:
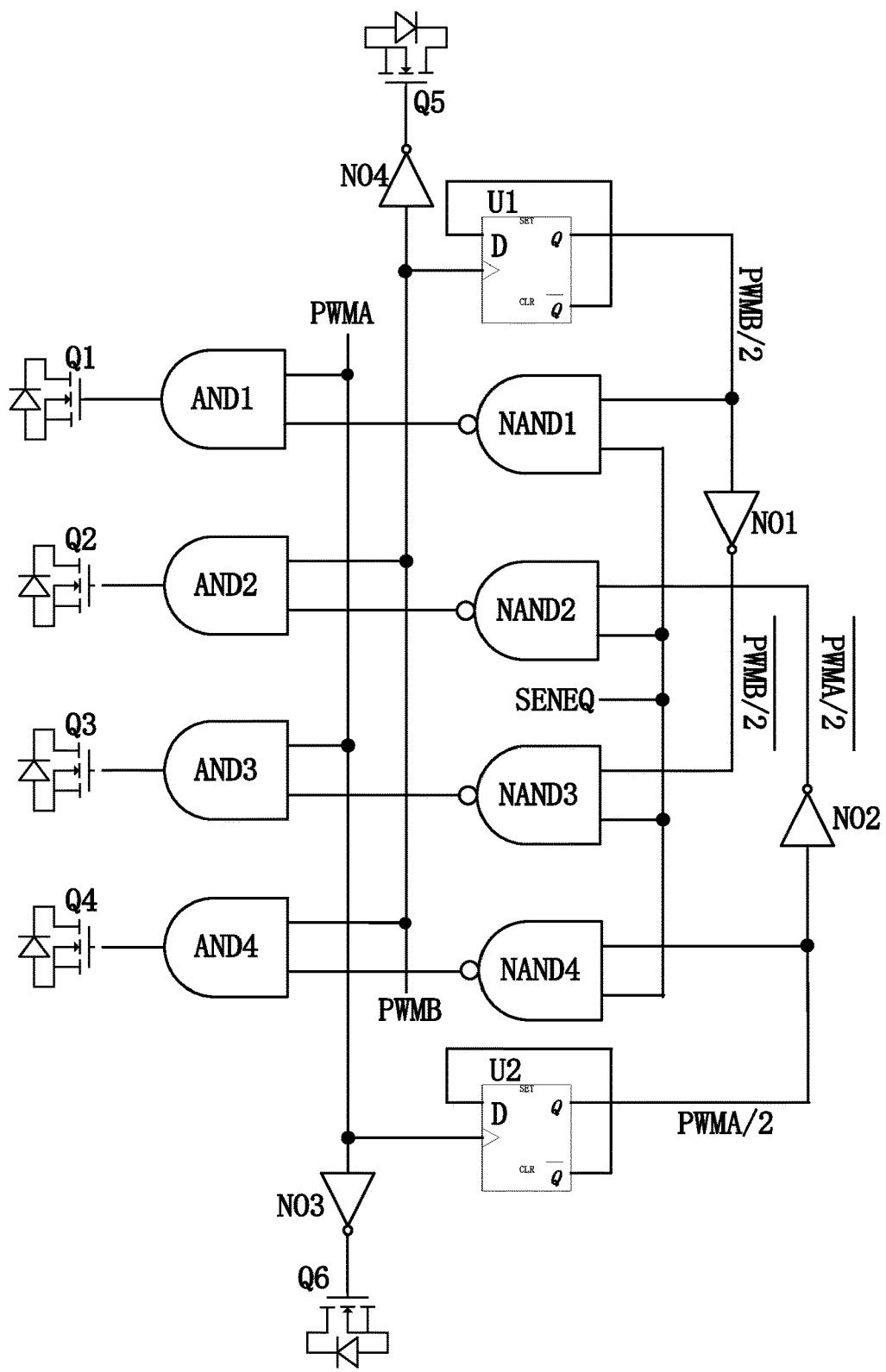
FIG. 20 is a schematic diagram of the logical control part of the hybrid voltage converter provided in an embodiment of the present application shown in FIG. 3.

In this embodiment, as shown in FIG. 20, the hybrid voltage converter 100 further comprises a first D flip-flop U1, a second D flip-flop U2, a first NAND gate NAND1, a second NAND gate NAND2, a third NAND gate NAND3, a fourth NAND gate NAND4, a first AND gate AND1, a second AND gate AND2, a third AND gate AND3, a fourth AND gate AND4, a first NOT gate NO1, a second NOT gate NO2, a third NOT gate NO3, and a fourth NOT gate NO4.

Among them, the output terminal of the first AND gate AND1 is connected to the first terminal of the first switch Q1. The first input terminal of the first AND gate AND1, the first input terminal of the third AND gate AND3, the input terminal of the third NOT gate NO3, and the clock input terminal of the second D flip-flop U2 all receive the first pulse signal PWMA generated by the controller 30. The output terminal of the third NOT gate NO3 is connected to the first terminal of the sixth switch Q6. The second input terminal of the first AND gate AND1 is connected to the output terminal of the first NAND gate NAND1. The second input terminal of the first NAND gate NAND1 is connected to the output terminal of the first D flip-flop U1 and the input terminal of the first NOT gate NO1. The output terminal of the first NOT gate NO1 is connected to the second input terminal of the third NAND gate NAND3. The first input terminals of the first NAND gate NAND1, the second NAND gate NAND2, the third NAND gate NAND3, and the fourth NAND gate NAND4 all receive the enable signal SENEQ. The signal input terminal and the inverted output terminal of the first D flip-flop U1 are connected together. The clock input terminal of the first D flip-flop U1, the input terminal of the fourth NOT gate NO4, the first input terminal of the second AND gate AND2, and the first input terminal of the fourth AND gate AND4 all receive the second pulse signal PWM2 generated by the controller 30. The output terminal of the fourth NOT gate NO4 is connected to the first terminal of the fifth switch Q5. The output terminal of the second AND gate AND2 is connected to the first terminal of the second switch Q2. The second input terminal of the second AND gate AND2 is connected to the output terminal of the second NAND gate NAND2. The second input terminal of the second NAND gate NAND2 is connected to the output terminal of the second NOT gate NO2. The input terminal of the second NOT gate NO2 is connected to the second input terminal of the fourth NAND gate NAND4 and the output terminal of the second D flip-flop U2. The signal input terminal and the inverted output terminal of the second D flip-flop U2 are connected together. The output terminal of the third AND gate AND3 is connected to the first terminal of the third switch Q3. The second input terminal of the third AND gate AND3 is connected to the output terminal of the third NAND gate NAND3. The output terminal of the fourth AND gate AND4 is connected to the first terminal of the fourth switch Q4. The second input terminal of the fourth AND gate AND4 is connected to the output terminal of the fourth NAND gate NAND4.

Specifically, the control signals for the first switch Q1 to the sixth switch Q6 are all generated based on the first pulse signal PWMA and the second pulse signal PWMB. The first pulse signal PWMA and the second pulse signal PWMB are pulse width modulation (PWM) control signals, and the first pulse signal PWMA and the second pulse signal PWMB are periodic pulse signals with the same duty cycle and a phase difference of 180 degrees. The hybrid voltage converter 100 can adjust the output voltage by controlling the duty cycle of the first pulse signal PWMA and the second pulse signal PWMB.

The enable signal SEQEN is a signal for a transition between the sequential conduction mode and the parallel conduction mode. When the enable signal SEQEN is high, the output of the logic circuit corresponds to the control signal for the sequential conduction mode. When the enable signal SEQEN is low, the output of the logic circuit corresponds to the control signal for the parallel conduction mode. In this way, the control mode of the hybrid voltage converter can be switched (i.e., transition between the parallel conduction mode and the sequential conduction mode) by raising the enable signal SEQEN when the output current is less than the first current threshold, thereby achieving higher power conversion efficiency.

Specifically, when the enable signal SEQEN is low, the outputs of the four NAND gates are all high, and the outputs of the four AND gates are the same as the pulse signals connected to their inputs. That is, outputs of the first AND gate AND1 and the third AND gate AND3 are the same as the first pulse signal PWMA, and outputs of the second AND gate AND2 and the fourth AND gate AND4 are the same as the second pulse signal PWMB. As mentioned earlier, this control mode corresponds to the parallel conduction mode.

When the enable signal SEQEN is high, the outputs of the four NAND gates are determined by the outputs of the two D-flip-flops. Specifically, the first D-flip-flop U1 divides the frequency of the second pulse signal PWMB by two and outputs the second selection signal PWMB/2 with a 50% duty cycle. When the second selection signal PWMB/2 is high, the output of the first NAND gate NAND1 is low. Even if the first pulse signal PWMA is high, the output of the first AND gate AND1 is low, preventing the first switch Q1 and the third switch Q3 from turning on simultaneously. Correspondingly, the input signal for the third NAND gate NAND3 is the complementary signal of the second selection signal PWMB/2. This ensures that when the first switch Q1 is turned on, the third switch Q3 cannot conduct simultaneously, even if the first pulse signal PWMA is high. Similarly, the second D-flip-flop U2 divides the frequency of the first pulse signal PWMA by two and outputs the first selection signal PWMA/2 with a 50% duty cycle. This is used to control the second switch Q2 and the fourth switch Q4 to turn on alternately, thereby achieving the sequential conduction mode.

Figure 21:
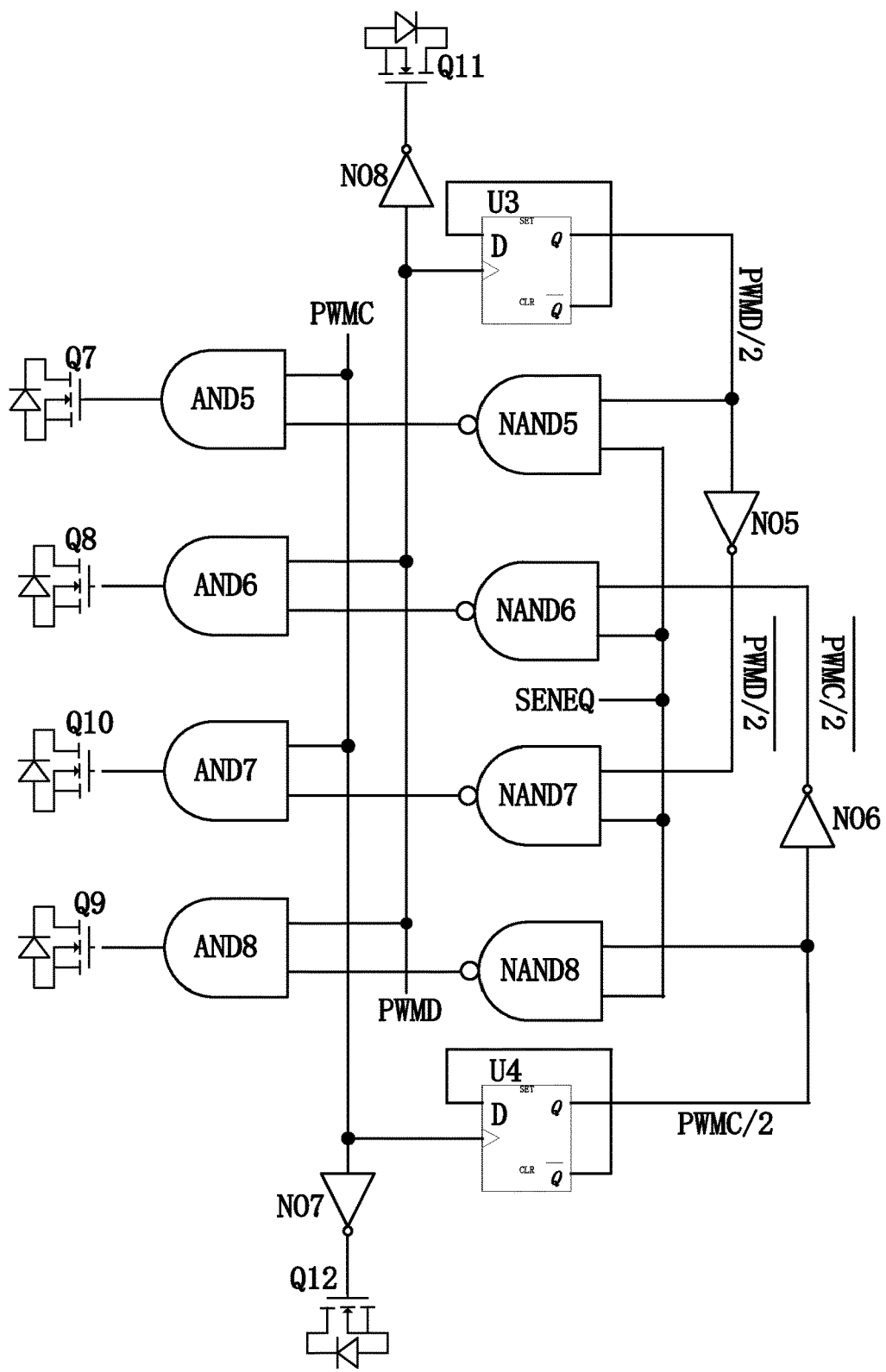
FIG. 21 is a schematic diagram of the logical control part of the hybrid voltage converter provided in an embodiment of the present application shown in FIG. 7.

In one embodiment, when the switched capacitor unit 10 and the freewheeling unit 20 have the circuit as shown in FIG. 7, as shown in FIG. 21, the hybrid voltage converter 100 further comprises a third D flip-flop U3, a fourth D flip-flop U4, a fifth NAND gate NAND5, a sixth NAND gate NAND6, a seventh NAND gate NAND7, an eighth NAND gate NAND8, a fifth AND gate AND5, a sixth AND gate AND6, a seventh AND gate AND7, an eighth AND gate AND8, a fifth NOT gate NO5, a sixth NOT gate NO6, a seventh NOT gate NO7, and an eighth NOT gate NO8.

In this configuration, the output terminal of the fifth AND gate AND5 is connected to the first terminal of the seventh switch Q7. The first input terminals of the fifth AND gate AND5, the seventh AND gate AND7, the input terminal of the seventh NOT gate NO7, and the clock input terminal of the fourth D flip-flop U4 all receive the third pulse signal PWMC generated by the controller 30. The output terminal of the seventh NOT gate NO7 is connected to the first terminal of the twelfth switch Q12. The second input terminal of the fifth AND gate AND5 is connected to the output terminal of the fifth NAND gate NAND5. The second input terminal of the fifth NAND gate NAND5 is connected to the output terminal of the third D flip-flop U3 and the input terminal of the fifth NOT gate NO5. The output terminal of the fifth NOT gate NO5 is connected to the second input terminal of the seventh NAND gate NAND7. The first input terminals of the fifth NAND gate NAND5, the sixth NAND gate NAND6, the seventh NAND gate NAND7, and the eighth NAND gate NAND8 all receive the enable signal SENEQ. The signal input terminal and the inverted output terminal of the third D flip-flop U3 are connected together. The clock input terminal of the third D flip-flop U3, the input terminal of the eighth NOT gate NO8, the first input terminal of the sixth AND gate AND6, and the first input terminal of the eighth AND gate AND8 all receive the fourth pulse signal PWMD generated by the controller 30. The output terminal of the eighth NOT gate NO8 is connected to the first terminal of the eleventh switch Q11. The output terminal of the sixth AND gate AND6 is connected to the first terminal of the eighth switch Q8. The second input terminal of the sixth AND gate AND6 is connected to the output terminal of the sixth NAND gate NAND6. The second input terminal of the sixth NAND gate NAND6 is connected to the output terminal of the sixth NOT gate NO6. The input terminal of the sixth NOT gate NO6 is connected to the second input terminal of the eighth NAND gate NAND8 and the output terminal of the fourth D flip-flop U4. The signal input terminal and the inverted output terminal of the fourth D flip-flop U4 are connected together. The output terminal of the seventh AND gate AND7 is connected to the first terminal of the tenth switch Q10. The second input terminal of the seventh AND gate AND7 is connected to the output terminal of the seventh NAND gate NAND7. The output terminal of the eighth AND gate AND8 is connected to the first terminal of the ninth switch Q9. The second input terminal of the eighth AND gate AND8 is connected to the output terminal of the eighth NAND gate NAND8.

Specifically, the specific implementation process of this embodiment is similar to the detailed description for FIG. 20 mentioned above, within the understanding of those skilled in the art in this field and is not further elaborated here.

In another embodiment, based on the circuit structure shown in FIG. 7, the switched capacitor unit 10 further comprises a thirteenth switch Q13, a fourteenth switch Q14, a sixth capacitor C6, and a seventh capacitor C7. The connection between the switched capacitor unit 10 and the freewheeling unit 20 can be referred to as described in FIG. 11 and will not be repeated here.

Figure 22:
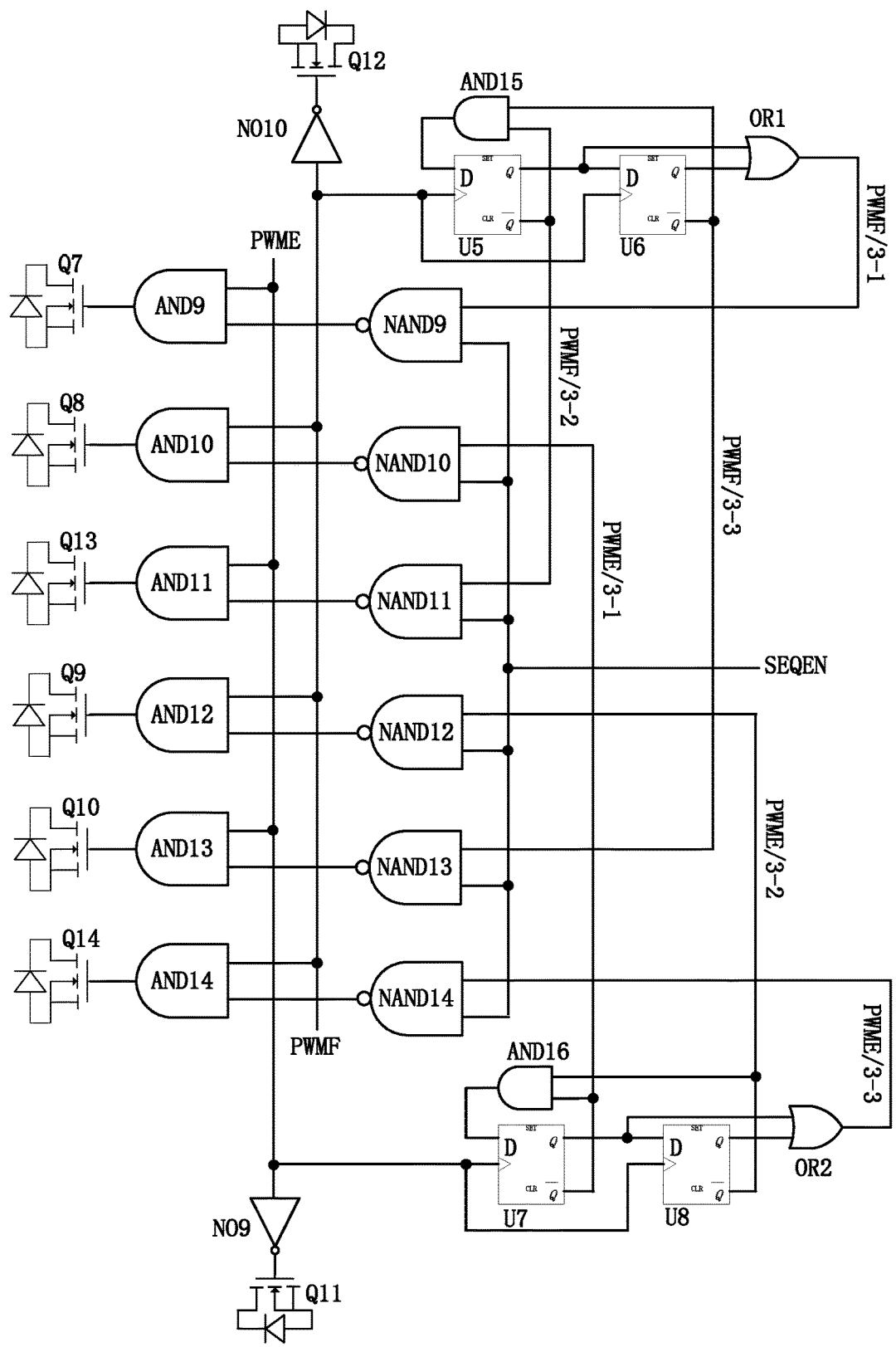
FIG. 22 is a schematic diagram of the logical control part of the hybrid voltage converter provided in an embodiment of the present application shown in FIG. 11.

At the same time, as shown in FIG. 22, in this embodiment, the hybrid voltage converter 100 further comprises a fifth D flip-flop U5, a sixth D flip-flop U6, a seventh D flip-flop U7, an eighth D flip-flop U8, a ninth NAND gate NAND9, a tenth NAND gate NAND10, an eleventh NAND gate NAND11, a twelfth NAND gate NAND12, a thirteenth NAND gate NAND13, a fourteenth NAND gate NAND14, a ninth AND gate AND9, a tenth AND gate AND10, an eleventh AND gate AND11, a twelfth AND gate AND12, a thirteenth AND gate AND13, a fourteenth AND gate AND14, a fifteenth AND gate AND15, a sixteenth AND gate AND16, a first OR gate OR1, a second OR gate OR2, a ninth NOT gate NO9, and a tenth NOT gate NO10.

Among them, the output terminal of the ninth AND gate AND9 is connected to the first terminal of the seventh switch Q7. The first input terminal of the ninth AND gate AND9, the first input terminal of the eleventh AND gate AND11, the first input terminal of the thirteenth AND gate AND13, the input terminal of the ninth NOT gate NO9, the clock input terminal of the seventh D flip-flop U7, and the clock input terminal of the eighth D flip-flop U8 all receive the fifth pulse signal PWME generated by the controller 30. The output terminal of the ninth NOT gate NO9 is connected to the first terminal of the eleventh switch Q11. The second input terminal of the ninth AND gate AND9 is connected to the output terminal of the ninth NAND gate NAND9. The first input terminals of the ninth NAND gate NAND9, the tenth NAND gate NAND10, the eleventh NAND gate NAND11, the twelfth NAND gate NAND12, the thirteenth NAND gate NAND13, and the fourteenth NAND gate NAND14 all receive the enable signal SEQEN. The second input terminal of the ninth NAND gate NAND9 is connected to the output terminal of the first OR gate OR1. The first input terminal of the first OR gate OR1 is connected to the output terminal of the sixth D flip-flop U6. The inverted output terminal of the sixth D flip-flop U6 is connected to the first input terminal of the fifteenth AND gate AND15 and the second input terminal of the thirteenth NAND gate NAND13. The signal input terminal of the sixth D flip-flop U6 is connected to the second input terminal of the first OR gate OR1 and the output terminal of the fifth D flip-flop U5. The inverted output terminal of the fifth D flip-flop U5 is connected to the second input terminal of the fifteenth AND gate AND15 and the second input terminal of the eleventh NAND gate NAND11. The signal input terminal of the fifth D flip-flop U5 is connected to the output terminal of the fifteenth AND gate AND15. The clock input terminals of the fifth D flip-flop U5, the sixth D flip-flop U6, the input terminal of the tenth NOT gate NO10, the first input terminal of the tenth AND gate AND10, the first input terminal of the twelfth AND gate AND12, and the first input terminal of the fourteenth AND gate AND14 all receive the sixth pulse signal PWMF generated by the controller 30. The output terminal of the tenth NOT gate NO10 is connected to the first terminal of the twelfth switch Q12. The output terminal of the tenth AND gate AND10 is connected to the first terminal of the eighth switch Q8. The second input terminal of the tenth AND gate AND10 is connected to the output terminal of the tenth NAND gate NAND10. The second input terminal of the tenth NAND gate NAND10 is connected to the second input terminal of the sixteenth AND gate AND16 and the inverted output terminal of the seventh D flip-flop U7. The second input terminal of the sixteenth AND gate AND16 is connected to the second input terminal of the twelfth NAND gate NAND12 and the inverted output terminal of the eighth D flip-flop U8. The output terminal of the sixteenth AND gate AND16 is connected to the signal input terminal of the seventh D flip-flop U7. The output terminal of the eighth D flip-flop U8 is connected to the first input terminal of the second OR gate OR2. The signal input terminal of the eighth D flip-flop U8 is connected to the second input terminal of the second OR gate OR2 and the output terminal of the seventh D flip-flop U7. The output terminal of the second OR gate OR2 is connected to the second input terminal of the fourteenth NAND gate NAND14. The output terminal of the eleventh NAND gate NAND11 is connected to the second input terminal of the eleventh AND gate AND11. The output terminal of the eleventh AND gate AND11 is connected to the first terminal of the thirteenth switch Q13. The output terminal of the twelfth NAND gate NAND12 is connected to the second input terminal of the twelfth AND gate AND12. The output terminal of the twelfth AND gate AND12 is connected to the first terminal of the ninth switch Q9. The output terminal of the thirteenth NAND gate NAND13 is connected to the second input terminal of the thirteenth AND gate AND13. The output terminal of the thirteenth AND gate AND13 is connected to the first terminal of the tenth switch Q10. The output terminal of the fourteenth NAND gate NAND14 is connected to the second input terminal of the fourteenth AND gate AND14. The output terminal of the fourteenth AND gate AND14 is connected to the first terminal of the fourteenth switch Q14.

Specifically, the control signals for the seventh switch Q7 through the fourteenth switch Q14 are generated based on the fifth pulse signal PWME and the sixth pulse signal PWMF. The fifth pulse signal PWME and the sixth pulse signal PWMF are periodic pulse signals with the same duty cycle and a phase difference of 180 degrees. The hybrid voltage converter 100 can adjust the output voltage by controlling the duty cycles of the fifth pulse signal PWME and the sixth pulse signal PWMF.

When the enable signal SEQEN is at a high level, the output of the logic circuit corresponds to the control signal for the sequential conduction mode. When the enable signal SEQEN is at a low level, the output of the logic circuit corresponds to the control signal for the parallel conduction mode. This allows the transition between the control modes of the hybrid voltage converter (i.e., the sequential conduction mode and the parallel conduction mode) by raising the enable signal SEQEN when the output current is below the first current threshold, thereby achieving higher power conversion efficiency.

In this embodiment, when the enable signal SEQEN is at a low level, the outputs of the six NAND gates are all high. As a result, the outputs of the six AND gates are the same as the pulse signals (either the fifth pulse signal PWME or the sixth pulse signal PWMF) connected to their inputs. As mentioned earlier, this control mode corresponds to the parallel conduction mode.

When the enable signal SEQEN is at a high level, the outputs of the ninth NAND gate NAND9, the eleventh NAND gate NAND11, and the thirteenth NAND gate NAND13 are determined by the outputs of the fifth D flip-flop U5 and the sixth D flip-flop U6. The combination of the fifth D flip-flop U5, the sixth D flip-flop U6, the first OR gate OR1, and the fifteenth AND gate AND15 is used to divide the frequency of the sixth pulse signal PWMF by three and generate three phase-shifted, $2/3$ duty cycle signals (namely, the first sixth selection signal PWMF/3-1, the second sixth selection signal PWMF/3-2, and the third sixth selection signal PWMF/3-3). When the first sixth selection signal PWMF/3-1 is at a high level, the output of the ninth NAND gate NAND9 is low. In this case, even if the fifth pulse signal PWME is at a high level, the output of the ninth AND gate AND9 can only be low. This prevents the simultaneous conduction of the seventh switch Q7 and either the tenth switch Q10 or the thirteenth switch Q13, achieving sequential conduction of the seventh switch Q7, the tenth switch Q10, and the thirteenth switch Q13. Correspondingly, the selection signal input of the eleventh NAND gate NAND11 is the second sixth selection signal PWMF/3-2. When the seventh switch Q7 is turned on, the second sixth selection signal PWMF/3-2 is at a high level, causing the eleventh NAND gate NAND11 to output a low level. This prevents the simultaneous conduction of the thirteenth switch Q13 even when the fifth pulse signal PWME is at a high level.

Similarly, the combination of the seventh D flip-flop U7, the eighth D flip-flop U8, the second OR gate OR2, and the sixteenth AND gate AND16 is used to divide the frequency of the fifth pulse signal PWME by three and generate three phase-shifted, $2/3$ duty cycle signals (namely, the first fifth selection signal PWME/3-1, the second fifth selection signal PWME/3-2, and the third fifth selection signal PWME/3-3). Thus, these three selection signals are used to control the alternate conduction of the eighth switch Q8, the ninth switch Q9, and the fourteenth switch Q14, thereby achieving a sequential conduction control method.

Figure 23:
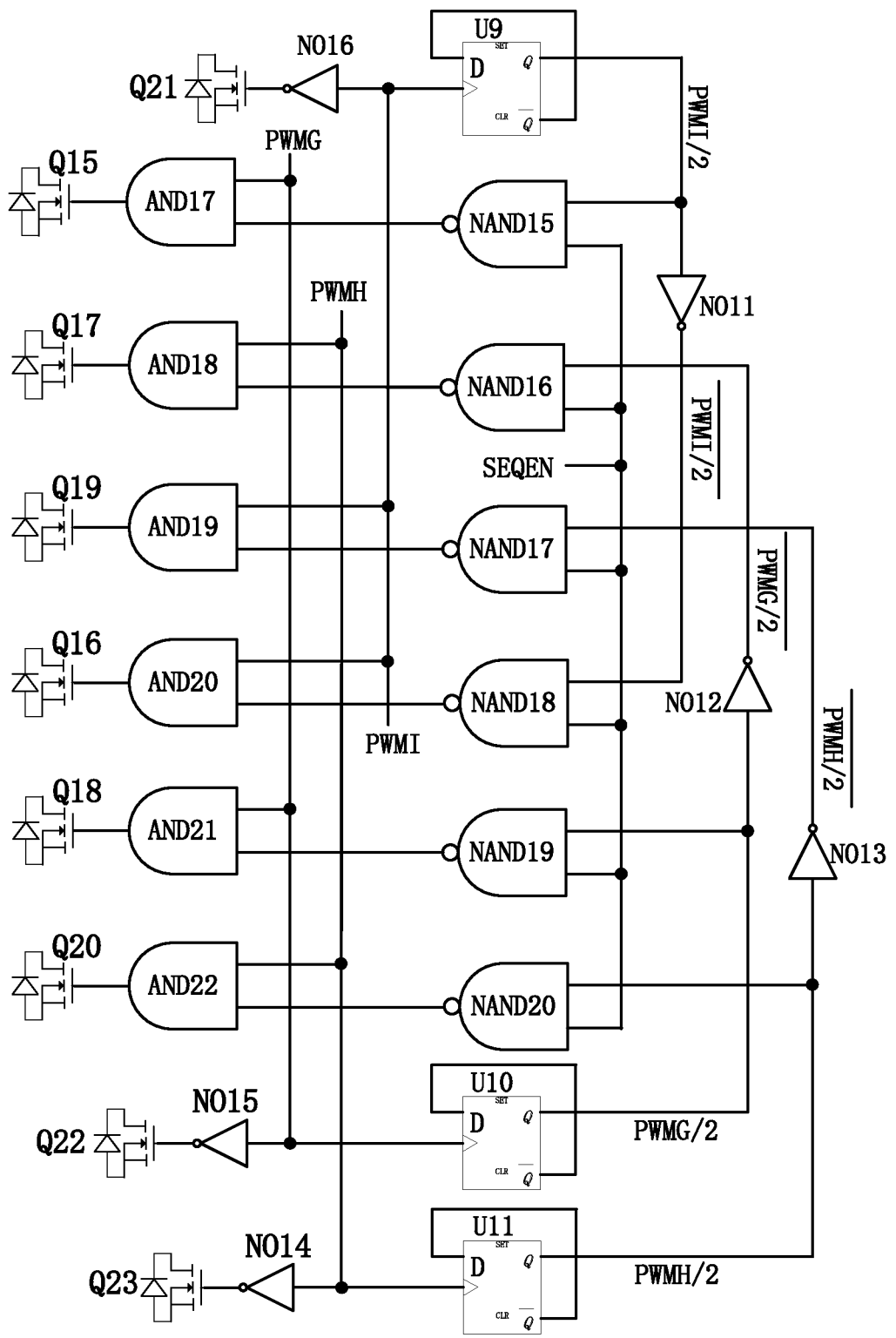
FIG. 23 is a schematic diagram of the logical control part of the hybrid voltage converter provided in an embodiment of the present application shown in FIG. 15.

In one embodiment, when the circuit structure of the switched capacitor unit 10 and the freewheeling unit 20 is as shown in FIG. 15, as shown in FIG. 23, the hybrid voltage converter 100 further comprises a ninth D flip-flop U9, a tenth D flip-flop U10, an eleventh D flip-flop U11, an fifteenth NAND gate NAND15, an sixteenth NAND gate NAND16, a seventeenth NAND gate NAND17, an eighteenth NAND gate NAND18, a nineteenth NAND gate NAND19, a twentieth NAND gate NAND20, a seventeenth AND gate AND17, a eighteenth AND gate AND18, a nineteenth AND gate AND19, a twentieth AND gate AND20, a twenty-first AND gate AND21, a twenty-second AND gate AND22, an eleventh NOT gate NO11, a twelfth NOT gate NO12, a thirteenth NOT gate NO13, a fourteenth NOT gate NO14, a fifteenth NOT gate NO15, and a sixteenth NOT gate NO16.

In this arrangement, the output of the seventeenth AND gate AND17 is connected to the first terminal of the fifteenth switch Q15. The first input of the seventeenth AND gate AND17, the first input of the twenty-first AND gate AND21, the input of the fifteenth NOT gate NO15, and the clock input of the tenth D flip-flop U10 all receive the seventh pulse signal PWMG generated by the controller 30. The output of the fifteenth NOT gate NO15 is connected to the first terminal of the twenty-second switch Q22. The second input of the seventeenth AND gate AND17 is connected to the output of the fifteenth NAND gate NAND15. The second input of the fifteenth NAND gate NAND15 is connected to the input of the eleventh NOT gate NO11 and the output of the ninth D flip-flop U9. The output of the eleventh NOT gate NO11 is connected to the second input of the eighteenth NAND gate NAND18. The inverted output of the ninth D flip-flop U9 is connected to the signal input of the ninth D flip-flop U9. The clock input of the ninth D flip-flop U9, the input of the sixteenth NOT gate NO16, the first input of the nineteenth AND gate AND19, and the first input of the twentieth AND gate AND20 all receive the ninth pulse signal PWMI generated by the controller 30. The output of the sixteenth NOT gate NO16 is connected to the twenty-first switch Q21. The first inputs of the fifteenth NAND gate NAND15, the sixteenth NAND gate NAND16, the seventeenth NAND gate NAND17, the eighteenth NAND gate NAND18, the nineteenth NAND gate NAND19, and the twentieth NAND gate NAND20 all receive the enable signal SENEQ. The output of the eighteenth AND gate AND18 is connected to the first terminal of the seventeenth switch Q17. The first input of the eighteenth AND gate AND18, the first input of the twenty-second AND gate AND22, the input of the fourteenth NOT gate NO14, and the clock input of the eleventh D flip-flop U11 all receive the eighth pulse signal PWMH generated by the controller 30. The output of the fourteenth NOT gate NO14 is connected to the twenty-third switch Q23. The second input of the eighteenth AND gate AND18 is connected to the output of the sixteenth NAND gate NAND16. The second input of the sixteenth NAND gate NAND16 is connected to the output of the twelfth NOT gate NO12. The input of the twelfth NOT gate NO12 is connected to the second input of the nineteenth NAND gate NAND19 and the output of the tenth D flip-flop U10. The inverted output of the tenth D flip-flop U10 is connected to the signal input terminal of the tenth D flip-flop U10. The output of the nineteenth AND gate AND19 is connected to the first terminal of the nineteenth switch Q19. The second input of the nineteenth AND gate AND19 is connected to the output of the seventeenth NAND gate NAND17. The second input of the seventeenth NAND gate NAND17 is connected to the output of the thirteenth NOT gate NO13. The input of the thirteenth NOT gate NO13 is connected to the second input of the twentieth NAND gate NAND20 and the output of the eleventh D flip-flop U11. The inverted output of the eleventh D flip-flop U11 is connected to the signal input terminal of the eleventh D flip-flop U11. The output of the twentieth AND gate AND20 is connected to the first terminal of the sixteenth switch Q16. The second input of the twentieth AND gate AND20 is connected to the output of the eighteenth NAND gate NAND18. The output of the twenty-first AND gate AND21 is connected to the first terminal of the eighteenth switch Q18. The second input of the twenty-first AND gate AND21 is connected to the output of the nineteenth NAND gate NAND19. The output of the twenty-second AND gate AND22 is connected to the first terminal of the twentieth switch Q20. The second input of the twenty-second AND gate AND22 is connected to the output of the twentieth NAND gate NAND20.

In this specific implementation, the control signals for the fifteenth switch Q15 through the twenty-third switch Q23 are generated from the seventh pulse signal PWMG, the eighth pulse signal PWMH, and the ninth pulse signal PWMI. The seventh pulse signal PWMG, the eighth pulse signal PWMH, and the ninth pulse signal PWMI are periodic pulse signals with the same duty cycle and a phase difference of 120 degrees. The hybrid voltage converter 100 can adjust the output voltage by controlling the duty cycles of the seventh pulse signal PWMG, the eighth pulse signal PWMH, and the ninth pulse signal PWMI.

In this embodiment, when the enable signal SEQEN is at a high level, the output of the logic circuit corresponds to the control signal for the sequential conduction mode. Conversely, when the enable signal SEQEN is at a low level, the output of the logic circuit corresponds to the control signal for parallel conduction mode. This allows the transition between the control modes of the hybrid voltage converter (i.e., the sequential conduction mode and the parallel conduction mode) by raising the enable signal SEQEN when the output current is below the first current threshold, thereby achieving higher power conversion efficiency.

In this embodiment, when the enable signal SEQEN is at a low level, the outputs of the six NAND gates are all high. Consequently, the outputs of the six AND gates are the same as the pulse signals (i.e., the seventh pulse signal PWMG, the eighth pulse signal PWMH, or the ninth pulse signal PWMI) connected to their inputs. As mentioned earlier, this control mode is referred to as the parallel conduction mode.

In this embodiment, when the enable signal SEQEN is at a high level, the outputs of the fifteenth NAND gate (NAND15) and the eighteenth NAND gate (NAND18) are determined by the output of the ninth D flip-flop U9. The role of the ninth D flip-flop U9 is to divide the frequency of the ninth pulse signal PWMI by two and generate a 50% duty cycle ninth selection signal PWMI/2. When the ninth selection signal PWMI/2 is at a high level, the output of the fifteenth NAND gate NAND15 is low. In this situation, even if the seventh pulse signal PWMG is at a high level, the output of the fifteenth NAND gate NAND15 remains low. This prevents simultaneous conduction of the fifteenth switch Q15 and the eighteenth switch Q18, achieving sequential conduction of the fifteenth switch Q15, the seventeenth switch Q17, the nineteenth switch Q19, the sixteenth switch Q16, the eighteenth switch Q18, and the twentieth switch Q20. Correspondingly, the selection signal input for the nineteenth NAND gate NAND19 is the seventh selection signal PWMG/2, which is phase-shifted by 120 degrees from the ninth selection signal PWMI/2. When the fifteenth switch Q15 is turned on, the seventh selection signal PWMG/2 is at a high level, causing the nineteenth NAND gate NAND19 to output a low level. This ensures that even if the seventh pulse signal PWMG is at a high level, the eighteenth switch Q18 cannot conduct simultaneously.

Similarly, the tenth D flip-flop U10 divides the frequency of the seventh pulse signal PWMG by two and generates a 50% duty cycle seventh selection signal PWMG/2. The eleventh D flip-flop U11 divides the frequency of the eighth pulse signal PWMH by two and generates a 50% duty cycle eighth selection signal PWMH/2. Therefore, by using the seventh selection signal PWMG/2 and the eighth selection signal PWMH/2 to control the alternate conduction of the seventeenth switch Q17, nineteenth switch Q19, eighteenth switch Q18, and twentieth switch Q20, the sequential conduction mode is achieved.

Finally, it should be noted that the above embodiments are only intended to illustrate the technical solutions of the present application, not to limit them. Under the concept of the present application, the technical features in the above embodiments or different embodiments can be combined, and the steps can be implemented in any order. Many other variations of the aspects of the present application, as mentioned above, exist. For the sake of brevity, they have not been detailed here. Although detailed descriptions of the present application have been provided with reference to the aforementioned embodiments, those skilled in the art should understand that modifications can still be made to the technical solutions recorded in the aforementioned embodiments. Partial technical features can be equivalently replaced. However, such modifications or replacements do not depart from the scope of the technical solutions of the embodiments of the present application.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A switch control method, applicable to a hybrid voltage converter comprising a switched capacitor unit and a freewheeling unit connected at N switch nodes, wherein N is an integer greater than 1, the switch control method comprising:
    continuously monitoring an output current of the hybrid voltage converter;
    controlling switches in the hybrid voltage converter to operate in a parallel conduction mode when the output current is greater than a first current threshold; and
    controlling the switches in the hybrid voltage converter to operate in a sequential conduction mode when the output current is less than the first current threshold, wherein:
        when the switches in the hybrid voltage converter operate in the parallel conduction mode, N switch groups in the switched capacitor unit are controlled to turn on and off with a same duty cycle and a phase shift of (360/N) degrees, with each switch group comprising at least two switches, and each switch in the freewheeling unit corresponds to a switch group in the switched capacitor unit, and the switches in the freewheeling unit turn on and off complementary to their corresponding switch groups in the switched capacitor unit; and
        when the switches in the hybrid voltage converter operate in the sequential conduction mode, each switch in the switched capacitor unit turns on sequentially and individually with the same duty cycle, each switch in the freewheeling unit is turned off when any switch of their corresponding switch group in the switched capacitor unit is turned on, and each switch in the freewheeling unit is turned on when all switches in their corresponding switch group in the switched capacitor unit are turned off.

2. The switch control method according to claim 1, further comprising:
    after a transition between parallel conduction mode and sequential conduction mode, maintaining the control signal of each switch of the hybrid voltage converter to be derived from a same pulse-width modulation signal as before the transition.

3. The switch control method according to claim 1, further comprising:
    transitioning the hybrid voltage converter from a pulse-width modulation control mode to a pulse-frequency modulation control mode when the output current falls below a second current threshold and configuring the switches in the hybrid voltage converter to maintain in the sequential conduction mode, wherein the second current threshold is equal or lower than the first current threshold.

4. The switch control method according to claim 1, wherein:
    the switched capacitor unit comprises a first switch, a second switch, a third switch, a fourth switch, a first input capacitor, a first capacitor, a second capacitor, and a third capacitor;
    the freewheeling unit comprises a fifth switch, a sixth switch, a first output capacitor, a first inductor, and a second inductor; and
    the switched capacitor unit and the freewheeling unit are connected at a first switch node and a second switch node wherein:
        a third terminal of the first switch is connected to an input power source and a first terminal of the first input capacitor;
        a second terminal of the first switch is connected to a third terminal of the second switch and a first terminal of the first capacitor;
        a second terminal of the second switch is connected to a first terminal of the second capacitor and a third terminal of the third switch;
        a second terminal of the third switch is connected to a third terminal of the fourth switch and a first terminal of the third capacitor;
        a second terminal of the fourth switch is connected to a third terminal of the fifth switch, a second terminal of the second capacitor, and a first terminal of the second inductor at the second switch node;
        a third terminal of the sixth switch is connected to a second terminal of the first capacitor, a second terminal of the third capacitor, and a first terminal of the first inductor at the first switch node;
        a second terminal of the first inductor is connected to a second terminal of the second inductor and a first terminal of the first output capacitor; and
        a second terminal of the first input capacitor, a second terminal of the fifth switch, a second terminal of the sixth switch, and a second terminal of the first output capacitor are all grounded.

5. The switch control method according to claim 4, further comprising:
    when the output current exceeds the first current threshold, controlling a first switch group comprising the first switch and the third switch, and a second switch group comprising the second switch and the fourth switch, to alternately turn on and off with a same duty cycle and a phase shift of 180 degrees, controlling the fifth switch to turn on and off in a complementary manner with the second switch group, and controlling the sixth switch to turn on and off in a complementary manner with the first switch group; and
    when the output current falls below the first current threshold, controlling the first switch, the second switch, the third switch, and the fourth switch to conduct individually with a same duty cycle in a sequential order, controlling the fifth switch to turn off when the second switch or the fourth switch is turned on and controlling the fifth switch to turn on when both the second switch and the fourth switch are turn off, controlling the sixth switch to turn off when the first switch or the third switch is turned on, and controlling the sixth switch to turn on when both the first switch and the third switch are turn off.

6. The switch control method according to claim 4, further comprising:
generating a first pulse signal and a second pulse signal, wherein the first pulse signal and the second pulse signal are periodic pulse signals with a same duty cycle and a 180-degree phase shift;
controlling the sixth switch through a complementary signal of the first pulse signal, and controlling the fifth switch through a complementary signal of the second pulse signal;
when the output current exceeds the first current threshold, controlling the first switch and the third switch through the first pulse signal, and controlling the second switch and the fourth switch through the second pulse signal, wherein:
based on the first pulse signal, a first selection signal is generated with a frequency equal to one half of that of the first pulse signal, and a duty cycle of the first selection signal is equal to ½;
based on the second pulse signal, a second selection signal is generated with a frequency equal to one half of that of the second pulse signal, and a duty cycle of the second selection signal is equal to ½; and
when the output current falls below the first current threshold, controlling the first switch based on a logical AND operation result of the first pulse signal and the complement of the second selection signal, controlling the second switch based on a logical AND operation result of the second pulse signal and the first selection signal, controlling the third switch based on a logical AND operation result of the first pulse signal and the second selection signal, and controlling the fourth switch based on a logical AND operation result of the second pulse signal and the complementary signal of the first selection signal.

7. The switch control method according to claim 1, wherein:
the switched capacitor unit comprises a seventh switch, an eighth switch, a ninth switch, a tenth switch, a second input capacitor, a fourth capacitor, and a fifth capacitor;
the freewheeling unit comprises an eleventh switch, a twelfth switch, a third inductor, a fourth inductor, and a second output capacitor; and
the switched capacitor unit and the freewheeling unit are connected at a third switch node and a fourth switch node, and wherein:
a third terminal of the seventh switch is connected to an input power source, a first terminal of the second input capacitor and a third terminal of the ninth switch;
a second terminal of the seventh switch is connected to a third terminal of the eighth switch and a first terminal of the fourth capacitor;
a second terminal of the eighth switch is connected to a third terminal of the eleventh switch, a second terminal of the fifth capacitor and a first terminal of the fourth inductor;
a second terminal of the ninth switch is connected to a first terminal of the fifth capacitor and a third terminal of the tenth switch;
a second terminal of the tenth switch is connected to a second terminal of the fourth capacitor, a third terminal of the twelfth switch and a first terminal of the third inductor;
a second terminal of the third inductor is connected to a second terminal of the fourth inductor and a first terminal of the second output capacitor; and
a second terminal of the second input capacitor, a second terminal of the eleventh switch, a second terminal of the twelfth switch, and a second terminal of the second output capacitor are all grounded.

8. The switch control method according to claim 7, further comprising:
when the output current is greater than the first current threshold, controlling a third switch group comprising the seventh switch and the tenth switch, and a fourth switch group comprising the eighth switch and the ninth switch, to alternately turn on and off with a same duty cycle and a phase shift of 180 degrees, controlling the eleventh switch and the fourth switch group to alternately turn on and off in a complementary manner, and controlling the twelfth switch and the third switch group to alternately turn on and off in a complementary manner; and
when the output current is less than the first current threshold, controlling the seventh switch, the ninth switch, the eighth switch, and the tenth switch to turn on individually with a same duty cycle in a sequential order, controlling the eleventh switch to turn off when the eighth switch or the ninth switch is turned on, to turn on when both the eighth switch and the ninth switch are turned off, controlling the twelfth switch to turn off when the seventh switch or the tenth switch is turned on, and to turn on when both the seventh switch and the tenth switch are turned off.

9. The switch control method according to claim 7, further comprising:
generating a third pulse signal and a fourth pulse signal, wherein the third pulse signal and the fourth pulse signal are periodic pulse signals with a same duty cycle and a phase difference of 180 degrees;
controlling the twelfth switch with a complementary signal of the third pulse signal and controlling the eleventh switch with a complementary signal of the fourth pulse signal;
when the output current is greater than the first current threshold, controlling the seventh switch and the tenth switch with the third pulse signal, and controlling the eighth switch and the ninth switch with the fourth pulse signal, and wherein:
based on the third pulse signal, a third selection signal is generated with a frequency equal to one half of a frequency of the third pulse signal, and a duty cycle of the third selection signal equal to ½;
based on the fourth pulse signal, a fourth selection signal is generated with a frequency equal to one half of a frequency of the fourth pulse signal, and a duty cycle of the fourth selection signal equal to ½; and
when the output current is less than the first current threshold, controlling the seventh switch with a logical AND operation result of the third pulse signal and the complementary signal of the fourth selection signal, controlling the eighth switch with a logical AND operation result of the fourth pulse signal and the third selection signal, controlling the tenth switch with a logical AND operation result of the third pulse signal and the fourth selection signal, and controlling the ninth switch with a logical AND operation result of the fourth pulse signal and the complementary signal of the third selection signal.

10. The switch control method according to claim 1, the switched capacitor unit comprises a seventh switch, an eighth switch, a ninth switch, a tenth switch, a thirteenth switch, a fourteenth switch, a second input capacitor, a fourth capacitor, a fifth capacitor, a sixth capacitor, and a seventh capacitor;
the freewheeling unit comprises an eleventh switch, a twelfth switch, a third inductor, a fourth inductor, and a second output capacitor; and
the switched capacitor unit and the freewheeling unit are connected at a third switch node and a fourth switch node, and wherein:
a third terminal of the seventh switch is connected to an input power source, a first terminal of the second input capacitor and a third terminal of the ninth switch;
a second terminal of the seventh switch is connected to a third terminal of the eighth switch and a first terminal of the fourth capacitor;
a second terminal of the eighth switch is connected to a third terminal of the thirteenth switch and a first terminal of the sixth capacitor;
a second terminal of the ninth switch is connected to a first terminal of the fifth capacitor and a third terminal of the tenth switch;
a second terminal of the tenth switch is connected to a third terminal of the fourteenth switch, and a first terminal of the seventh capacitor;
a second terminal of the third inductor is connected to a second terminal of the fourth inductor and a first terminal of the second output capacitor;
a second terminal of the second input capacitor, a second terminal of the eleventh switch, a second terminal of the twelfth switch, and a second terminal of the second output capacitor are all grounded;
a second terminal of the thirteenth switch is connected to a second terminal of the seventh capacitor, a second terminal of the fourth capacitor, a third terminal of the eleventh switch and a first terminal of the third inductor at the third switch node; and
a second terminal of the fourteenth switch is connected to a second terminal of the sixth capacitor, a second terminal of the fifth capacitor, a third terminal of the twelfth switch and a first terminal of the fourth inductor at the fourth switch node.

11. The switch control method according to claim 10, further comprising:
when the output current is greater than the first current threshold, controlling a fifth switch group comprising the seventh switch, the tenth switch, and the thirteenth switch, and a sixth switch group comprising the eighth switch, the ninth switch, and the fourteenth switch to alternately turn on and off with a same duty cycle and 180 degrees out of phase, controlling the eleventh switch to turn on and off in a complementary manner with the fifth switch group, controlling the twelfth switch to turn on and off in a complementary manner with the sixth switch group; and
when the output current is less than the first current threshold, controlling the seventh switch, the ninth switch, the eighth switch, the tenth switch, the thirteenth switch, and the fourteenth switch to turn on sequentially and individually with a same duty cycle, controlling the twelfth switch to turn off when the eighth switch, the ninth switch, or the fourteenth switch is turned on, and to turn on when the eighth switch, the ninth switch, and the fourteenth switch are all turned off, controlling the eleventh switch to turn off when the seventh switch, the tenth switch, or the thirteenth switch is turned on, and to turn on when the seventh switch, the tenth switch, and the thirteenth switch are all turned off.

12. The switch control method according to claim 10, further comprising:
generating a fifth pulse signal and a sixth pulse signal, wherein the fifth pulse signal and the sixth pulse signal are periodic pulse signals with a same duty cycle and 180 degrees out of phase;
controlling the twelfth switch with a complementary signal of the sixth pulse signal and controlling the eleventh switch with a complementary signal of the fifth pulse signal;
when the output current is greater than the first current threshold, controlling the seventh switch, the tenth switch, and the thirteenth switch with the fifth pulse signal, and controlling the eighth switch, the ninth switch, and the fourteenth switch with the sixth pulse signal, and wherein:
based on the fifth pulse signal, a first fifth selection signal, a second fifth selection signal, and a third fifth selection signal are generated, and wherein frequencies of the first fifth selection signal, the second fifth selection signal, and the third fifth selection signal are equal to $\frac{1}{3}$ of that of the fifth pulse signal, and the first fifth selection signal, the second fifth selection signal, and the third fifth selection signal are sequentially phase-shifted by 120 degrees and have a duty cycle of $\frac{2}{3}$;
based on the sixth pulse signal, a first sixth selection signal, a second sixth selection signal, and a third sixth selection signal are generated, and wherein frequencies of the first sixth selection signal, the second sixth selection signal, and the third sixth selection signal are equal to $\frac{1}{3}$ of that of the sixth pulse signal, and the first sixth selection signal, the second sixth selection signal, and the third sixth selection signal are sequentially phase-shifted by 120 degrees and have a duty cycle of $\frac{2}{3}$; and
when the output current is less than the first current threshold, controlling the seventh switch with a logical AND operation result of the fifth pulse signal and the complementary signal of the first sixth selection signal, controlling the eighth switch with a logical AND operation result of the sixth pulse signal and the complementary signal of the first fifth selection signal, controlling the thirteenth switch with a logical AND operation result of the fifth pulse signal and the complementary signal of the second sixth selection signal, controlling the ninth switch with a logical AND operation result of the sixth pulse signal and the complementary signal of the second fifth selection signal, controlling the tenth switch with a logical AND operation result of the fifth pulse signal and the complementary signal of the third sixth selection signal, and controlling the fourteenth switch with a logical AND operation result of the sixth pulse signal and the complementary signal of the third fifth selection signal.

13. The switch control method according to claim 1, wherein:
the switched capacitor unit comprises a fifteenth switch, a sixteenth switch, a seventeenth switch, an eighteenth switch, a nineteenth switch, a twentieth switch, a third input capacitor, an eighth capacitor, a ninth capacitor, and a tenth capacitor;

the freewheeling unit further comprises a twenty-first switch, a twenty-second switch, a twenty-third switch, a third output capacitor, a fifth inductor, a sixth inductor, and a seventh inductor; and the switched capacitor unit and the freewheeling unit are connected to a fifth switch node, a sixth switch node, and a seventh switch node, and wherein:

a third terminal of the fifteenth switch is connected to an input power supply, a third terminal of the seventeenth switch, a third terminal of the nineteenth switch, and a first terminal of the third input capacitor;

a second terminal of the fifteenth switch is connected to a third terminal of the sixteenth switch and a first terminal of the eighth capacitor;

a second terminal of the sixteenth switch is connected to a third terminal of the twenty-first switch, a second terminal of the tenth capacitor, and a first terminal of the fifth inductor at the fifth switch node;

a second terminal of the seventeenth switch is connected to a third terminal of the eighteenth switch and a first terminal of the ninth capacitor;

a second terminal of the eighteenth switch is connected to a second terminal of the eighth capacitor, a third terminal of the twenty-second switch, and a first terminal of the sixth inductor at the sixth switch node;

a second terminal of the nineteenth switch is connected to a first terminal of the tenth capacitor and a third terminal of the twentieth switch;

a second terminal of the twentieth switch is connected to a third terminal of the twenty-third switch, a second terminal of the ninth capacitor, and a first terminal of the seventh inductor at the seventh switch node;

a second terminal of the fifth inductor is connected to a second terminal of the sixth inductor, a second terminal of the seventh inductor, and a first terminal of the third output capacitor;

a second terminal of the third input capacitor, a second terminal of the third output capacitor, a second terminal of the twenty-first switch, a second terminal of the twenty-second switch, and a second terminal of the twenty-third switch are all grounded.

14. The switch control method according to claim 13, further comprising:

when the output current is greater than the first current threshold, controlling a seventh switch group comprising the fifteenth switch and the eighteenth switch, an eighth switch group comprising the seventeenth switch and the twentieth switch, and a ninth switch group comprising the nineteenth switch and the sixteenth switch, to be turned on and off with a same duty cycle and a phase-shift of 120 degrees, controlling the twenty-first switch and the ninth switch group to alternately turn on and off in a complementary manner, controlling the twenty-second switch and the seventh switch group to alternately turn on and off in a complementary manner, controlling the twenty-third switch and the eighth switch group to alternately turn on and off in a complementary manner; and when the output current is less than the first current threshold, controlling the fifteenth switch, the seventeenth switch, the nineteenth switch, the sixteenth switch, the eighteenth switch, and the twentieth switch to be individually turned on sequentially with a same duty cycle, controlling the twenty-first switch to turn off when the sixteenth switch or the nineteenth switch is turned on, and to turn on when both the sixteenth switch and the nineteenth switch are turned off, controlling the twenty-second switch to turn off when the fifteenth switch or the eighteenth switch is turned on, and to turn on when both the fifteenth switch and the eighteenth switch are turned off, and controlling the twenty-third switch to turn off when the seventeenth switch or the twentieth switch is turned on, and to turn on when both the seventeenth switch and the twentieth switch are turned off.

15. The switch control method according to claim 13, further comprising:

generating a seventh pulse signal, an eighth pulse signal, and a ninth pulse signal, wherein the seventh pulse signal, the eighth pulse signal, and the ninth pulse signal are periodic pulse signals with a same duty cycle and a phase-shift of 120 degrees;

controlling the twenty-first switch with a complementary signal of the ninth pulse signal, controlling the twenty-second switch with a complementary signal of the seventh pulse signal, and controlling the twenty-third switch with a complementary signal of the eighth pulse signal;

when the output current is greater than the first current threshold, controlling the fifteenth switch and the eighteenth switch with the seventh pulse signal, controlling the seventeenth switch and the twentieth switch with the eighth pulse signal, and controlling the sixteenth switch and the nineteenth switch with the ninth pulse signal, and wherein:

a seventh selection signal is generated based on the seventh pulse signal, and wherein a frequency of the seventh selection signal is equal to one half of that the seventh pulse signal, and a duty cycle of the seventh selection signal is equal to ½;

an eighth selection signal is generated based on the eighth pulse signal, wherein a frequency of the eighth selection signal is equal to one half of that of the eighth pulse signal, and a duty cycle of the eighth selection signal is equal to ½;

a ninth selection signal is generated based on the ninth pulse signal, wherein a frequency of the ninth selection signal is equal to one half of that of the ninth pulse signal, and a duty cycle of the ninth selection signal is equal to ½; and when the output current is less than the first current threshold, controlling the fifteenth switch with a logical AND operation result of the seventh pulse signal and the complementary signal of the ninth selection signal, controlling the seventeenth switch with a logical AND operation result of the eighth pulse signal and the seventh selection signal, controlling the nineteenth switch with a logical AND operation result of the ninth pulse signal and the eighth selection signal, controlling the sixteenth switch with a logical AND operation result of the ninth pulse signal and the ninth selection signal, controlling the eighteenth switch with a logical AND operation result of the seventh pulse signal and the complementary signal of the seventh selection signal, and controlling the twentieth switch with a logical AND operation result of the eighth pulse signal and the complementary signal of the eighth selection signal.

16. A hybrid voltage converter comprising:
a switched capacitor unit and a freewheeling unit connected to the switched capacitor unit; and
a controller, wherein the controller is connected to switches in the switched capacitor unit and switches in the freewheeling unit, and the controller is configured to control the on and off of the switches in the switched capacitor unit and the freewheeling unit, wherein the controller comprises:
at least one processor and a memory communicatively connected to the at least one processor, and wherein the memory stores instructions to be executed by the at least one processor, and the instructions are executed by the at least one processor to enable the at least one processor to perform:
continuously monitoring an output current of the hybrid voltage converter;
controlling switches in the hybrid voltage converter to operate in a parallel conduction mode when the output current is greater than a first current threshold; and
controlling the switches in the hybrid voltage converter to operate in a sequential conduction mode when the output current is less than the first current threshold, wherein:
when the switches in the hybrid voltage converter operate in the parallel conduction mode, N switch groups in the switched capacitor unit are controlled to turn on and off with a same duty cycle and a phase shift of (360/N) degrees, with each switch group comprising at least two switches, and each switch in the freewheeling unit corresponds to a switch group in the switched capacitor unit, and the switches in the freewheeling unit turns on and off complementary to their corresponding switch groups in the switched capacitor unit; and
when the switches in the hybrid voltage converter operate in the sequential conduction mode, each switch in the switched capacitor unit turns on sequentially and individually with the same duty cycle, each switch in the freewheeling unit is turned off when any switch of their corresponding switch group in the switched capacitor unit is turned on, and each switch in the freewheeling unit is turned on when all switches in their corresponding switch group in the switched capacitor unit are turned off.

17. The hybrid voltage converter according to claim 16, wherein:
the controller is further configured to output an enable signal and control the enable signal to be in a high state when the output current of the hybrid voltage converter is greater than the first current threshold, and to control the enable signal to be in a low state when the output current is less than the first current threshold.

18. The hybrid voltage converter according to claim 17, further comprising:
a first D flip-flop, a second D flip-flop, a first NAND gate, a second NAND gate, a third NAND gate, a fourth NAND gate, a first AND gate, a second AND gate, a third AND gate, a fourth AND gate, a first NOT gate, a second NOT gate, a third NOT gate, and a fourth NOT gate, wherein:

the switched capacitor unit comprises a first switch, a second switch, a third switch, a fourth switch, a first input capacitor, a first capacitor, a second capacitor, and a third capacitor; and
the freewheeling unit comprises a fifth switch, a sixth switch, a first output capacitor, a first inductor and a second inductor, and wherein:
a third terminal of the first switch is connected to an input power supply and a first terminal of the first input capacitor;
a second terminal of the first switch is connected to a third terminal of the second switch and a first terminal of the first capacitor;
a second terminal of the second switch is connected to a first terminal of the second capacitor and a third terminal of the third switch;
a second terminal of the third switch is connected to a third terminal of the fourth switch and a first terminal of the third capacitor;
a second terminal of the fourth switch is connected to a third terminal of the fifth switch, a second terminal of the second capacitor, and a first terminal of the second inductor;
a third terminal of the sixth switch is connected to a second terminal of the first capacitor, a second terminal of the third capacitor, and a first terminal of the first inductor;
a second terminal of the first inductor is connected to a second terminal of the second inductor and a first terminal of the first output capacitor;
a second terminal of the first input capacitor, a second terminal of the fifth switch, a second terminal of the sixth switch and a second terminal of the first output capacitor are all grounded;
an output of the first AND gate is connected to a first terminal of the first switch;
a first input of the first AND gate, a first input of the third AND gate, an input of the third NOT gate, and a clock input of the second D flip-flop all receive a first pulse signal generated by the controller;
an output of the third NOT gate is connected to a first terminal of the sixth switch;
a second input of the first AND gate is connected to an output of the first NAND gate;
a second input of the first NAND gate is connected to an input of the first NOT gate and an output of the first D flip-flop;
a first input of the first NAND gate, a first input of the second NAND gate, a first input of the third NAND gate, and a first input of the fourth NAND gate all receive the enable signal;
a signal input and a complementary output of the first D flip-flop are connected;
a clock input of the first D flip-flop, an input of the fourth NOT gate, a first input of the second AND gate, and a first input of the fourth AND gate all receives a second pulse signal generated by the controller;
an output of the fourth NOT gate is connected to a first terminal of the fifth switch;
an output of the second AND gate is connected to a first terminal of the second switch;
a second input of the second AND gate is connected to an output of the second NAND gate;
a second input of the second NAND gate is connected to an output of the second NOT gate;

a second input of the third NAND gate is connected to an output of the first NOT gate;
an input of the second NOT gate is connected to a second input of the fourth NAND gate and an output of the second D flip-flop;
a signal input and a complementary output of the second D flip-flop are connected together;
an output of the third AND gate is connected to a first terminal of the third switch;
a second input of the third AND gate is connected to an output of the third NAND gate;
an output of the fourth AND gate is connected to a first terminal of the fourth switch; and
a second input of the fourth AND gate is connected to an output of the fourth NAND gate.

19. The hybrid voltage converter according to claim 17, wherein:
the switched capacitor unit comprises a seventh switch, an eighth switch, a ninth switch, a tenth switch, a second input capacitor, a fourth capacitor, and a fifth capacitor; and
the freewheeling unit comprises an eleventh switch, a twelfth switch, a third inductor, a fourth inductor, and a second output capacitor, and wherein:
a third terminal of the seventh switch is connected to an input power supply, a first terminal of the second input capacitor, and a third terminal of the ninth switch;
a second terminal of the seventh switch is connected to a third terminal of the eighth switch and a first terminal of the fourth capacitor;
a second terminal of the eighth switch is connected to a third terminal of the eleventh switch, a second terminal of the fifth capacitor, and a first terminal of the fourth inductor;
a second terminal of the ninth switch is connected to a first terminal of the fifth capacitor and a third terminal of the tenth switch;
a second terminal of the tenth switch is connected to a second terminal of the fourth capacitor, a third terminal of the twelfth switch, and a first terminal of the third inductor;
a second terminal of the third inductor is connected to a second terminal of the fourth inductor and a first terminal of the second output capacitor; and
a second terminal of the second input capacitor, a second terminal of the eleventh switch, a second terminal of the twelfth switch, and a second terminal of the second output capacitor are all grounded, and wherein the hybrid voltage converter further comprises:
a third D flip-flop, a fourth D flip-flop, a fifth NAND gate, a sixth NAND gate, a seventh NAND gate, an eighth NAND gate, a fifth AND gate, a sixth AND gate, a seventh AND gate, an eighth AND gate, a fifth NOT gate, a sixth NOT gate, a seventh NOT gate, and an eighth NOT gate, and wherein:
an output terminal of the fifth AND gate is connected to a first terminal of the seventh switch;
a first input terminal of the fifth AND gate, a first input terminal of the seventh AND gate, an input terminal of the seventh NOT gate, and a clock input terminal of the fourth D flip-flop all receive a third pulse signal generated by the controller;
an output terminal of the seventh NOT gate is connected to the first terminal of the twelfth switch;
a second input terminal of the fifth AND gate is connected to an output terminal of the fifth NAND gate;
a second input terminal of the fifth NAND gate is connected to an output terminal of the third D flip-flop and an input terminal of the fifth NOT gate;
an output terminal of the fifth NOT gate is connected to a second input terminal of the seventh NAND gate;
a first input terminal of the fifth NAND gate, a first input terminal the sixth NAND gate, a first input terminal the seventh NAND gate, and a first input terminal the eighth NAND gate all receive the enable signal;
a signal input terminal and an inverted output terminal of the third D flip-flop are connected together;
a clock input terminal of the third D flip-flop, an input terminal of the eighth NOT gate, a first input terminal of the sixth AND gate, and a first input terminal of the eighth AND gate all receive a fourth pulse signal generated by the controller;
an output terminal of the eighth NOT gate is connected to a first terminal of the eleventh switch;
an output terminal of the sixth AND gate is connected to a first terminal of the eighth switch;
a second input terminal of the sixth AND gate is connected to an output terminal of the sixth NAND gate;
a second input terminal of the sixth NAND gate is connected to an output terminal of the sixth NOT gate;
an input terminal of the sixth NOT gate is connected to a second input terminal of the eighth NAND gate and an output terminal of the fourth D flip-flop;
a first output terminal of the seventh AND gate is connected to a first terminal of the tenth switch;
a second input terminal of the seventh AND gate is connected to an output terminal of the seventh NAND gate;
an output terminal of the eighth AND gate is connected to a first terminal of the ninth switch; and
a second input terminal of the eighth AND gate is connected to an output terminal of the eighth NAND gate.

20. The hybrid voltage converter according to claim 17, wherein:
the switched capacitor unit comprises a seventh switch, an eighth switch, a ninth switch, a tenth switch, a thirteenth switch, a fourteenth switch, a second input capacitor, a fourth capacitor, a fifth capacitor a sixth capacitor, and a seventh capacitor; and
the freewheeling unit comprises an eleventh switch, a twelfth switch, a third inductor, a fourth inductor, and a second output capacitor, and wherein:
a third terminal of the seventh switch is connected to an input power supply, a first terminal of the second input capacitor, and a third terminal of the ninth switch;
a second terminal of the seventh switch is connected to a third terminal of the eighth switch and a first terminal of the fourth capacitor;
a second terminal of the eighth switch is connected to a third terminal of the thirteenth switch, and a first terminal of the sixth capacitor;
a second terminal of the ninth switch is connected to a first terminal of the fifth capacitor and a third terminal of the tenth switch;

a second terminal of the tenth switch is connected to a first terminal of the seventh capacitor, a third terminal of the fourteenth switch;

a second terminal of the third inductor is connected to a second terminal of the fourth inductor and a first terminal of the second output capacitor;

a second terminal of the second input capacitor, a second terminal of the eleventh switch, a second terminal of the twelfth switch, and a second terminal of the second output capacitor are all grounded;

a second terminal of the thirteenth switch is connected to a second terminal of the seventh capacitor, a second terminal of the fourth capacitor, a third terminal of the eleventh switch and a first terminal of the third inductor; and a second terminal of the fourteenth switch is connected to a second terminal of the sixth capacitor, a second terminal of the fifth capacitor, a third terminal of the twelfth switch and a first terminal of the fourth inductor, and wherein the hybrid voltage converter further comprises:

a fifth D flip-flop, a sixth D flip-flop, a seventh D flip-flop, an eighth D flip-flop, a ninth NAND gate, a tenth NAND gate, an eleventh NAND gate, a twelfth NAND gate, a thirteenth NAND gate, a fourteenth NAND gate, a ninth AND gate, a tenth AND gate, an eleventh AND gate, a twelfth AND gate, a thirteenth AND gate, a fourteenth AND gate, a fifteenth AND gate, a sixteenth AND gate, a first OR gate, a second OR gate, a ninth NOT gate, and a tenth NOT gate, and wherein:

an output terminal of the ninth AND gate is connected to a first terminal of the seventh switch;

a first input terminal of the ninth AND gate, a first input terminal of the eleventh AND gate, a first input terminal of the thirteenth AND gate, an input terminal of the ninth NOT gate, a clock input terminal of the seventh D flip-flop, and a clock input terminal of the eighth D flip-flop all receive a fifth pulse signal generated by the controller;

an output terminal of the ninth NOT gate is connected to a first terminal of the eleventh switch;

a second input terminal of the ninth AND gate is connected to an output terminal of the ninth NAND gate;

a first input terminal of the ninth NAND gate, a first input terminal of the tenth NAND gate, a first input terminal of the eleventh NAND gate, a first input terminal of the twelfth NAND gate, a first input terminal of the thirteenth NAND gate, and a first input terminal of the fourteenth NAND gate all receive the enable signal;

a second input terminal of the ninth NAND gate is connected to an output terminal of the first OR gate;

a first input terminal of the first OR gate is connected to an output terminal of the sixth D flip-flop;

an inverted output terminal of the sixth D flip-flop is connected to a first input terminal of the fifteenth AND gate and a second input terminal of the thirteenth NAND gate;

a signal input terminal of the sixth D flip-flop is connected to a second input terminal of the first OR gate and an output terminal of the fifth D flip-flop;

an inverted output terminal of the fifth D flip-flop is connected to a second input terminal of the fifteenth AND gate and a second input terminal of the eleventh NAND gate;

a signal input terminal of the fifth D flip-flop is connected to an output terminal of the fifteenth AND gate;

a clock input terminal of the fifth D flip-flop, a clock input terminal of the sixth D flip-flop, an input terminal of the tenth NOT gate, a first input terminal of the tenth AND gate, a first input terminal of the twelfth AND gate, and a first input terminal of the fourteenth AND gate all receive a sixth pulse signal generated by the controller;

an output terminal of the tenth NOT gate is connected to a first terminal of the twelfth switch;

an output terminal of the tenth AND gate is connected to a first terminal of the eighth switch;

a second input terminal of the tenth AND gate is connected to an output terminal of the tenth NAND gate;

a second input terminal of the tenth NAND gate is connected to a second input terminal of the sixteenth AND gate and an inverted output terminal of the seventh D flip-flop;

a first input terminal of the sixteenth AND gate is connected to a second input terminal of the twelfth NAND and an inverted output terminal of the eighth D flip-flop;

an output terminal of the sixteenth AND gate is connected to an input terminal of the seventh D flip-flop;

an output terminal of the eighth D flip-flop is connected to a first input terminal of the second OR gate;

an input terminal of the eighth D flip-flop is connected to a second input terminal of the second OR gate and an output of the seventh D flip-flop;

an output terminal of the second OR gate is connected to a second input terminal of the fourteenth NAND gate;

an output terminal of the eleventh NAND gate is connected to a second input terminal of the eleventh AND gate;

an output terminal of the eleventh AND gate is connected to a first terminal of the thirteenth switch;

an output terminal of the twelfth NAND gate is connected to a second input terminal of the twelfth AND gate;

an output terminal of the twelfth AND gate is connected to a first terminal of the ninth switch;

an output terminal of the thirteenth NAND gate is connected to a second input terminal of the thirteenth AND gate;

an output terminal of the thirteenth AND gate is connected to a first terminal of the tenth switch;

an output terminal of the fourteenth NAND gate is connected to a second input terminal of the fourteenth AND gate; and an output terminal of the fourteenth AND gate is connected to a first terminal of the fourteenth switch.

21. The hybrid voltage converter according to claim 17, further comprising:

a ninth D flip-flop, a tenth D flip-flop, an eleventh D flip-flop, a fifteenth NAND gate, a sixteenth NAND gate, a seventeenth NAND gate, an eighteenth NAND gate, a nineteenth NAND gate, a twentieth NAND gate, a seventeenth AND gate, an eighteenth AND gate, a nineteenth AND gate, a twentieth AND gate, a twenty-first AND gate, a twenty-second AND gate, an eleventh NOT gate, a twelfth NOT gate, a thirteenth NOT gate, a fourteenth NOT gate, a fifteenth NOT gate, and a sixteenth NOT gate; the switched capacitor unit comprises a fifteenth switch, a sixteenth switch, a seventeenth switch, an eighteenth switch, a nineteenth switch, a twentieth switch, a third input capacitor, an eighth capacitor, a ninth capacitor, and a tenth capacitor, wherein the freewheeling unit further comprises a twenty-first switch, a twenty-second switch, a twenty-third switch, a third output capacitor, a fifth inductor, a sixth inductor, and a seventh inductor, and wherein:

a third terminal of the fifteenth switch is connected to an input power source, a third terminal of the seventeenth switch, a third terminal of the nineteenth switch and a first terminal of the third input capacitor;

a second terminal of the fifteenth switch is connected to a third terminal of the sixteenth switch and a first terminal of the eighth capacitor;

a second terminal of the sixteenth switch is connected to a third terminal of the twenty-first switch, a second terminal of the tenth capacitor and a first terminal of the fifth inductor;

a second terminal of the seventeenth switch is connected to a third terminal of the eighteenth switch and a first terminal of the ninth capacitor;

a second terminal of the eighteenth switch is connected to a second terminal of the eighth capacitor, a third terminal of the twenty-second switch, and a first terminal of the sixth inductor;

a second terminal of the nineteenth switch is connected to a first terminal of the tenth capacitor and a third terminal of the twentieth switch;

a second terminal of the twentieth switch is connected to a third terminal of the twenty-third switch, a second terminal of the ninth capacitor and a first terminal of the seventh inductor;

a second terminal of the fifth inductor is connected to a second terminal of the sixth inductor, a second terminal of the seventh inductor and a first terminal of the third output capacitor;

a second terminal of the third input capacitor, a second terminal of the third output capacitor, a second terminal of the twenty-first switch, a second terminal of the twenty-second switch and a second terminal of the twenty-third switch are all grounded;

an output terminal of the seventeenth AND gate is connected to a first terminal of the fifteenth switch;

a first input terminal of the seventeenth AND gate, a first input terminal of the twenty-first AND gate, an input terminal of the fifteenth NOT gate, and a clock input terminal of the tenth D flip-flop all receive a seventh pulse signal from the controller;

an output terminal of the fifteenth NOT gate is connected to a first terminal of the twenty-second switch;

a second input terminal of the seventeenth AND gate is connected to an output terminal of the fifteenth NAND gate;

a second input terminal of the fifteenth NAND gate is connected to an input terminal of the eleventh NOT gate and an output terminal of the ninth D flip-flop;

an output terminal of the eleventh NOT gate is connected to a second input terminal of the eighteenth NAND gate;

an inverted output terminal of the ninth D flip-flop is connected to a signal input terminal of the ninth D flip-flop;

a clock input terminal of the ninth D flip-flop, an input terminal of the sixteenth NOT gate, a first input terminal of the nineteenth AND gate and a first input terminal of the twentieth AND gate all receive a ninth pulse signal from the controller;

an output terminal of the sixteenth NOT gate is connected to a first terminal of the twenty-first switch;

a first input terminal of the fifteenth NAND gate, a first input terminal of the sixteenth NAND gate, a first input terminal of the seventeenth NAND gate, a first input terminal of the eighteenth NAND gate, a first input terminal of the nineteenth NAND gate and a first input terminal of the twentieth NAND gate all receive the enable signal;

an output terminal of the eighteenth AND gate is connected to a first terminal of the seventeenth switch;

a first input terminal of the eighteenth AND gate, a first input terminal of the twenty-second AND gate, an input terminal of the fourteenth NOT gate and a clock input terminal of the eleventh D flip-flop all receive an eighth pulse signal from the controller;

an output terminal of the fourteenth NOT gate is connected to a first terminal of the twenty-third switch;

a second input terminal of the eighteenth AND gate is connected to an output terminal of the sixteenth NAND gate;

a second input terminal of the sixteenth NAND gate is connected to an output terminal of the twelfth NOT gate;

an input terminal of the twelfth NOT gate is connected to a second input terminal of the nineteenth NAND gate and an output terminal of the tenth D flip-flop;

an inverted output terminal of the tenth D flip-flop is connected to a signal input terminal of the tenth D flip-flop;

an output terminal of the nineteenth AND gate is connected to a first terminal of the nineteenth switch;

a second input terminal of the nineteenth AND gate is connected to an output terminal of the seventeenth NAND gate;

a second input terminal of the seventeenth NAND gate is connected to an output terminal of the thirteenth NOT gate;

an input terminal of the thirteenth NOT gate is connected to a second input terminal of the twentieth NAND gate and an output terminal of the eleventh D flip-flop;

an inverted output terminal of the eleventh D flip-flop is connected to a signal input terminal of the eleventh D flip-flop;

an output terminal of the twentieth AND gate is connected to a first terminal of the sixteenth switch;

a second input terminal of the twentieth AND gate is connected to an output terminal of the eighteenth NAND gate;

an output terminal of the twenty-first AND gate is connected to a first terminal of the eighteenth switch;

a second input terminal of the twenty-first AND gate is connected to an output terminal of the nineteenth NAND gate;

an output terminal of the twenty-second AND gate is connected to a first terminal of the twentieth switch; and a second input terminal of the twenty-second AND gate is connected to an output terminal of the twentieth NAND gate.

* * * * *